(12) United States Patent
Eastman et al.

(10) Patent No.: US 9,373,229 B2
(45) Date of Patent: Jun. 21, 2016

(54) AUTOMATED BANKING SYSTEM CONTROLLED RESPONSIVE TO DATA BEARING RECORDS

(71) Applicant: Diebold Self-Service Systems division of Diebold, Incorporated, North Canton, OH (US)

(72) Inventors: Jeffrey M. Eastman, North Canton, OH (US); Brian Jones, Navarre, OH (US); Michael S. Johnson, Everett, WA (US); Shawn Griggy, North Canton, OH (US); Jeff A. Brannan, Massillon, OH (US); Michael J. Harty, Canton, OH (US); Robert W. Barnett, Louisville, OH (US); Eric S. Vankeulen, North Canton, OH (US); Mike P. Ryan, Canton, OH (US); William D. Beskitt, Canton, OH (US); Kenneth Turocy, Wadsworth, OH (US)

(73) Assignee: Diebold Self-Service Systems, Division of Diebold, Incorporated, North Canton, OH (US)

( * ) Notice: Subject to any disclaimer, the term of this patent is extended or adjusted under 35 U.S.C. 154(b) by 0 days.

(21) Appl. No.: 14/451,971

(22) Filed: Aug. 5, 2014

(65) Prior Publication Data

US 2014/0339758 A1 Nov. 20, 2014

Related U.S. Application Data

(63) Continuation of application No. 13/594,149, filed on Aug. 24, 2012, now Pat. No. 8,794,512, which is a continuation of application No. 12/459,185, filed on Jun. 26, 2009, now Pat. No. 8,251,281.

(Continued)

(51) Int. Cl.
*G06Q 40/00* (2012.01)
*G07F 19/00* (2006.01)
(Continued)

(52) U.S. Cl.
CPC ............... *G07F 19/202* (2013.01); *B65H 7/02* (2013.01); *B65H 7/20* (2013.01); *B65H 29/20* (2013.01);
(Continued)

(58) Field of Classification Search
CPC ...... B65H 1/025; B65H 29/40; B65H 83/025; B65H 2701/1912; B65H 7/02; B65H 7/20; B65H 29/20; G07F 19/202; G07F 19/20; G06Q 20/1085; G06Q 40/02
USPC .......................... 235/379; 271/3.01, 4.03, 176
See application file for complete search history.

(56) References Cited

U.S. PATENT DOCUMENTS 5,620,177 A * 4/1997 Takemoto et al. ............ 271/176
5,899,448 A * 5/1999 Hosking ...................... 271/3.08

(Continued)

*Primary Examiner* — Laura Gudorf
(74) *Attorney, Agent, or Firm* — Black, McCuskey, Souers & Arbaugh, LPA

(57) ABSTRACT

An automated banking machine operative to cause financial transfers responsive to data read from data bearing records. The automated banking machine includes a card reader that is operative to read card data from user cards corresponding to financial accounts. The automated banking machine is operative responsive to the card data to carry out transactions that transfer and/or allocate funds between accounts. The automated banking machine is further operative to provide users with a receipt for transactions conducted. The automated banking machine includes a cash dispenser operative to dispense cash to machine users and to cause the value of cash to be assessed to financial accounts corresponding to card data. The automated banking machine is further operative to receive currency bills or other sheets from a user and to process and store such sheets through operation of a currency accepting device. The account corresponding to card data may be credited for the value of bills or other sheets received.

20 Claims, 50 Drawing Sheets

Related U.S. Application Data

(60) Provisional application No. 61/192,282, filed on Sep. 17, 2008, provisional application No. 61/133,477, filed on Jun. 30, 2008, provisional application No. 61/133,346, filed on Jun. 27, 2008.

(51) Int. Cl.
  *G06Q 20/10* (2012.01)
  *G06Q 40/02* (2012.01)
  *G07G 5/00* (2006.01)
  *B65H 7/02* (2006.01)
  *B65H 7/20* (2006.01)
  *B65H 29/20* (2006.01)

(52) U.S. Cl.
  CPC ............ *G06Q 20/1085* (2013.01); *G06Q 40/02* (2013.01); *G07F 19/20* (2013.01); *G07F 19/201* (2013.01); *G07G 5/00* (2013.01)

(56) References Cited

U.S. PATENT DOCUMENTS

| | | | |
|---|---|---|---|
| 6,554,185 B1* | 4/2003 | Montross et al. | 235/379 |
| 2002/0079361 A1* | 6/2002 | Kosugi | 235/379 |
| 2007/0045396 A1* | 3/2007 | Kitagawa et al. | 235/379 |
| 2008/0099983 A1* | 5/2008 | Hayashi | 271/207 |

* cited by examiner

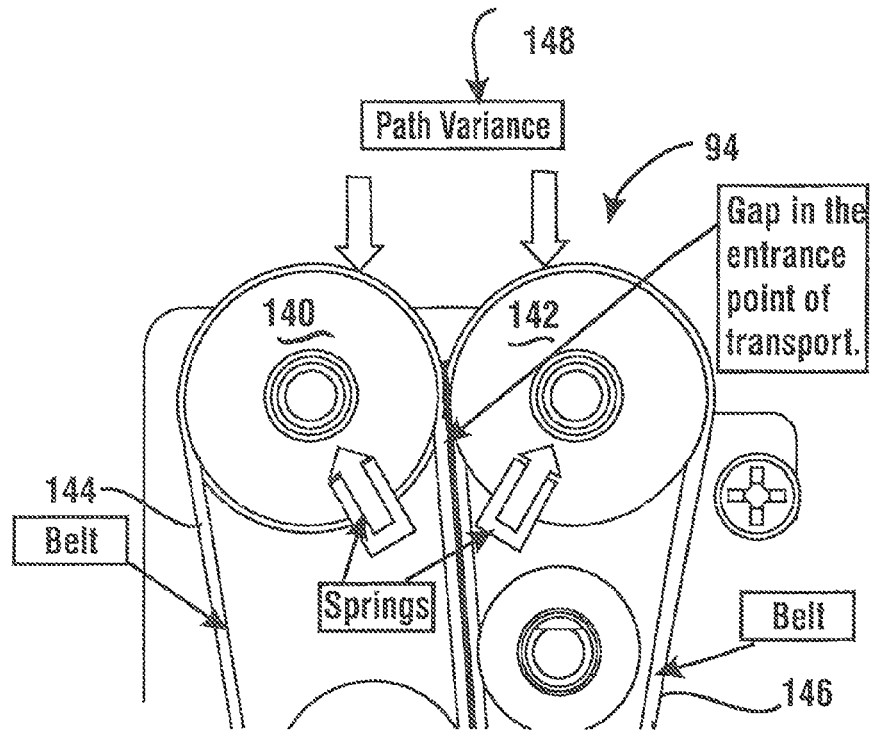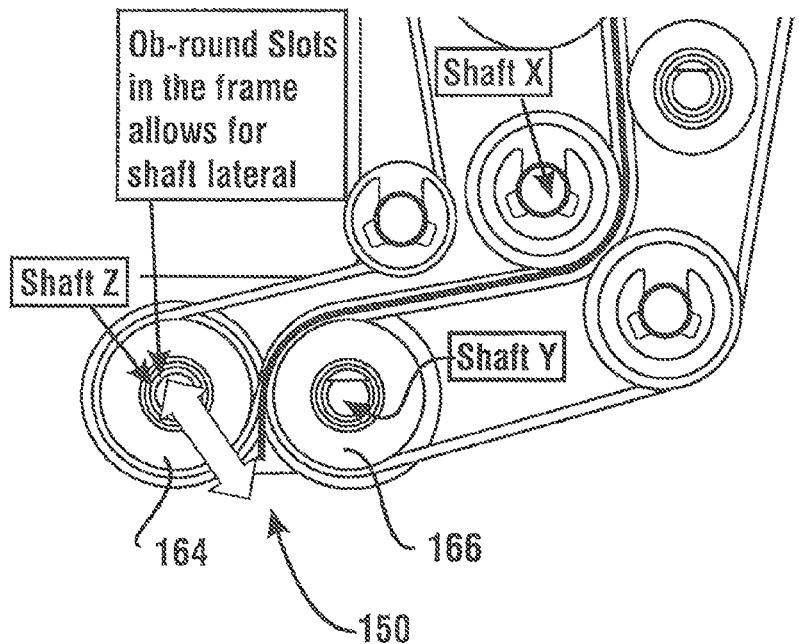
Fig. 25

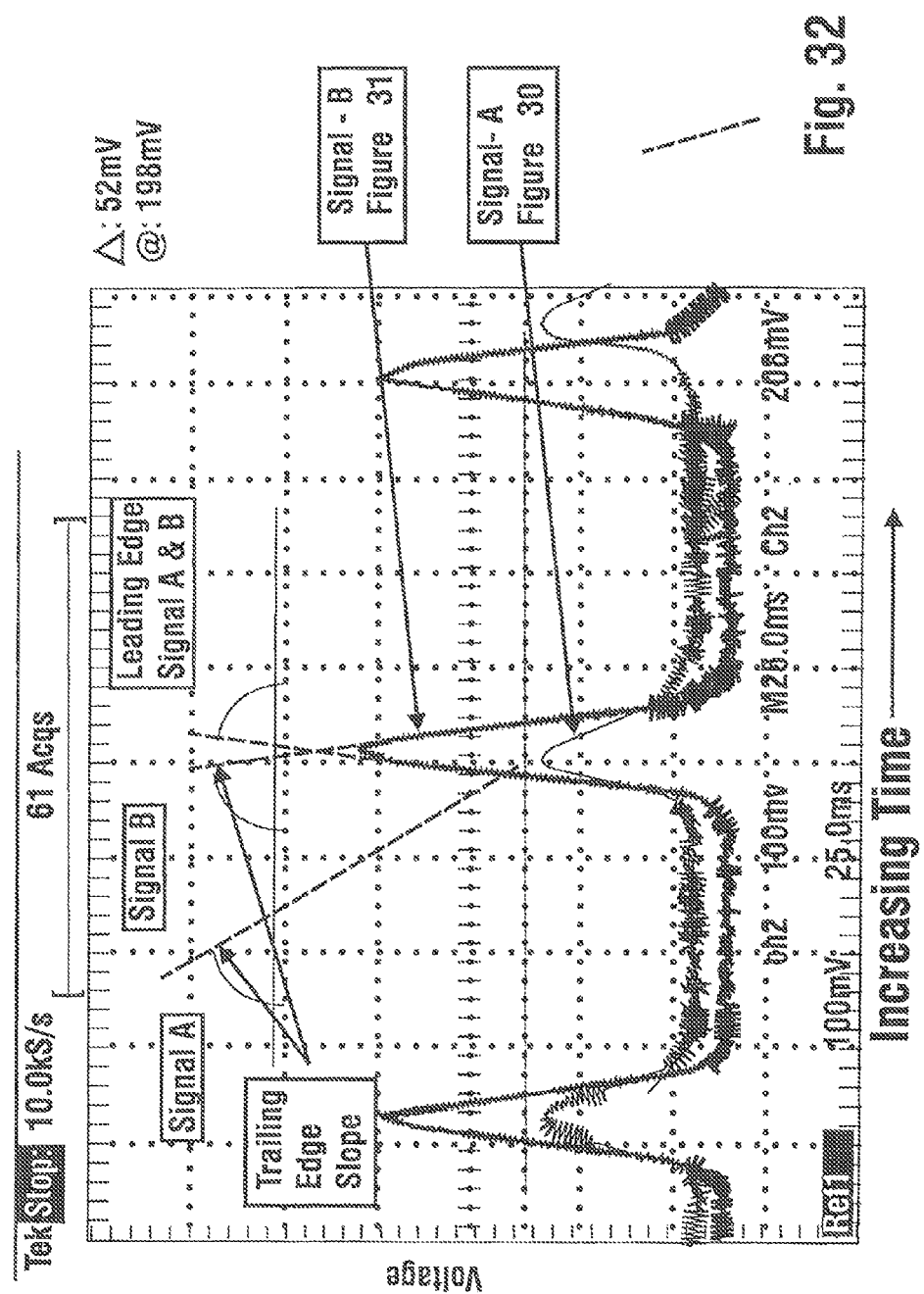

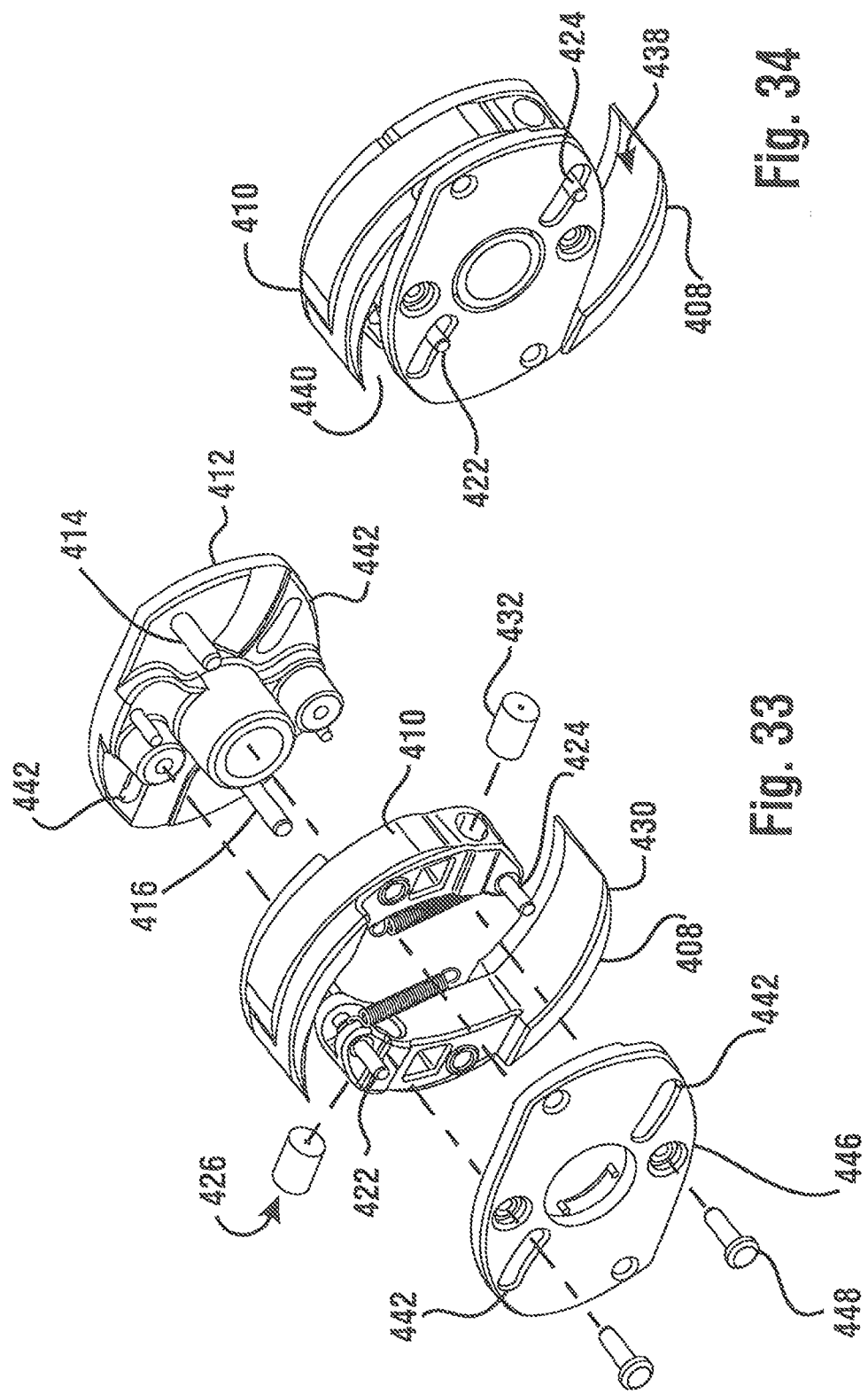

AUTOMATED BANKING SYSTEM CONTROLLED RESPONSIVE TO DATA BEARING RECORDS

CROSS REFERENCE TO RELATED APPLICATIONS

This application is a continuation of U.S. patent application Ser. No. 13/594,149 filed on Aug. 24, 2012, now U.S. Pat. No. 8,794,512, that is a continuation of U.S. patent application Ser. No. 12/459,185 filed on Jun. 26, 2009, now U.S. Pat. No. 8,251,281, that claims benefit pursuant to 35 U.S.C. §119(e) of Provisional Application Ser. No. 61/192,282 filed Sep. 17, 2008, Ser. No. 61/133,477 filed Jun. 30, 2008 and Ser. No. 61/133,346 filed Jun. 27, 2008, the disclosures of the aforementioned applications are incorporated herein by reference.

TECHNICAL FIELD

This invention relates to banking systems controlled by data bearing records that may be classified in U.S. Class 235, Subclass 379.

BACKGROUND ART

Automated banking machines may include a card reader that operates to read data from a bearer record such as a user card. Automated banking machines may operate to cause the data read from the card to be compared with other computer stored data related to the bearer or their financial accounts. The machine operates in response to the comparison determining that the bearer record corresponds to an authorized user, to carry out at least one transaction which may be operative to transfer value to or from at least one account. A record of the transaction is also often printed through operation of the automated banking machine and provided to the user. Automated banking machines may be used to carry out transactions such as dispensing cash, the making of deposits, the transfer of funds between accounts and account balance inquiries. The types of banking transactions that may be carried out are determined by the capabilities of the particular banking machine and system, as well as the programming of the institution operating the machine.

Other types of automated banking machines may be operated by merchants to carry out commercial transactions. These transactions may include, for example, the acceptance of deposit bags, the receipt of checks or other financial instruments, the dispensing of rolled coin, or other transactions required by merchants. Still other types of automated banking machines may be used by service providers in a transaction environment such as a bank to carry out financial transactions. Such transactions may include for example, the counting and storage of currency notes or other financial instrument sheets, the dispensing of notes or other sheets, the imaging of checks or other financial instruments, and other types of transactions. For purposes of this disclosure an automated banking machine or an automated teller machine (ATM) shall be deemed to include any machine that may be used to automatically carry out transactions involving transfers of value.

Automated banking machines may benefit from improvements.

OBJECTS OF EXEMPLARY EMBODIMENTS

It is an object of an exemplary embodiment to provide an improved automated banking machine.

It is a further object of an exemplary embodiment to provide an automated banking machine that accepts and stores sheets such as financial instruments.

It is a further object of exemplary embodiments to provide an automated banking machine that accepts currency bills.

It is a further object of an exemplary embodiment to provide an automated banking machine that accepts checks.

It is a further object of an exemplary embodiment to provide an automated banking machine that stores received sheets in uniformly stacked relation.

It is a further object of an exemplary embodiment to provide an automated banking machine that operates to store received sheets in uniformly stacked relation in removable cassettes.

It is a further object of an exemplary embodiment to provide methods of operation of an automated banking machine.

It is a further object of an exemplary embodiment to provide a method for servicing an automated banking machine.

Further objects of exemplary embodiments will be made apparent in the following Detailed Description of Exemplary Embodiments and the appended claims. The foregoing objects are accomplished in one exemplary embodiment by an automated banking machine system that operates responsive to data bearing records. The exemplary machine is operative to read data included on user cards as well as manually input data. The machine operates to cause a determination to be made whether the input data corresponds to a user and/or an account that is authorized to conduct transactions at the machine. Authorized users are enabled to conduct transactions such as receiving cash which results in funds being debited to a financial account corresponding to the data included on the user card.

Other transactions carried out in an exemplary embodiment include the deposit of financial instrument sheets such as currency bills and/or checks. The exemplary machine operates to receive a stack of such sheets from a user who has been determined to be authorized to operate the machine. The sheets are unstacked and after being aligned, are transported past a plurality of sensors. The sensors in exemplary embodiments may operate to image the sheets. Such sensors may also sense magnetic, ultraviolet and/or infrared properties or other detectable properties associated with the sheets. The data gathered through reading the sheets is used to determine data on the sheets and/or whether such sheets are valid financial instruments such as bills or checks.

Sheets may be stored on a temporary basis. Sheets that are determined to be invalid may be transported to a compartment so that they are segregated from other sheets. Sheets that are requested to be returned to the user may be transported back into the area of the original stack so that they may be taken by a user from the machine. In exemplary embodiments sheets that are determined to be valid are transported into a secure chest. Depending on the nature of the sheet, sheets are routed selectively to compartments in sheet holding containers.

In exemplary embodiments the sheets in the container are maintained in an aligned stack. Sheets entering the container are engaged and held by at least one rotating gripper member that grips the sheet, moves the sheet through rotation of the member and releases the sheet in alignment with the stack. In an exemplary embodiment a plurality of belts and rollers are used to urge movement of the sheet into the sheet holding compartment. Within each container the stack is supported on a moveable plate. The machine operates to move the plate so that the proper spaced relationship is maintained between the rotating gripping member and the stack as sheets are added.

In exemplary embodiments the removable containers include internal elements which are contactlessly sensed by the machine through sensors positioned outside the containers. In exemplary embodiments the elements include magnetic elements, but in other embodiments other types of elements may be used. This feature of an exemplary embodiment provides for accurate control of the rotating member, rollers and belts and positioning of the stack support plate without the need for electrical contacts or connectors between the removable container and the rest of the machine. Of course this approach is exemplary.

In the exemplary embodiment during transactions the containers are positioned within a secure chest of the machine. The chest may be opened and the containers removed. The exemplary containers include lockable doors which enable authorized persons to gain access to the sheets within the containers once they have been removed from the machine. Thus for example, containers that have become close to filled may be removed by authorized persons and replaced with empty containers. In other embodiments devices for both receiving and dispensing financial instrument sheets may be provided. This may include recycling mechanisms that operate to receive, store and dispense currency bills or other valuable items. Of course these approaches are exemplary and in other embodiments other approaches may be used.

BRIEF DESCRIPTION OF DRAWINGS

FIG. 25 is an expanded view of the intermodule sheet transport.

FIG. 32 is a schematic view of exemplary signals generated by a Hall effect sensor based on the positions of the projecting portion in FIGS. 30 and 31.

FIG. 33 is an exploded view of the components of the exemplary rotating member shown in FIGS. 30 and 31.

FIG. 34 is an isometric view of the exemplary rotating member with the components in FIG. 33 in an assembled condition and showing the cam followers extending from the rotating member.

DETAILED DESCRIPTION OF EXEMPLARY EMBODIMENTS

Figure 1:
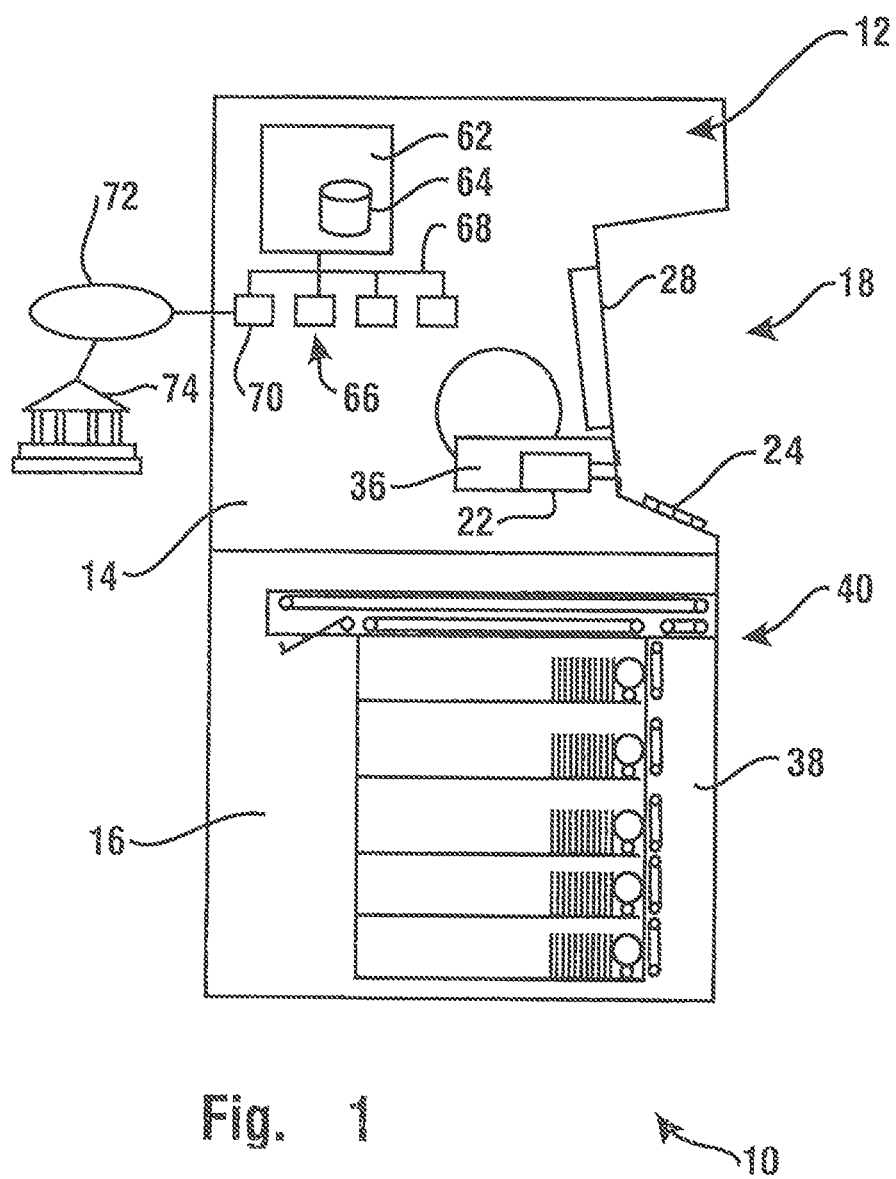
FIG. 1 is a schematic view of an automated banking machine that operates responsive to data included on user cards.

Referring now to the drawings and particularly to FIG. 1, there is shown therein an exemplary embodiment of an automated banking machine generally indicated 10. The exemplary machine includes a housing 12. The exemplary housing 12 includes an upper housing portion 14 and a secure chest portion 16. In this exemplary embodiment the automated banking machine is a through-the-wall type machine. However, in other embodiments other types of machines including standalone machines or machines integrated within other devices may be used. Exemplary housing structures for automated banking machines which may be used in some embodiments are shown in U.S. Pat. Nos. 7,156,296; 7,156,297; 7,165,767; and 7,000,830 the disclosures of which are incorporated by reference in their entirety.

Figure 2:
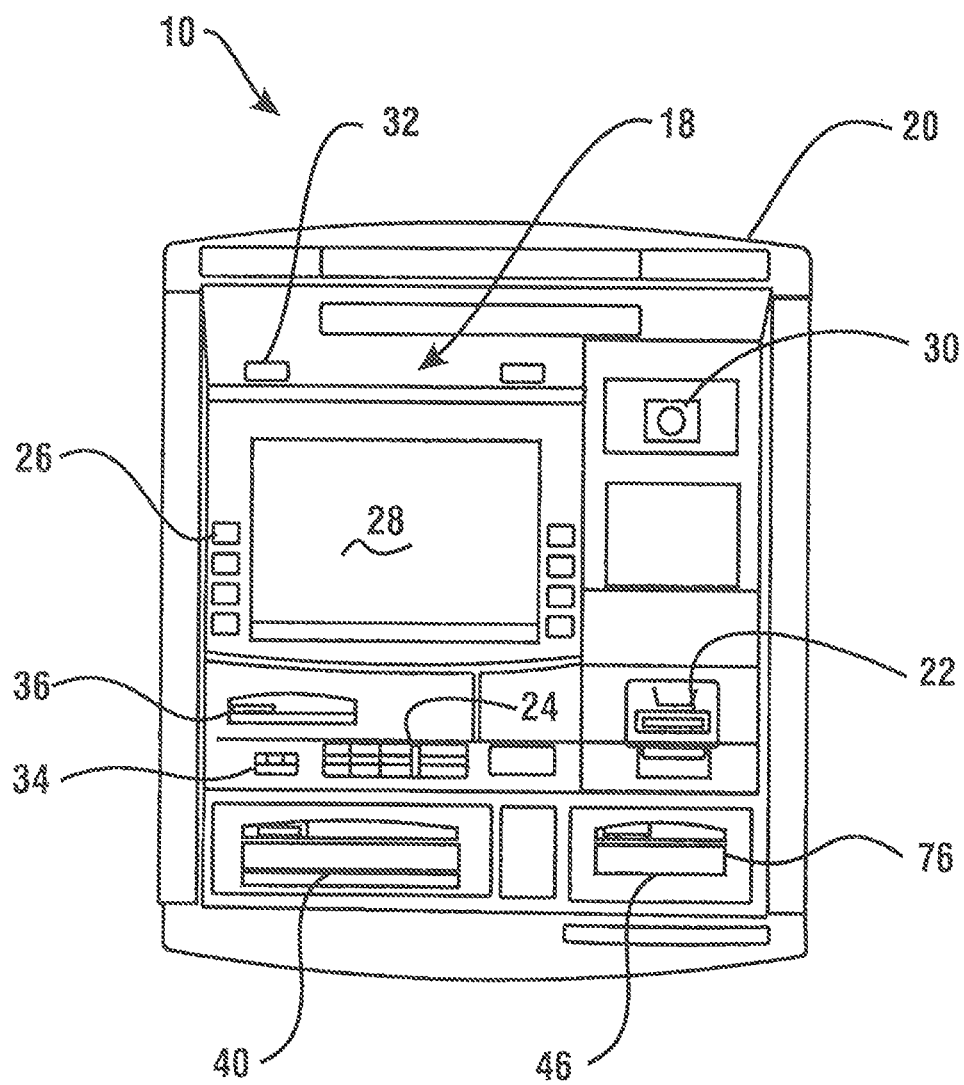
FIG. 2 is a front view of an exemplary fascia of an automated banking machine.

The exemplary embodiment of the automated banking machine includes a user interface generally indicated 18 (see also FIG. 2). The user interface components are surrounded by a fascia 20. In the exemplary embodiment the user interface components include input devices and output devices. The input devices include a card reader 22. The card reader 22 of the exemplary embodiment is operative to read data from user cards that are input to the machine through an opening on the fascia. Other user input devices of the exemplary embodiment include a keypad 24. Keypad 24 is operative to receive manual inputs by depressing alphanumeric keys.

Other input devices of the exemplary embodiment include function keys 26. Function keys 26 are manually actuated keys through which inputs can be provided in response to indicia output through a display 28 which serves as an output device. It should be understood that these input devices are exemplary and in other embodiments other types of input devices may be used. These include for example biometric reading devices which are operative to read biometric features of users. Such biometric features may include fingerprint scans, iris scans, retina scans or other distinguishing features. In some embodiments a camera such as camera 30 shown in FIG. 2 may serve as a biometric input device. Other input devices which may be used in exemplary embodiments include contactless readers such as radio frequency identification (RFID) readers which may operate to read bearer records or other identifying data from RFID tags. In other embodiments input devices may include voice recognition devices which are operative to identify a user by voice. Of course these features are exemplary and in other embodiments other features may be used.

In the exemplary embodiment the automated banking machine also includes a plurality of output devices. Such output devices may include a display 28 as previously discussed. It should be understood that in some embodiments the display may include a touchscreen display at which inputs may be provided by a user touching areas of the display.

Other output devices in the exemplary embodiment include speakers 32. Speakers 32 may be operative to provide audible instructions to machine users. Another output device provided in an exemplary embodiment includes a headphone jack 34. The headphone jack 34 may be used in the exemplary embodiment by persons who are blind and who may operate the machine responsive to instructions which are audibly output through a headphone or similar device that is operatively connected to the headphone jack.

Another output device included in an exemplary embodiment is a receipt printer 36. The receipt printer 36 of the exemplary embodiment is operative to print receipts for users of the machine. The receipts include details of banking transactions that are conducted through operation of the machine. The receipt printer 36 delivers receipts through a slot included on the fascia.

It should be understood that the output devices of the exemplary embodiment are but examples of output devices that may be used in connection with automated banking machines. In other embodiments other devices may be used. The exemplary embodiment of the automated banking machine includes a cash dispenser 38. The cash dispenser of the exemplary embodiment operates to cause cash which is stored within the secure chest to be delivered to a machine user outside the machine through a presenter opening 40. The exemplary cash dispenser is operative to pick currency bills from supplies of bills stored in containers in the chest and accumulate such bills into a stack. Currency bills are alternatively referred to herein as notes. The stack is thereafter delivered to the machine user. Exemplary cash dispensers are operative to deliver various types of currency bills as well as other financial instrument sheets. Various cash dispensers may also operate to deliver other types of sheet material as well. Examples of cash dispensers which may be used in exemplary embodiments are shown in U.S. Pat. Nos. 7,344, 132; 7,322,481; 7,121,461; 7,131,576; 7,140,537; 7,144,006; 7,140,607; 7,004,383; 7,000,832; 6,874,682; and 6,634,636 the disclosures of each of which are incorporated herein by reference in their entirety.

Although not specifically discussed in connection with this exemplary embodiment, embodiments of automated banking machines may also include depository devices. Such depository devices are operative to receive various deposited items from users. Examples of depository devices are shown in U.S. Pat. Nos. 7,156,295; 7,137,551; 7,150,394; and 7,021,529 the disclosures of each of which are incorporated herein by reference in their entirety.

The exemplary embodiment of the automated banking machine further includes a currency accepting device generally indicated 42. The currency accepting device includes a currency evaluation module 44. The currency evaluation module of the exemplary embodiment operates in a manner hereinafter described. The currency evaluation module is operative to receive a stack of sheets such as currency bills and to evaluate such bills for properties of genuineness or other features. The currency evaluation module of the exemplary embodiment is positioned in the upper housing 14 (see FIG. 4). The currency evaluation module operates to accept and deliver sheets to users through a fascia opening 46.

The exemplary embodiment of the currency accepting device 42 further includes a storage assembly 48. The storage assembly 48 of the exemplary embodiment is generally positioned in the secure chest 16.

Figure 4:
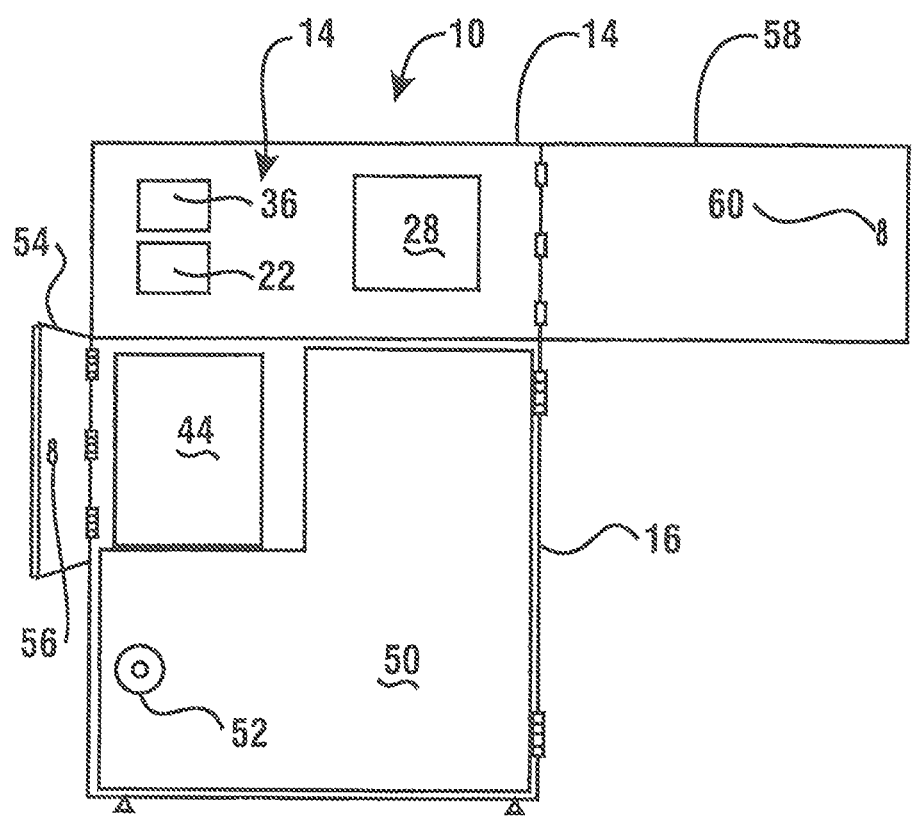
FIG. 4 is a back view of an exemplary machine.

In the exemplary embodiment which is shown from the back in FIG. 4, the secure chest is an L-shaped chest. The chest may include features described in U.S. Pat. No. 7,000, 830, the disclosure of which is incorporated herein by reference in its entirety. The L-shaped chest includes a safe door 50. The safe door 50 may be held in a locked position through an associated lock 52. The lock 52 may be operative to control the locked and unlocked condition of a boltwork that is operative to securely hold the safe door in a closed position or to enable the safe door to be opened. As shown in FIG. 4 in the exemplary embodiment the currency evaluation module 44 is positioned outside the chest portion. The currency evaluation module may be accessed through an appropriate access door or similar structure 54. Access door 54 may be held in the closed position through operation of a lock 56. Further in the exemplary embodiment items that are positioned in the upper housing 14 may be secured against access by unauthorized persons through a lock 60. Of course it should be understood that these structures are exemplary and in other embodiments other approaches may be used. In an exemplary embodiment the automated banking machine includes at least one terminal controller 62 which may be alternatively referred to herein as a computer or a processor. The terminal controller 62 is in operative connection with at least one data store 64. Data store 64 in the exemplary embodiment is comprised of computer readable media which is operative to store computer executable instructions and data which are used by the controller to operate the machine. In exemplary embodiments the computer readable media may include hard drives, flash memory, DVDs, CDs, magnetic media, optical media, solid state memory or other articles suitable for holding computer executable instructions. It should be understood that although in the exemplary embodiment a single controller and data store is schematically shown other embodiments may include numerous processors and data stores. For example some embodiments may include features described in U.S. Pat. Nos. 6,264,101 and/or 6,131,809 the disclosures of which are incorporated herein by reference in their entirety. The at least one terminal processor and at least one associated data store may also be referred to herein as control circuitry.

In the exemplary embodiment the terminal controller is operative to communicate with transaction function devices in the machine which are schematically referred to as 66. Transaction function devices 66 of the exemplary embodiment include devices of the automated banking machine that operate responsive to at least one terminal controller. In the exemplary embodiment the transaction function devices include a card reader, keypad, function keys, receipt printer, cash dispenser, currency accepting device and other devices that are operated in or in connection with the automated banking machine. It should be understood that these devices are merely exemplary and in other embodiments additional, different or lesser numbers of transaction function devices may be used.

In the exemplary embodiment the transaction function devices communicate through an interface bus schematically indicated 68. In the exemplary embodiment the interface bus 68 may include a universal serial bus (USB). The messages which control operation of the various transaction function devices as well as the messages therefrom as well as messages from the terminal controller pass through the interface bus. Of course it should be understood that different types of interface buses and communications and methodologies may be used in embodiments of automated banking machines.

The exemplary embodiment of the automated banking machine further includes a communications device schematically indicated 70. The communications device is suitable for providing communications between the machine and remote computers through one or more networks schematically indicated 72. Communication device 70 may include a suitable network communication card, modem, wireless communication device or other suitable device for communicating messages to and from the machine. Further exemplary embodiments may use proprietary networks, public networks or even the Internet for purposes of communication.

In the exemplary embodiment the automated banking machine 10 communicates with at least one remote computer that operates to carry out financial transfers of funds to, from and/or between accounts. These may be for example, computers located in a banking institution schematically indicated 74. Remote computer 74 may also include for example, remote computers operative to carry out credit transactions or other transactions including transfers of funds.

In some exemplary embodiments the automated banking machine may utilize principles for communication with remote computers and other features shown in U.S. Pat. Nos. 7,159,144; 7,162,449; 7,093,749; 7,039,600; 7,261,626; and/or 7,333,954 the disclosures of each of which are incorporated herein by reference in their entirety. Of course in other embodiments other approaches may be used.

In still other exemplary embodiments the automated banking machine may operate so as to enable users to receive marketing or other messages. This may be done in a manner like that shown in U.S. Pat. No. 7,379,893 the entire disclosure of which is incorporated herein by reference. In addition exemplary embodiments may communicate with systems that enable notification of remote servicers or other entities that help to maintain the automated banking machine in an operative condition. Communications with such entities may be accomplished in the manner shown in U.S. Pat. No. 7,366,646 the disclosure of which is incorporated herein by reference in its entirety.

Exemplary embodiments of the automated banking machine may also have operating in the terminal controller, diagnostic software applications that are suitable for facilitating diagnosis and cure of conditions that may occur at the automated banking machine. This may be done for example in the manner described in U.S. Pat. Nos. 7,104,441; 7,163,144; 7,093,749; and/or 6,953,150 the entire disclosures of each of which are incorporated herein by reference.

In addition the automated banking machine may operate to capture images of users of the machine so as to provide records of functions carried out and/or to identify particular users that may conduct transactions at the machine. This may be done through operation of the terminal controller and/or by communication through the terminal controller or other processor with remote networks. Some embodiments may operate in a manner that employs the principles described in U.S. Pat. No. 7,147,147 the disclosure of which is incorporated herein by reference in its entirety. Of course it should be understood that the features described are exemplary and in other embodiments other approaches may be used.

In conducting transactions through operation of the exemplary embodiment of the automated banking machine the currency accepting device may operate to receive one or a stack of currency bills through the fascia opening 46. It should be understood that the fascia opening is controlled by a suitable door or gate 76. The gate is operative to prevent access through the opening 46 except at appropriate times when transactions are being conducted by authorized users. Currency bills input through the opening are engaged by a stack handling mechanism 78. The exemplary stack handling mechanism is operative to receive a stack of bills from the user as well as to present bills to a user. In the exemplary embodiment the stack handling mechanism may be of the type shown in U.S. patent application Ser. No. 11/983,410 filed Nov. 8, 2007 the entire disclosure of which is incorporated herein by reference. Alternatively the stack handling mechanisms may be of the type shown in U.S. Pat. Nos. 6,983,880 and/or 6,109,522 the entire disclosures of each of which are incorporated herein by reference. Of course these approaches are exemplary and in other embodiments other approaches may be used.

Stacks of currency sheets input to the exemplary embodiment are separated one by one from the stack through operation of a picker mechanism schematically indicated 80. The exemplary picker mechanism operates using the principles of the incorporated disclosures such that the currency bills are moved and separated one at a time from the stack. Further in exemplary embodiments double bills that may be picked are separated from one another and/or returned to the stack so that efforts can be made to separate each bill individually.

Bills that have been separated from the stack are moved into a document alignment mechanism schematically indicated 82. The document alignment mechanism 82 is operative to orient the currency bills in registration with the sheet path so as to facilitate the analysis thereof. Document alignment mechanism 82 may include features like those shown in U.S. Pat. Nos. 7,213,746 and/or 6,109,522 the entire disclosures of each of which are incorporated herein by reference.

Once documents have been aligned by the document alignment device 82, documents are passed through a sensing module 84. Sensing module 84 of an exemplary embodiment includes a plurality of different types of sensors. These may include for example, sensors that are operative to image a document or portions thereof. They may also include sensors that detect reflectance from and transmission of radiation through various areas on the document. Such sensors may further include magnetic sensors, fluorescence sensors, RFID sensors, ultrasonic sensors or other sensors suitable for detecting characteristics that may be used to determine the genuineness or other properties of currency bills or other sheets that are passed through the sensing module. Exemplary sensing modules may include for example features and principles such as those described in U.S. Pat. Nos. 7,366,250 and/or 6,774,986 the disclosures of each of which are incorporated herein by reference. Of course it should be understood that these approaches are exemplary and in other embodiments other approaches may be used.

Currency bills that have been moved through the sensing module 84 are passed along a transport and selectively directed by one or more gates schematically indicated 86 to desired locations or devices within the machine. For example in some exemplary modes of operation, currency bills that have passed through the sensing module 84 may be directed for storage on a storage device schematically indicated 88. In the exemplary embodiment the storage device may comprise a belt type recycler. The belt type recycler may be operative to store each currency bill in the sequence received, and then to subsequently deliver those currency bills in a last in/first out sequence. Exemplary storage devices may include features like those shown in U.S. Pat. No. 6,227,446 the disclosure of which is incorporated herein by reference. Of course the belt type recycler described is exemplary and other devices and other types of storage and recovery systems may be used.

In other modes of operation gates 86 may be operative to direct currency bills along a transport that causes such bills to be returned to the stack handling mechanism 78. This may be done for example in circumstances where it is determined that the particular sheet is a blank sheet or other sheet that is not of a type that can be accepted by the machine. As a result the sheet may be immediately rejected and returned to the stack handling mechanism 78 which may operate in response to the terminal controller to return the sheet to a user. Of course this approach is exemplary. In still other embodiments the terminal controller may operate to cause a gate 90 to direct selected sheets to a document segregation compartment 92. Document segregation compartment 92 may be used in some embodiments for storage of sheets that are determined to be counterfeit through operation of the sensing module. Alternatively or in addition in some embodiments the document segregation compartment may be used for storing sheets that are suspect as potentially counterfeit, or other types of sheets that are not acceptable to the machine. Of course this approach is exemplary and in other embodiments other approaches may be used.

In the exemplary embodiment one or more gates 86 may also operate to direct sheets from the currency evaluation module to an intermodule transport 94. The intermodule transport 94 in the exemplary embodiment is operative to accept sheets from the currency evaluation module and deliver them into the storage assembly 48. As can be appreciated, in the exemplary embodiment the intermodule transport 94 is operative to enable sheets to be moved from the currency evaluation module 42 which in the exemplary embodiment is outside the chest, into the interior area of the secure chest. Documents that move through the intermodule transport are engaged with a sheet directing assembly 96. Exemplary sheet directing assembly 96 is operative to selectively direct sheets responsive to communication with the at least one terminal controller to cause sheets to be directed and stored in selected storage locations. In the exemplary embodiment these selected locations include a sheet holding compartment in a first removable sheet stacking container 98 or within a sheet holding compartment in a second removable sheet stacking container 100. Alternatively in the exemplary embodiment the sheet directing assembly may direct sheets to a middle storage location schematically indicated 102. Of course these structures and configurations are exemplary and in other embodiments other approaches may be used.

In exemplary embodiments operation of the currency accepting device includes receiving a stack of currency bills from a user into the machine. After each sheet has been aligned by the document alignment mechanism and moved past the sensing devices in the sensing module, the sheets are directed to the storage device where they are stored pending analysis of the sheets and/or other transaction steps or determinations made through operation of the terminal controller and/or other connected systems. This includes for example evaluating each sheet for genuineness, determining the denomination of each currency bill, evaluating features of the sheet that may indicate that it is counterfeit or suspect, or other steps. Such determinations may also include receiving inputs from a user confirming the value of sheets included in the transaction, indicating whether the user wishes to deposit the sheets, and other inputs.

In an exemplary mode of operation, sheets stored in the storage device that are to be deposited may be directed through operation of the one or more gates 86 into the storage assembly 48 where they are selectively routed to an appropriate storage container for the particular type of sheet, or to the middle storage compartment. Further in the exemplary mode of operation, counterfeit or suspect counterfeit sheets are directed from the storage device 88 to the document segregation compartment 92. Other sheets that are not routed to other areas may be returned to the user. This may be done for example by returning the sheets to the stack handling mechanism 78 and presenting those sheets to the user through the opening 46.

In addition exemplary embodiments may operate in accordance with features of the incorporated disclosures to allow a user to request a return of all of the currency bills or other sheets that they have placed in the machine. This may be done for example in response to user inputs if the user decides that the type and character of the sheets they have deposited do not correspond with the automated banking machine determination concerning the nature of the sheets. Alternatively and/or in addition the terminal controller may provide a user with outputs that correspond to options including for example the ability to resubmit for further evaluation by the machine, those sheets which the machine was not able to validate as genuine sheets during an initial analysis. Of course numerous approaches may be taken based on the programming of the particular terminal controller.

It should further be understood that although the exemplary embodiments of the currency accepting device 42 is described with reference to handling currency bills, other embodiments may operate using the described features for handling other types of financial instruments or other sheets. These may include for example the handling and analysis of checks such as have been described in the incorporated disclosures. For example some exemplary embodiments may receive, evaluate and store financial checks. Other exemplary embodiments may operate to receive and store both checks and currency bills. Other exemplary embodiments may operate to receive, analyze and store other types of sheets such as money orders, travelers checks, gaming materials, vouchers, script, gift certificates, gift cards, or other sheets associated with transactions. Of course these approaches are exemplary and in other embodiments other approaches may be used.

It should further be understood that exemplary embodiments may also incorporate sheet recycling principles of the types described in the incorporated disclosures. This may include for example receiving financial instrument sheets such as currency bills from a particular user and storing valid bills within the machine. Thereafter other users who may be requesting to receive cash from the automated banking machine are dispensed the currency bills that the machine has previously received from other users and determined to be valid. Of course these approaches are exemplary and in other embodiments other approaches may be used.

Figure 5:
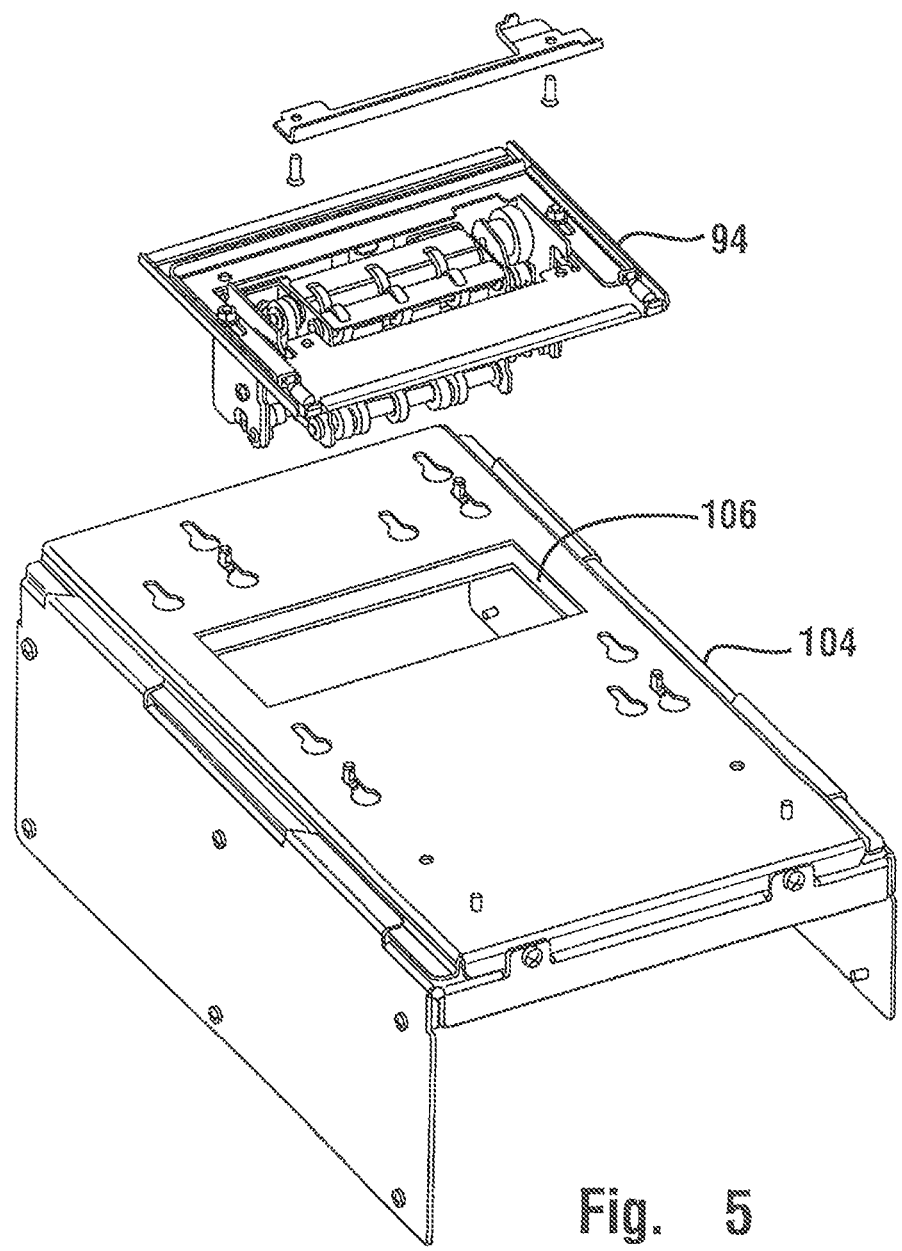
FIG. 5 is an exploded view of a support and sheet transport module that operates to transport sheets between a sheet accepting module and storage modules within a secure chest.
Figure 6:
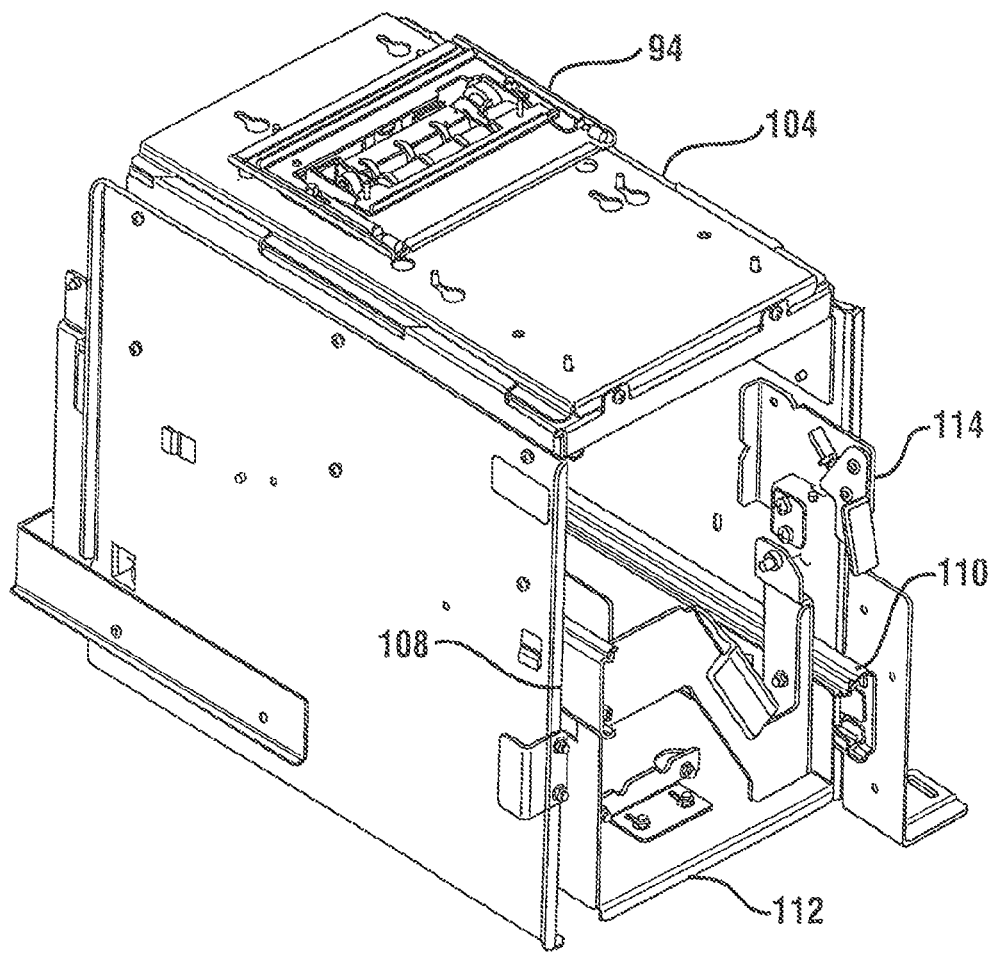
FIG. 6 is an isometric view of a housing structure including a slide-out tray used for holding storage containers within the secure chest.
Figure 8:
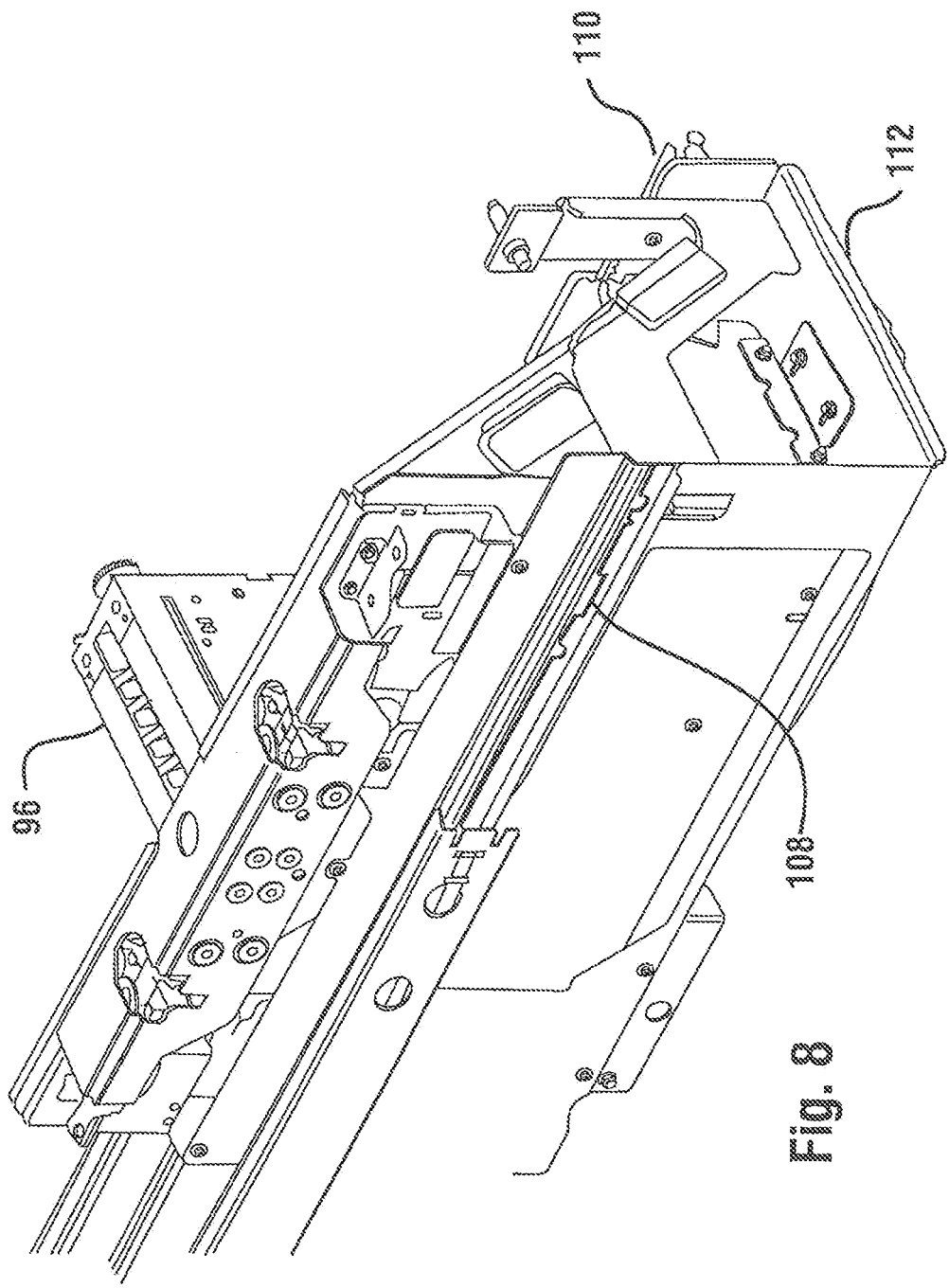
FIG. 8 is a back isometric view showing the tray in the extended position.

FIGS. 5 and 6 show the exemplary intermodule transport 94 which is in supporting connection with a box frame 104. In the operative position box frame 104 in the exemplary embodiment is positioned within the secure chest. The upper portion of the box frame includes an opening 106 through which the intermodule transport extends. As best shown in FIG. 6 box frame 104 includes slides 108, 110. The slides are in movable supporting connection with a tray 112. Tray 112 in the exemplary embodiment operatively supports removable stacking containers 98 and 100 as well as the sheet directing assembly 96. As shown in FIG. 6 a latch 114 is in operative connection with the tray 112. When the tray is in its retracted position within the secure chest, actuation of the latch 114 is operative to release the tray such that the tray can be extended outward when the chest door is open in supporting connection with the slides. This is represented schematically in FIG. 8. Further as can be appreciated in the exemplary embodiment with the tray 112 extended to a position outside the chest, the removable containers 98 and 100 can be removed from engagement with the tray 112. In addition with the containers removed, a door 116 can be opened such that a person servicing the machine can gain access to those sheets which have been moved into the middle compartment 102.

Figure 3:
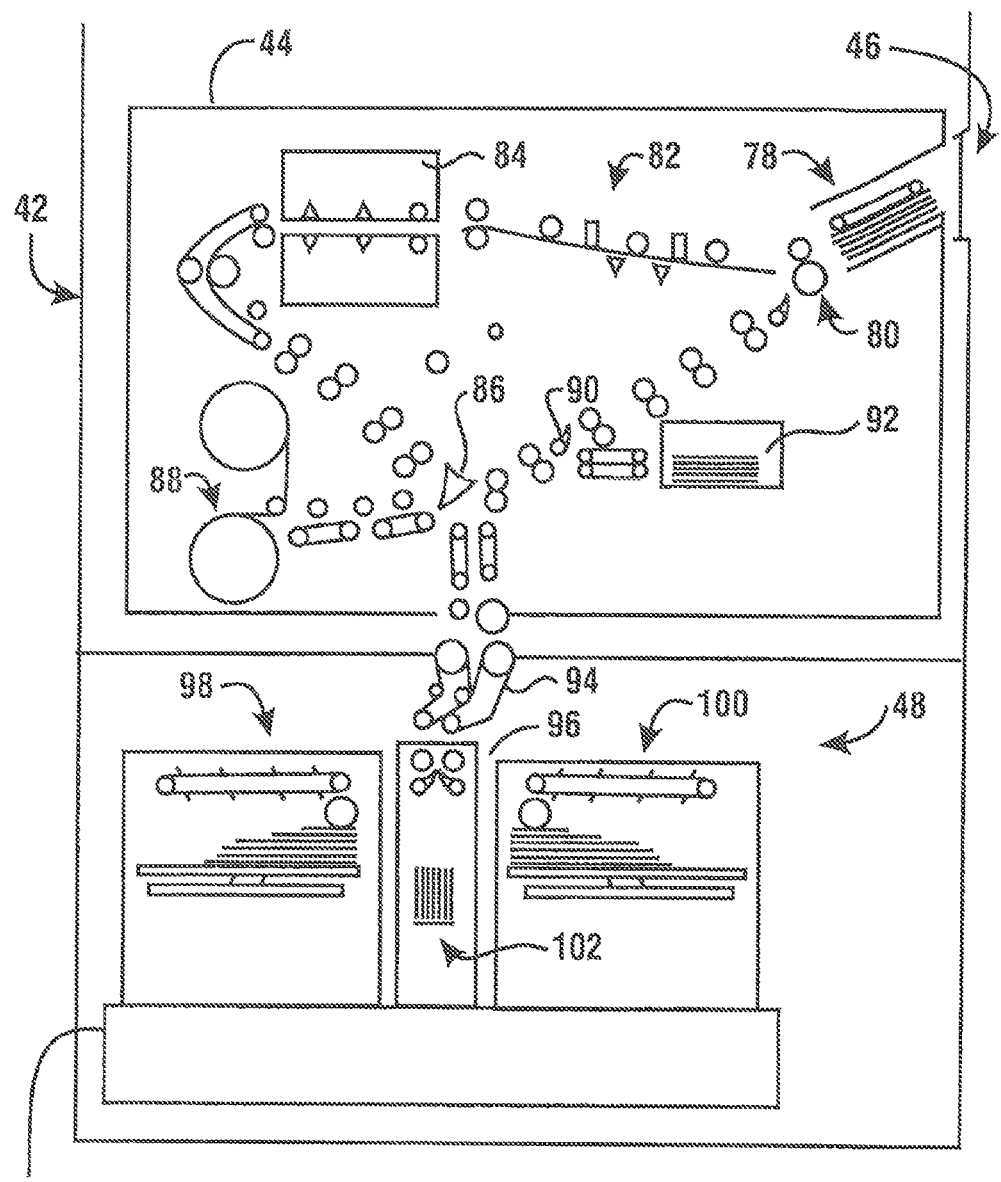
FIG. 3 is a schematic view of an exemplary sheet accepting and storage system within the exemplary machine.
Figure 7:
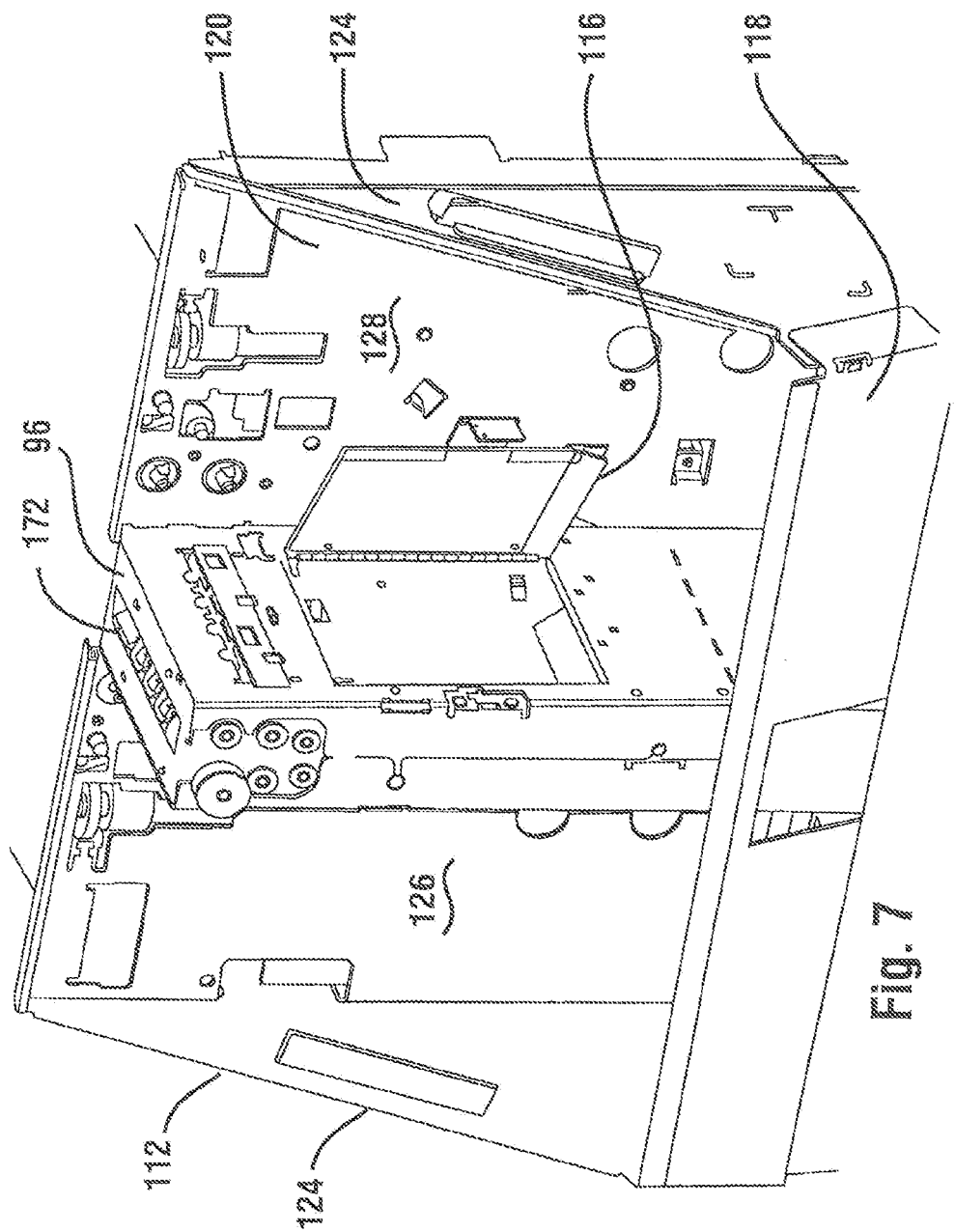
FIG. 7 is an opposite hand isometric view showing the tray for supporting sheet holding containers.
Figure 9:
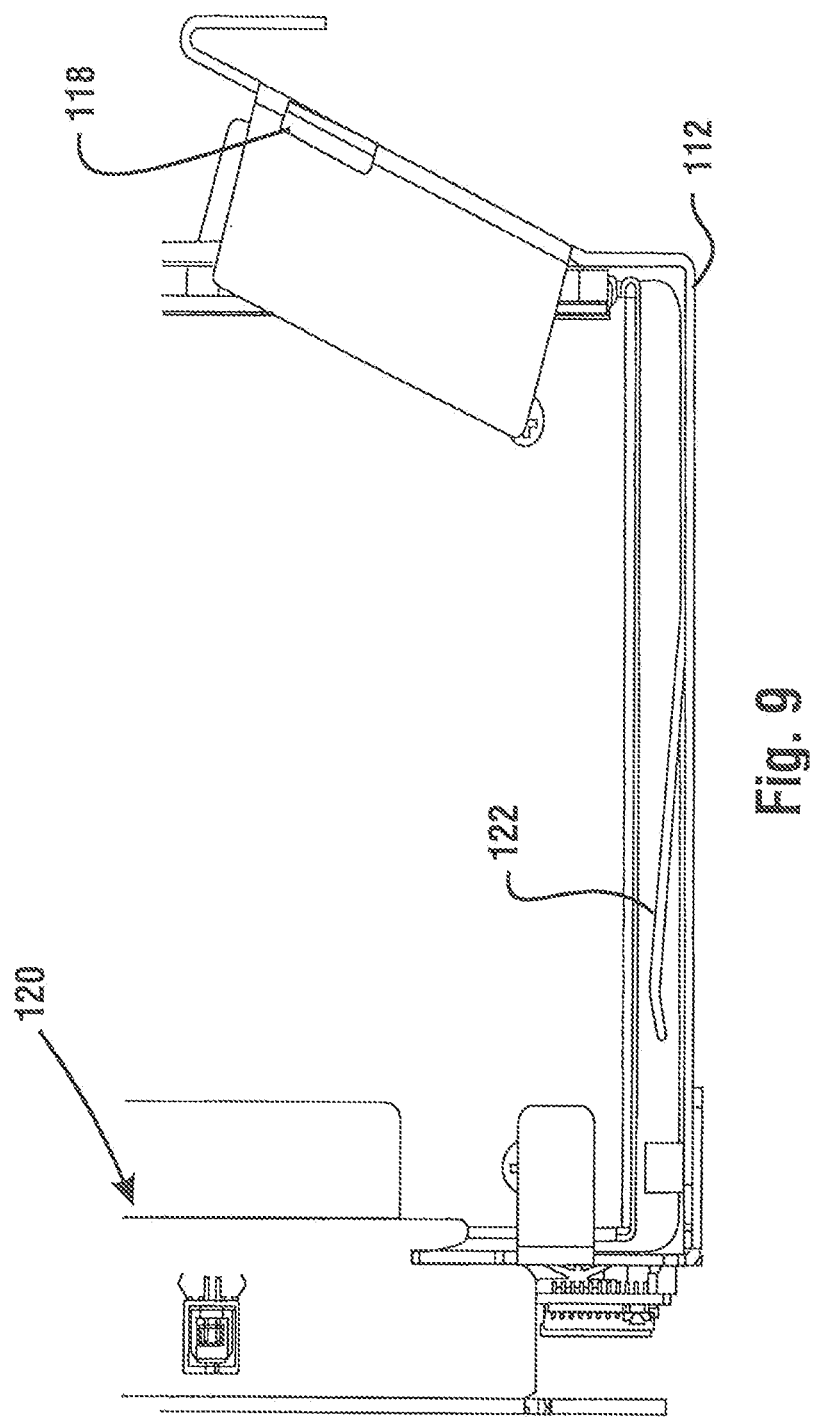
FIG. 9 is a cross-sectional bottom view of the tray including spring structures that facilitate removal of the containers.

As can be seen from FIGS. 3 and 7 exemplary tray 112 includes a low front wall 118 and a relatively higher back wall 120. As best shown in FIG. 9 in the exemplary embodiment front wall 118 is angled generally outward. This construction in the exemplary embodiment facilitates moving the containers 98, 100 angularly away at the top from the back wall 120 to facilitate the removal thereof. Further as shown in FIG. 9 the lower surface of tray 112 of the exemplary embodiment includes integral leaf springs 122. The integral leaf springs 122 are configured so as to facilitate biasing the containers so as to move away from the back wall at the top. Of course this approach is exemplary and in other embodiments other approaches may be used.

Figure 10:
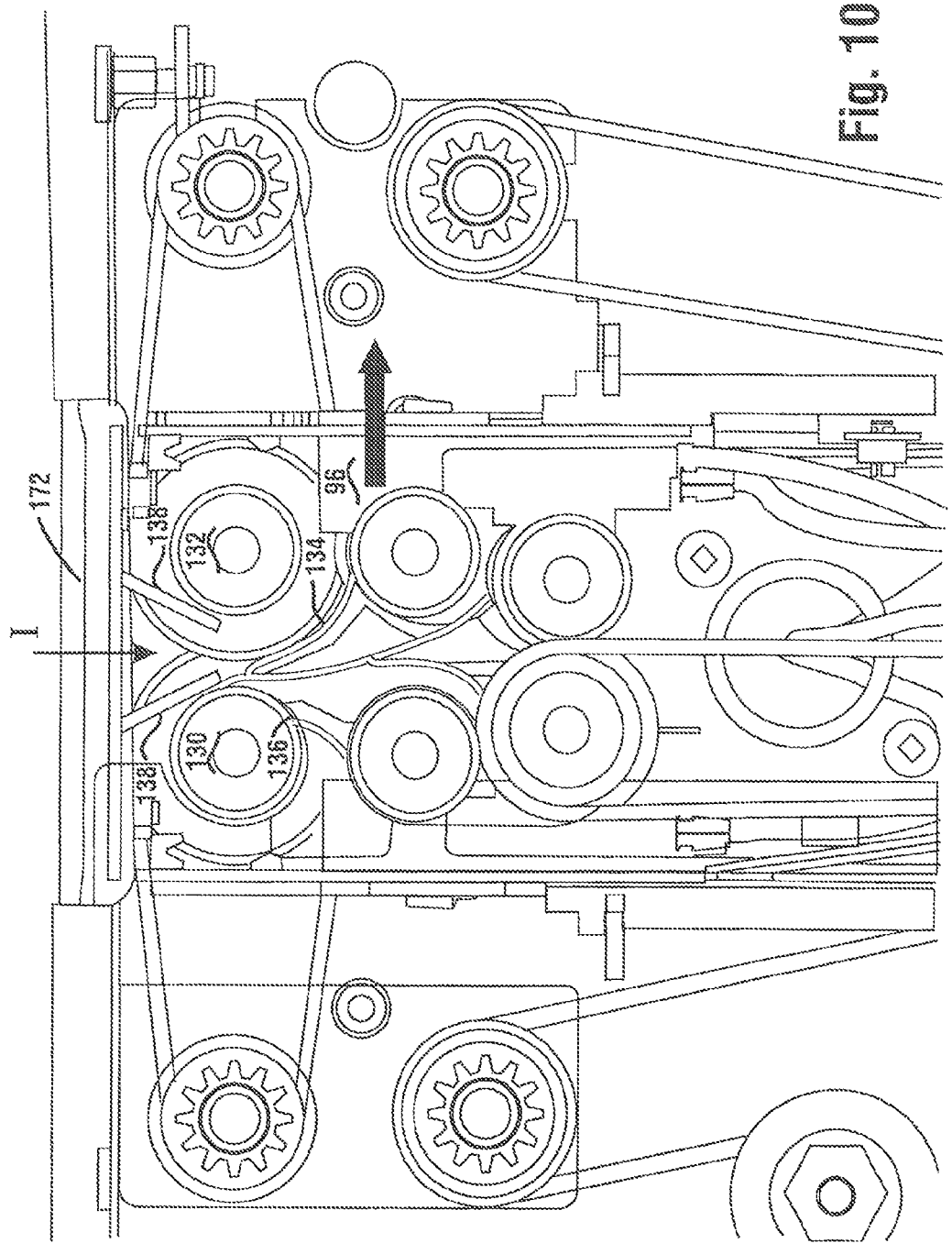
FIG. 10 is an enlarged view of a sheet directing transport which is operative to direct sheets selectively to sheet holding containers.
Figure 11:
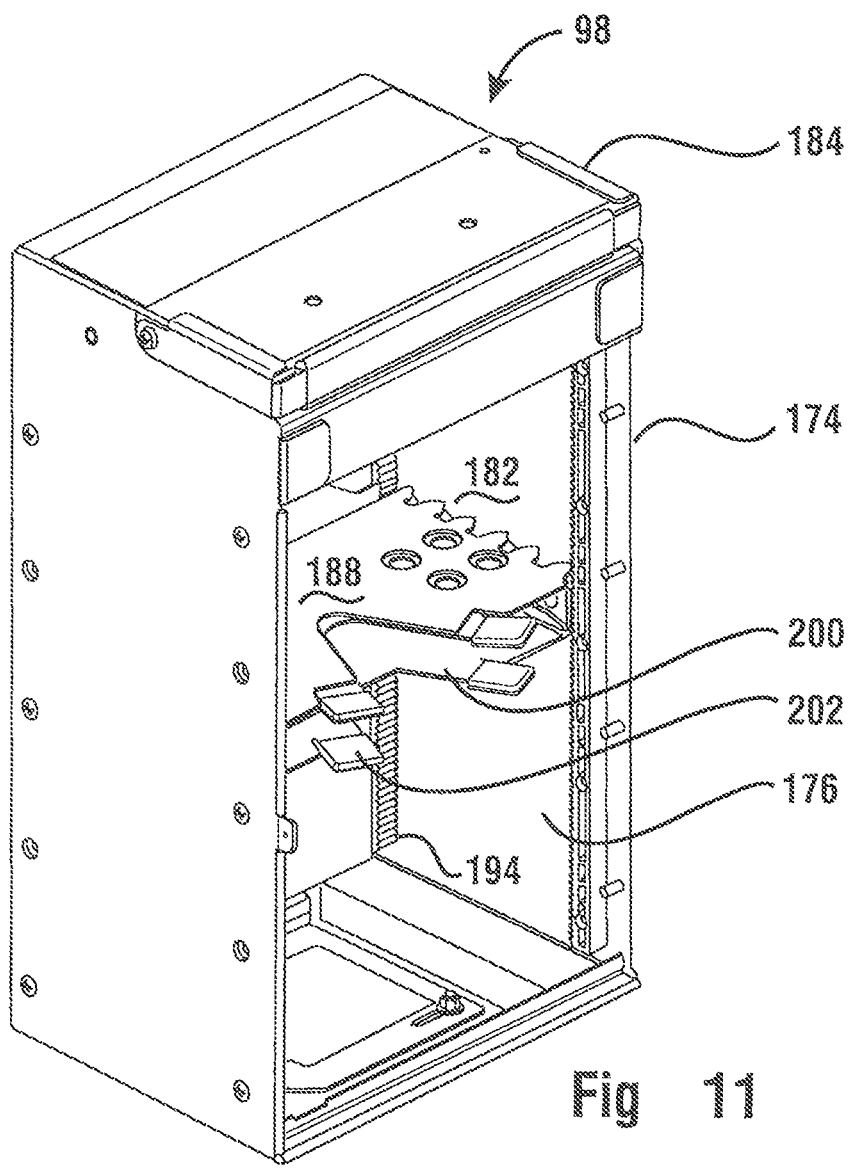
FIG. 11 is an isometric view of an exemplary sheet holding container.

As can be seen in FIG. 7 the tray 112 further includes side walls 124. The side walls of the exemplary embodiment along with the front wall 118, back wall 120 and sheet directing assembly 96 are operative to bound an area 126 for releasibly holding container 98. Likewise on an opposed side of the sheet directing assembly the front wall 118, back wall 120 and side wall 124 bound an area 128. Area 128 is configured for releasibly accepting container 100 when door 116 is in the closed position. Of course this configuration is exemplary and in other embodiments other approaches may be used. The exemplary sheet directing assembly 96 is shown in greater detail in FIG. 10. Sheets that have passed through the intermodule transport 94 enter the sheet directing assembly 96 through an opening in the top thereof and pass between rolls 130, 132. The entry of sheets between the rolls through the top opening is represented by arrow I. Sheet directing gates 134, 136 are in operative connection with suitable actuators so as to selectively position the gates responsive to signals from the terminal controller. In the condition shown in FIG. 10, gates 134 and 136 are positioned such that sheets entering the sheet directing assembly are caused to move to the right as shown and into sheet holding container 100. Thus in this condition sheets that enter the assembly 96 are so directed until the conditions of gates 134 and 136 are changed.

In response to appropriate signals the positions of the gates may be reversed such that sheets entering assembly 96 may be directed to the left as shown through an outlet opening in the sheet directing assembly and into the container 98. In addition in the exemplary embodiment the gates may be controlled such that sheets entering the sheet directing assembly may pass in a straight through manner into the middle storage compartment 102. Of course these approaches are exemplary and in other embodiments other approaches may be used.

As can be appreciated sheets that pass from the intermodule transport 94 into the sheet directing assembly 96 move downward through a gap in generally unsupported relation. Further as can be appreciated because the intermodule transport and sheet directing assembly are relatively movable, the intermodule transport and sheet directing assembly may not necessarily always be precisely positioned. The movement of sheets into the sheet directing assembly is facilitated through the use of inward directed guides 138. Guides 138 cooperate with the engaging action of rollers 130, 132 to draw sheets into the pinch area between the rollers. This helps to assure that sheets may reliably pass even in conditions with minor misalignment.

The exemplary intermodule transport 94 further facilitates the passage of sheets both from the currency evaluation module 44 outside the chest through an opening in chest wall and into the sheet directing assembly. The exemplary intermodule transport 94 is shown in greater detail in FIGS. 23 through 27. As represented schematically in FIG. 23 the intermodule transport includes a pair of rolls 140, 142. The rolls 140 and 142 support thereon continuous belts which in the exemplary embodiment comprise ultrahigh molecular weight urethane. In this exemplary embodiment the belts 144 and 146 operate in direct contact with one another to move sheets therebetween. Belts 144 and 146 are operative to move sheets from an inlet nip 148 to an outlet 150. Further in the exemplary embodiment the intermodule transport 94 is operative to provide a generally 90 degree turn for sheets passing therethrough. This configuration reduces the risk that criminals who may gain access to the upper housing portion of the machine can fish out currency notes that are stored within the chest. This is because the opening between the belts is offset from the opening on the top of the sheet directing assembly 96. Further the structure of the sheet holding containers of the exemplary embodiment generally prevent access by criminal tools from the opening in the safe in which the intermodule transport is positioned, to the interior of the cassettes where substantial quantities of sheets are generally held. Further the exemplary structure of the intermodule transport facilitates passing sheets through a relatively thick safe wall at the top of the chest portion.

A further useful aspect of the exemplary embodiment is that the rolls 140 and 142 provide a relatively wide area in which sheets may engage the rolls and be drawn between the belts. In addition the exemplary embodiment includes a slight gap in the area between the rolls to further facilitate drawing in the sheets. As can be seen, as the sheets are moved into the transport from the inlet nip 148, the gap between the belts in the undeformed condition closes so as to facilitate the positive transport of the sheets. As can be appreciated the exemplary embodiment of the currency evaluation module 44 is relatively movable with regard to the supporting surface of the L-shaped chest. In exemplary embodiments the module is made relatively movable by being supporting on slides or other suitable movable guides. Thus the module through movement may become slightly misaligned relative to the intermodule transport. The exemplary configuration of the intermodule transport compensates for such misalignment.

Figure 23:
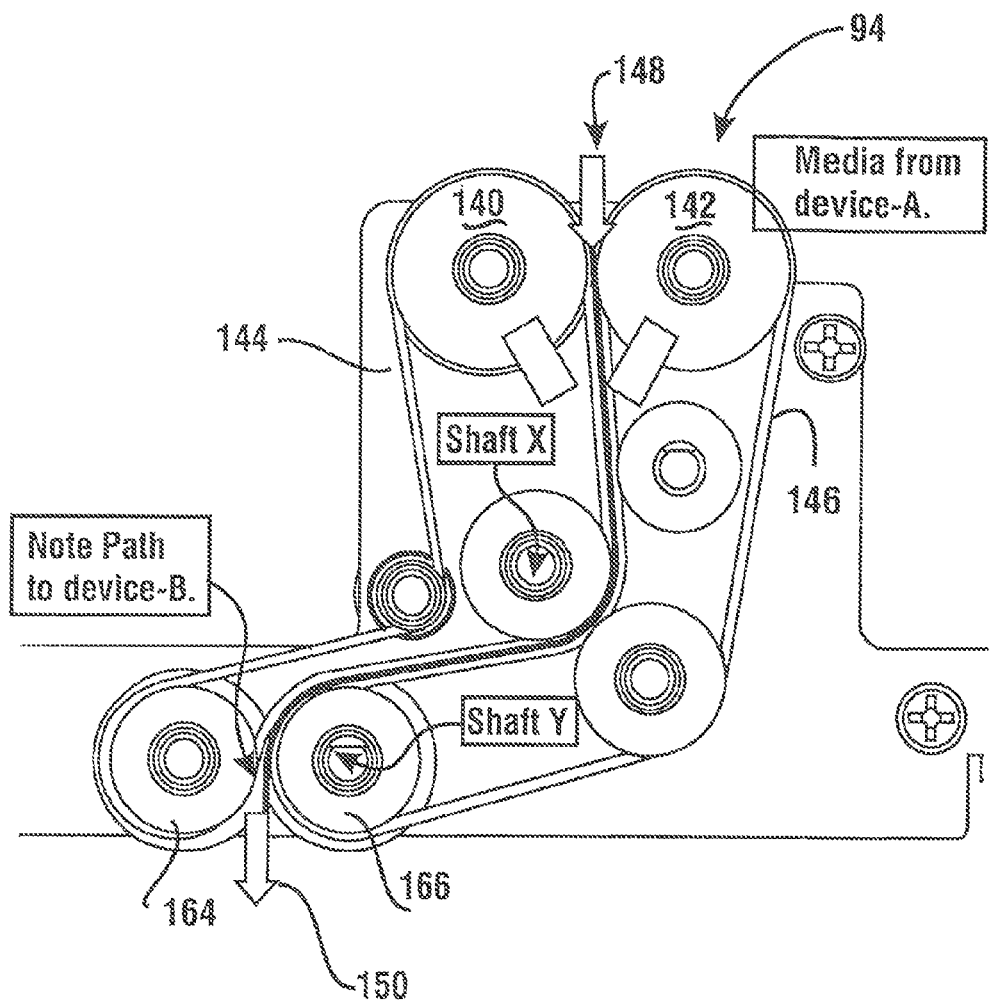
FIG. 23 is a schematic view of an intermodule sheet transport.
Figure 24:
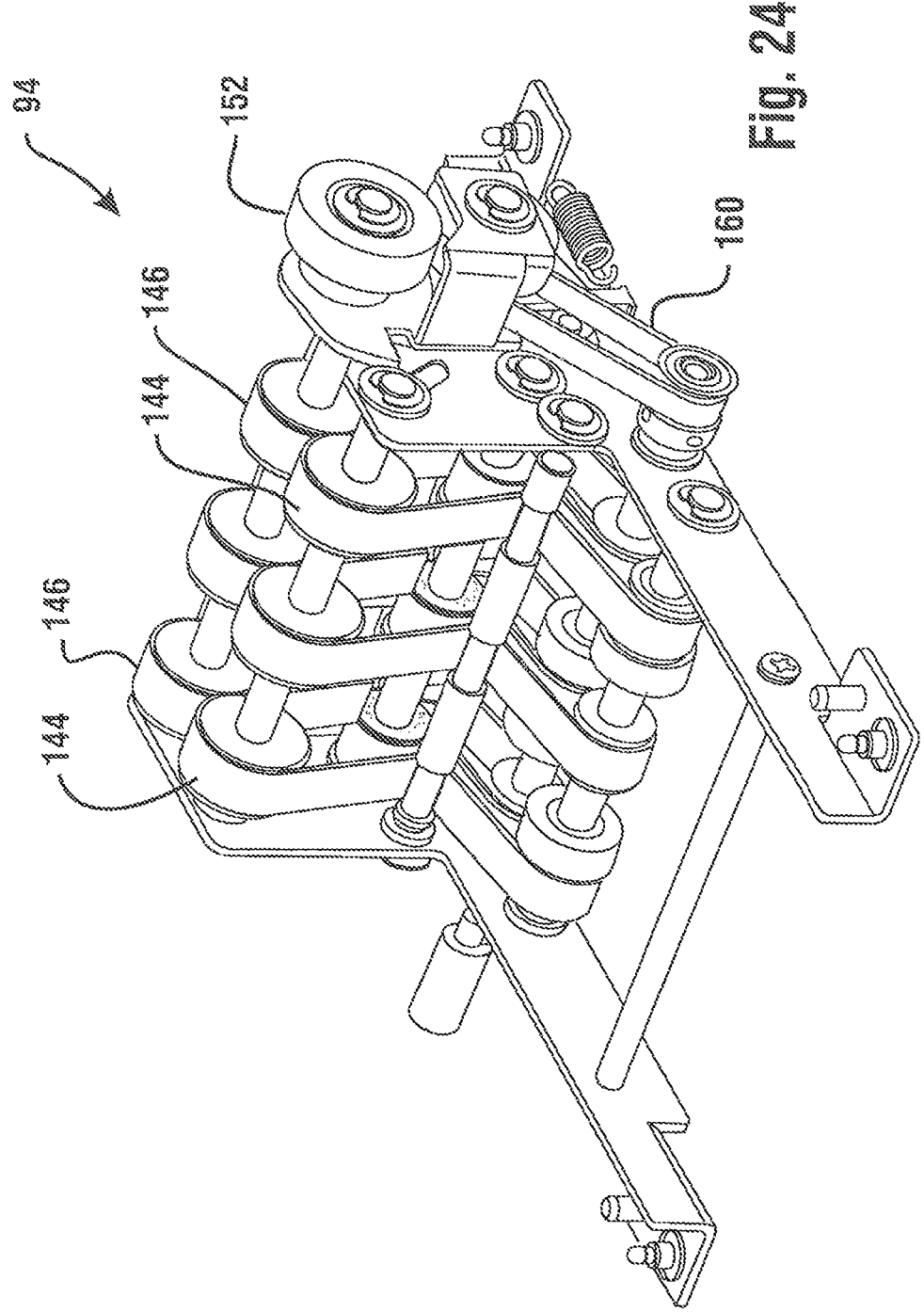
FIG. 24 is an isometric view of the intermodule sheet transport shown in FIG. 23.
Figure 26:
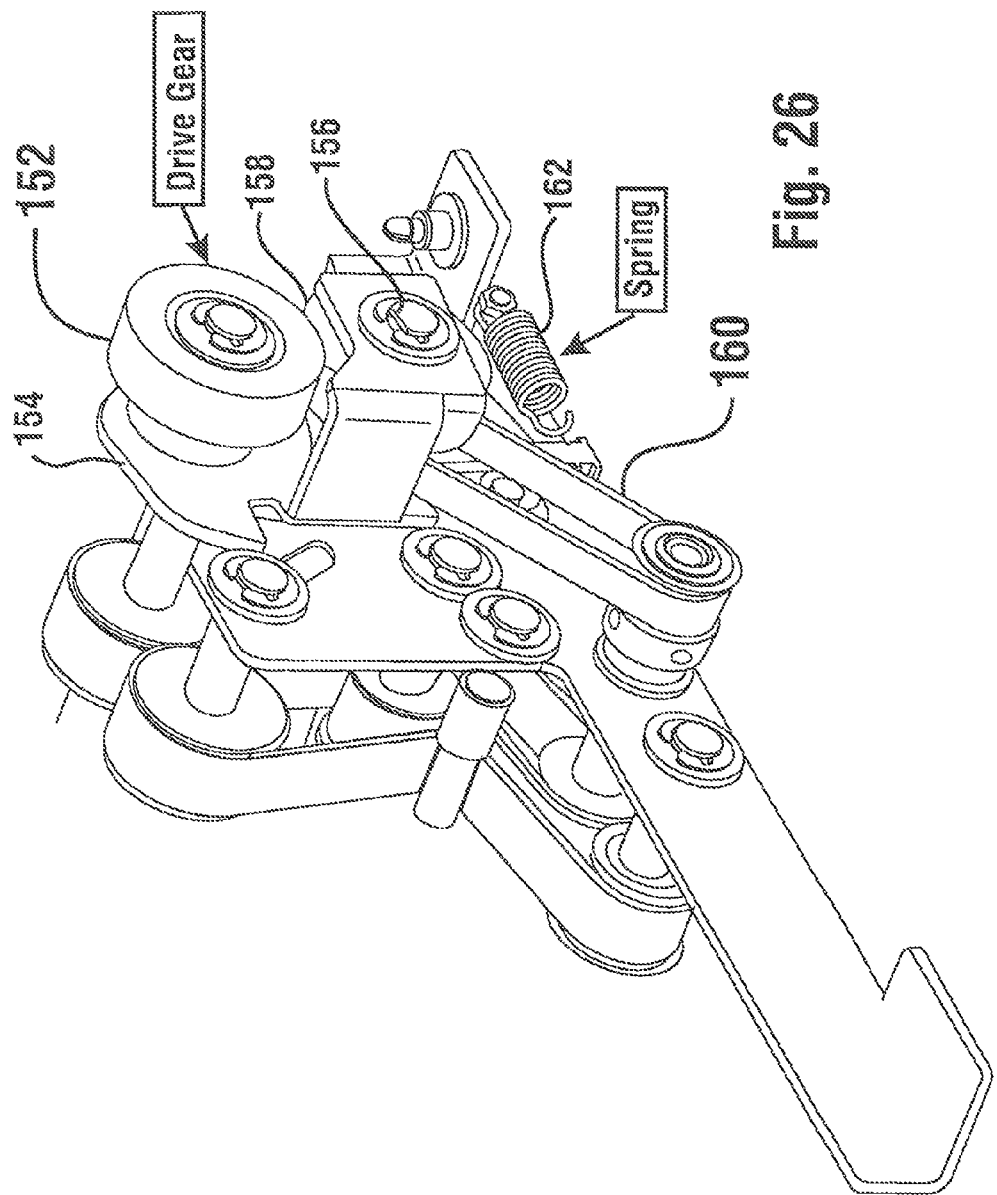
FIG. 26 is an enlarged view of the intermodule sheet transport and drive gear.

Further in the exemplary embodiment the intermodule transport includes a drive gear 152. The drive gear 152 is operative to engage a mating gear on the currency evaluation module 44. The mating gear on the currency evaluation module operates to provide power in the form of rotational movement to the drive gear of the intermodule transport. Thus the currency evaluation module is able to control the transport of sheets mechanically through the intermodule transport. Due to the potential variance in position of the currency evaluation module, the exemplary drive gear 152 is mounted in supporting connection with a rotatable support 154. The rotatable support 154 is rotatable about a shaft 156 as best shown in FIG. 26. Also supported in rotatable connection with shaft 156 is a driven gear 158. Due to this mounting structure drive gear 152 is rotatable about driven gear 158. The driven gear 158 is in operative connection with a pulley which drives a belt 160 which in turn drives the belts 144, 146 of the intermodule transport. A spring 162 is operative to bias the rotatable support 154 in a counterclockwise direction as shown in FIG. 23. In the exemplary embodiment when the currency evaluation module is moved inward into the housing of the machine, the gear thereon engages drive gear 152 and moves it clockwise with the rotatable support against the force of the spring 162. As can be appreciated the position in which the currency evaluation module is placed in position for operation can be varied somewhat linearly as long as the drive gear 152 is engaged with the mating gear on the module. Thus a relatively large amount of variance in the operative position of the module may occur while still providing effective operation of the intermodule transport. Of course this approach is exemplary, and in other embodiments other approaches may be used.

Figure 27:
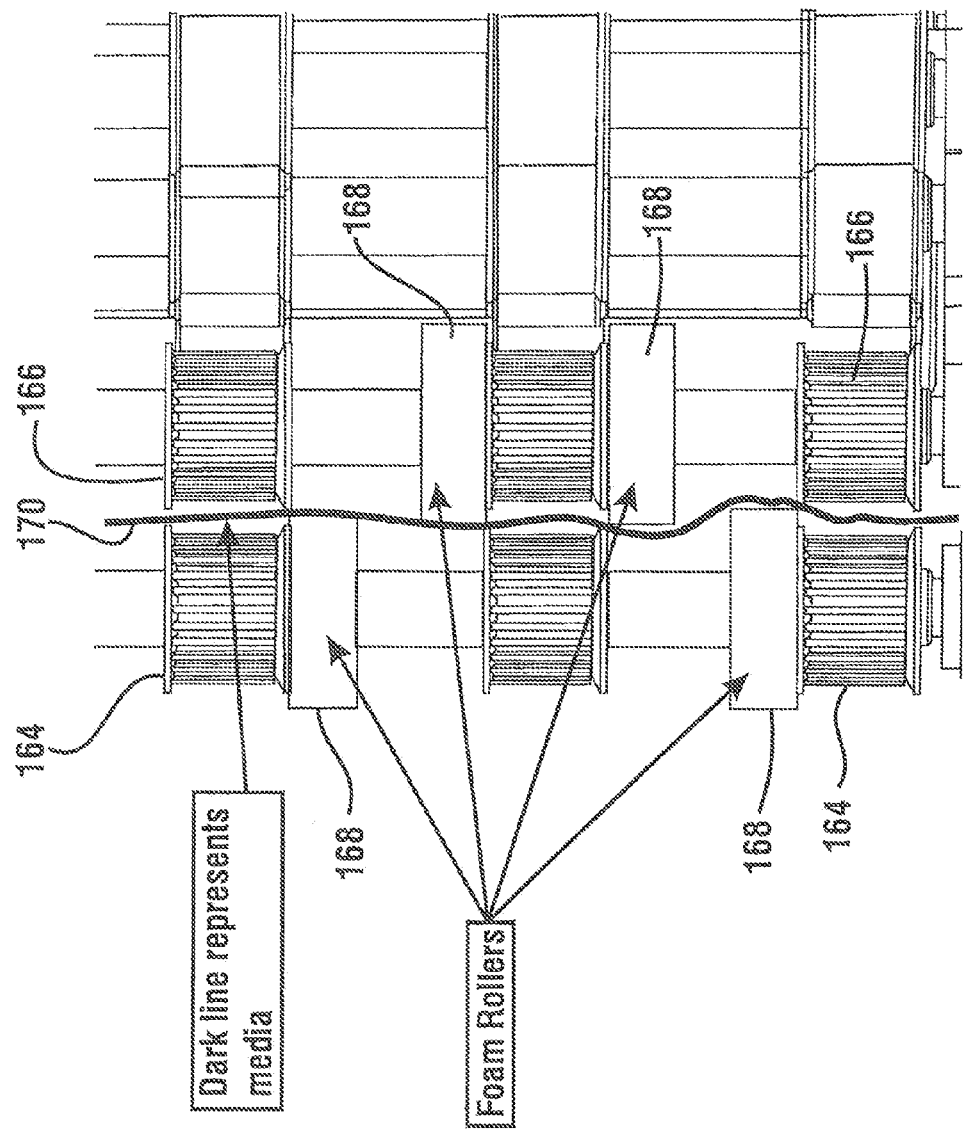
FIG. 27 is a schematic view showing the orientation of sheets passing out of the intermodule transport.

The exemplary intermodule transport further includes outlet rolls 164, 166. Outlet rolls 164 and 166 are operative to support belts 144 and 146 and engage bills that pass from the outlet 150. In the exemplary embodiment rolls 164 are supported on a relatively movable shaft which is biased toward engagement with rolls 166. Further in the exemplary embodiment outlet rolls 164 and 166 have foam rollers 168 positioned adjacent thereto on the roller support shafts. As best shown in FIG. 27 the foam rollers are operative to impart a cross-sectional wave configuration to sheets such as sheet 170 which pass therethrough. This cross-sectional wave configuration provides rigidity to the sheets to facilitate movement of the sheets from the outlet 150 and into the opening 172 at the top of sheet directing assembly 96. Of course this approach is exemplary, and in other embodiments other approaches may be used.

FIGS. 11 through 14 show an exemplary embodiment of sheet stacking container 98. It should be understood that in the exemplary embodiment sheet stacking container 100 is generally constructed in a manner similar to container 98 but is a mirror image thereof. Container 98 includes a body 174. The exemplary body is comprised of plastic, aluminum or other material that enables sensing magnetic fields therethrough. Body 174 includes a front opening 176. In exemplary embodiments opening 176 may be selectively closed by one or more doors 178 schematically shown in FIG. 12. In addition in the exemplary embodiment the door 178 includes a lock 180 so that only authorized persons are enabled to gain access to the sheet holding compartment generally indicated 182 that is within the interior area of the body.

Figure 12:
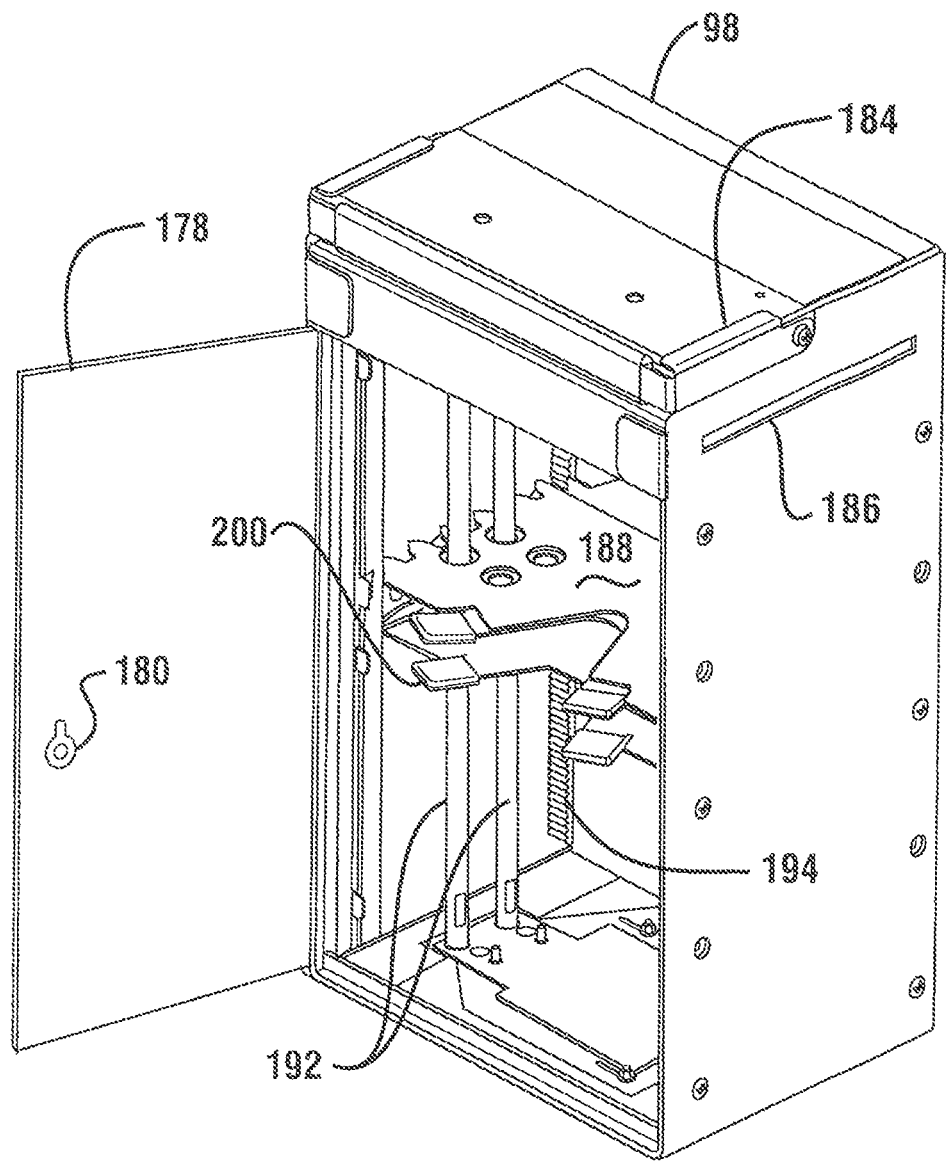
FIG. 12 is an opposite hand isometric view of the sheet holding container shown in FIG. 11.
Figure 13:
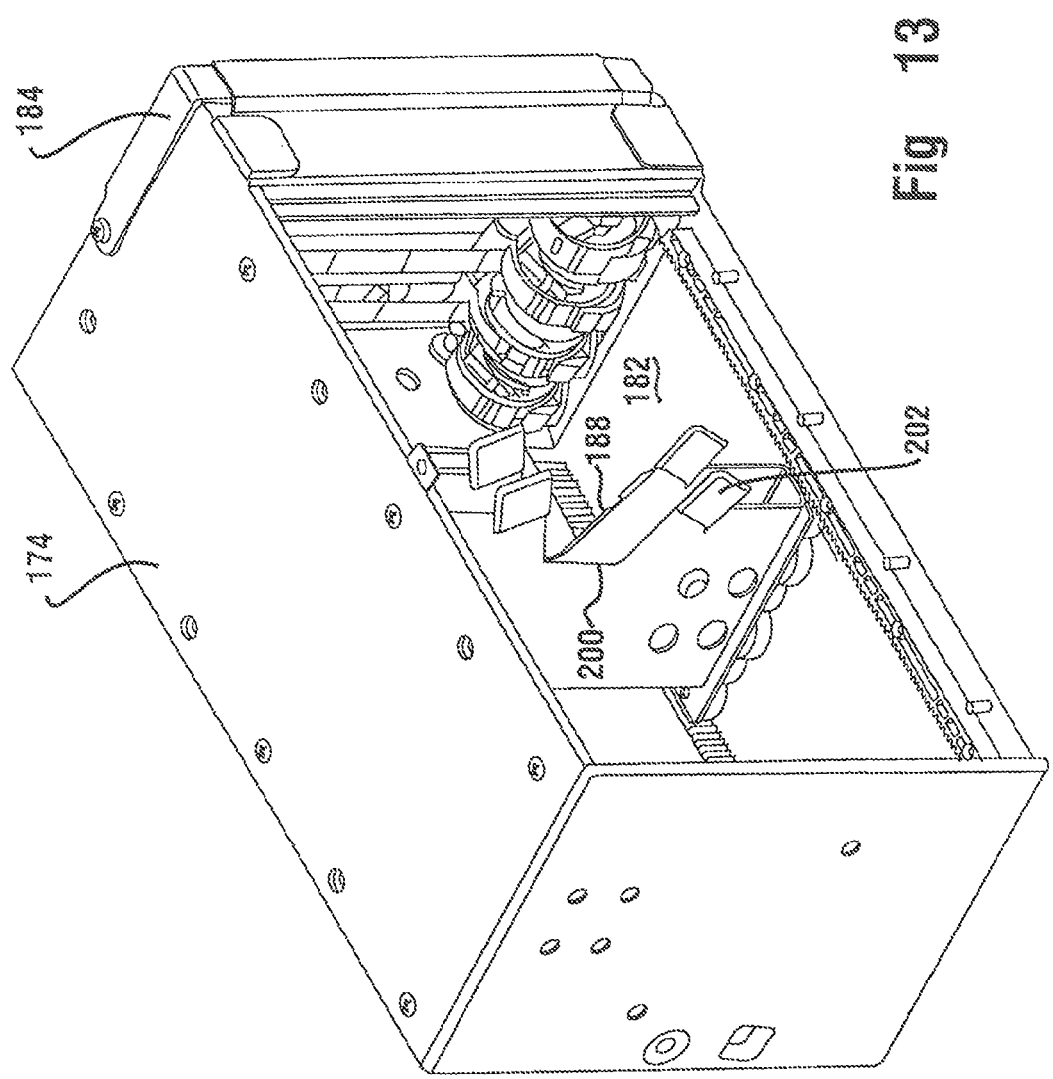
FIG. 13 is a bottom isometric view of the sheet holding container.

The exemplary container further includes an external handle 184. Handle 184 is a rotating handle that can be lifted to facilitate removal of the container 98 from engagement with tray 112. In addition as best shown in FIG. 12 container 98 includes an opening 186. Opening 186 enables sheets from the sheet directing assembly 96 to pass inwardly into the sheet holding compartment of container 98.

Figure 15:
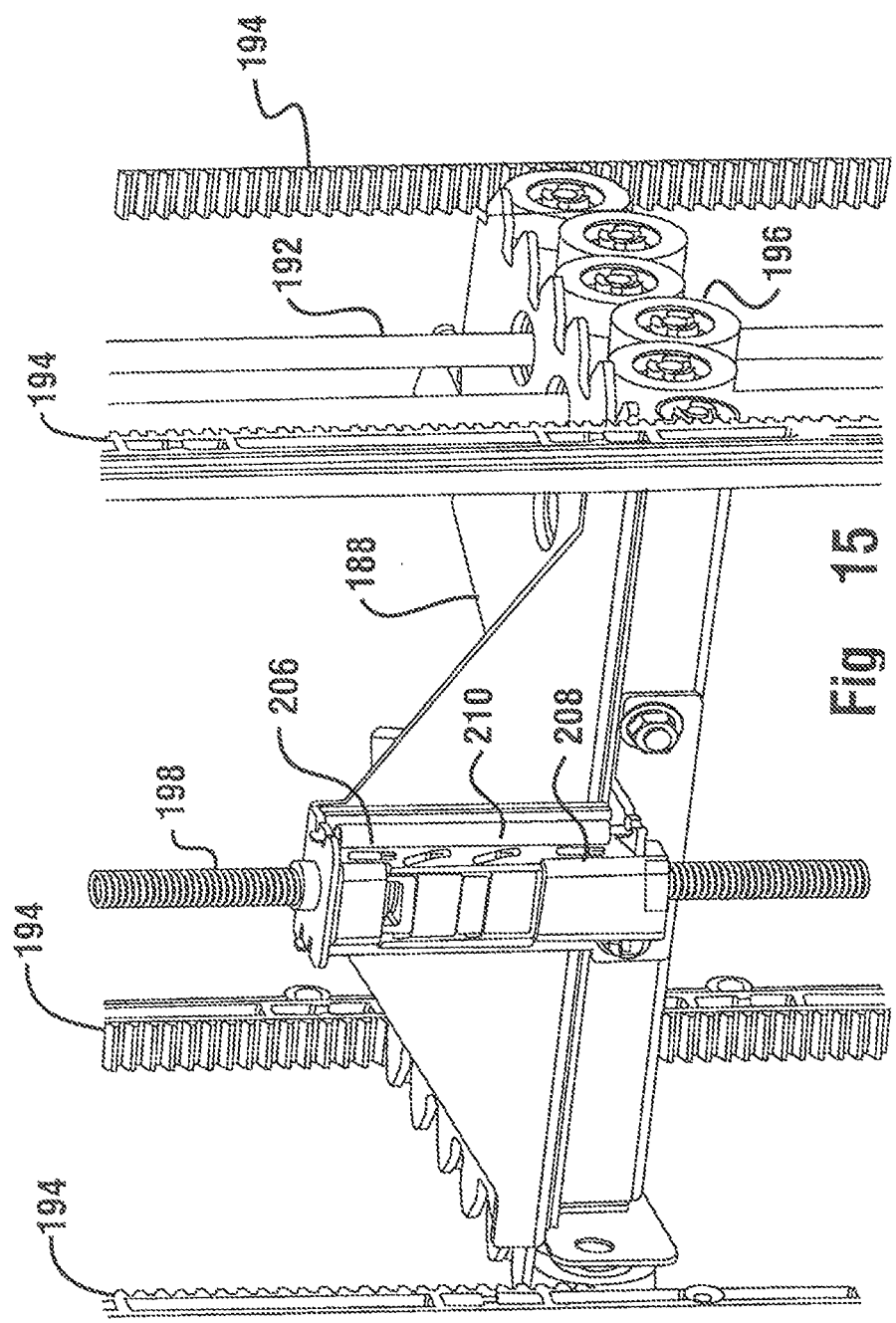
FIG. 15 is a back isometric view of the stack support plate within the sheet holding container.
Figure 16:
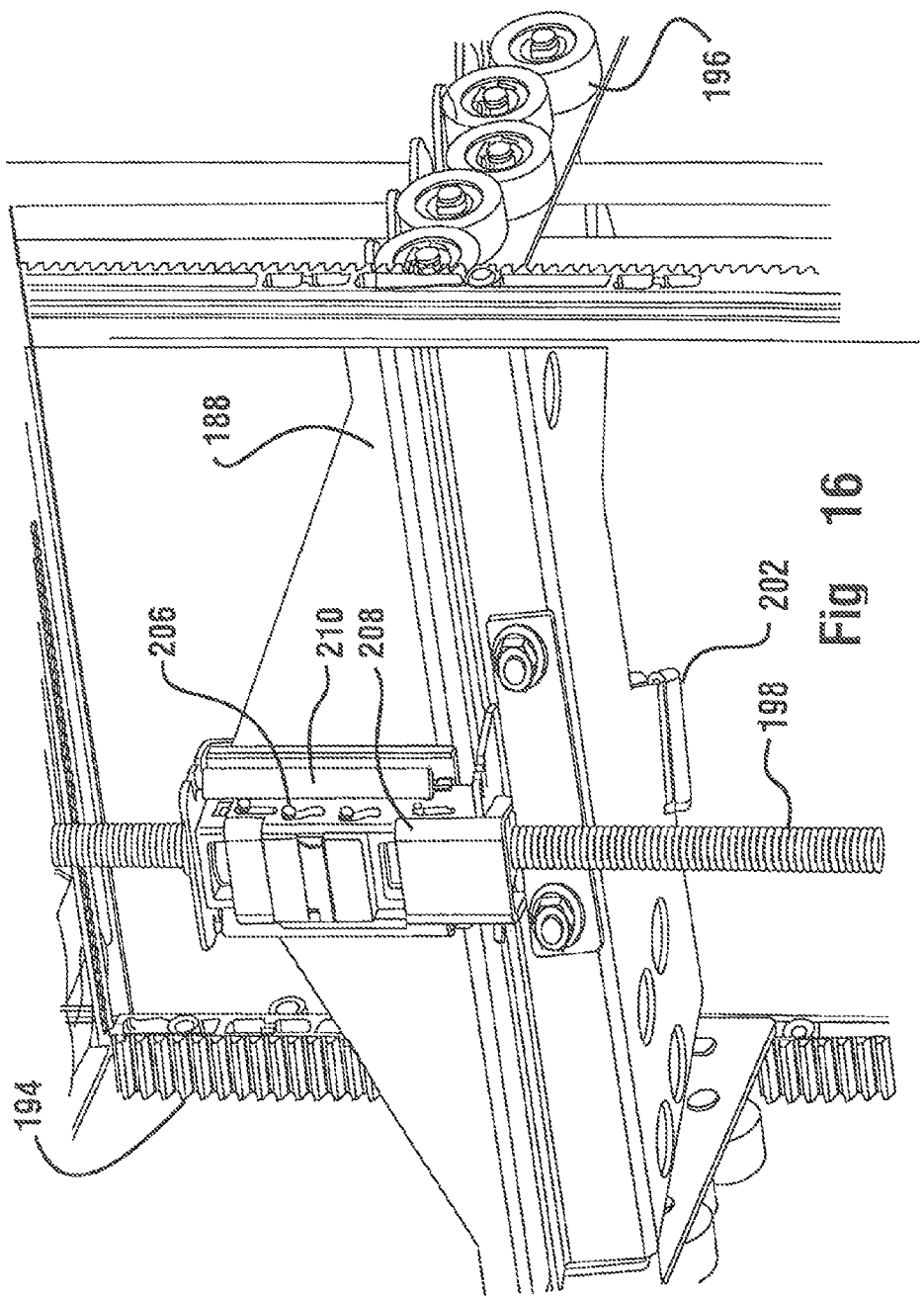
FIG. 16 is an opposite hand back isometric view of the stack support plate within the exemplary sheet holding container.

The exemplary container 98 includes a sheet supporting plate 188. Plate 188 is operative to support a stack of sheets in supporting connection therewith above the plate. The plate 188 includes openings therethrough 190. Support rods 192 extend through the openings 190. As best shown in FIGS. 15 and 16 two pairs of spaced gear racks 194 extend within the container. Each pair of gear racks engage a set of gears 196. Gear sets 196 operatively extend between each pair of gear racks 194 at each lateral side of the plate 188. At least one of the gears in each gear set on a lateral side of the plate 188 is connected through a shaft to another gear included in the gear set on an opposed side of plate 188. As a result the connected gear sets constrain the plate 188 to move in a uniform and level manner in a direction perpendicular to the gear racks.

Figure 17:
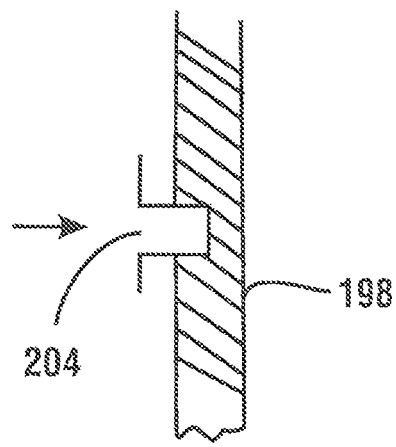
FIG. 17 is a schematic view of a nut portion engaged with a drive screw operative to move the stack support plate.

As shown in FIGS. 16 and 17 the exemplary plate 188 is in operative connection with an internal drive. The drive includes a rotatable screw 198. The drive which includes the screw also includes at least one gear which is engageable through a wall in the cassette with a driving gear outside the cassette as later discussed. As a result the drive within the cassette is able to move the plate selectively within the interior of the container responsive to rotation of the screw 198.

In the exemplary embodiment the plate is in operative connection with a manually actuatable lever 200. In exemplary embodiments the manually actuatable lever 200 is positioned below the plate. The lever 200 includes outward extending tabs 202 which can be displaced toward the plate 188.

Figure 18:
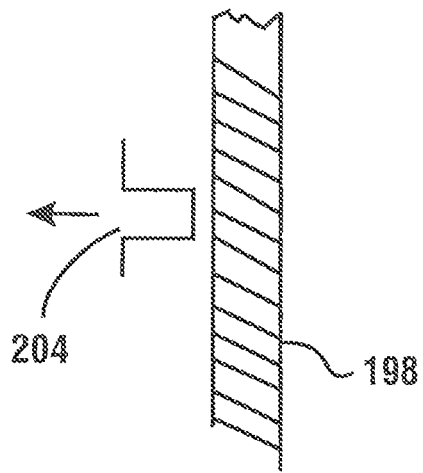
FIG. 18 is a schematic view similar to FIG. 17 but showing the nut portion disengaged from the drive screw.

Displacement of the lever 200 through movement of the tabs is operative to change the engaged relation of a plate and the drive. This is done in the exemplary embodiment as schematically represented in FIGS. 17 and 18. In the exemplary embodiment a nut portion 204 is biased to engage screw 198 of the drive. Nut portion 204 of the exemplary embodiment includes a half nut with threads thereon that are configured to engage the threads of the screw. As a result when the nut portion 204 and the screw 198 are engaged the plate moves in response to rotation of the screw. Likewise when the screw is stationary the plate is likewise held in a fixed position. Moving the tabs 202 of the lever 200 toward the plate 188 causes the nut portion 204 to move so as to disengage the screw 198.

This is schematically represented in FIG. 18. As a result the plate 188 can be selectively positioned within the interior of the container. Thus for example in situations where a servicer may wish to remove a stack of accumulated sheets from within the sheet holding compartment within the container, the support plate may be moved so as to facilitate the removal of sheets from the container. Likewise after the sheets have been removed the servicer may selectively position the plate so as to put it in a position where it is closer to the opening in the container so as to be more readily positioned to accept more sheets. Of course these approaches are exemplary.

Further in the exemplary embodiment the nut portion 204 is movably supported through guide slots 206 in a bracket 208. A spring 210 operates to provide biasing force that causes the nut portion 204 to be in engagement with the screw 198 of the drive when the tabs 202 are not moved toward the plate. Of course it should be understood that this construction is exemplary, and in other embodiments other approaches may be used.

Figure 22:
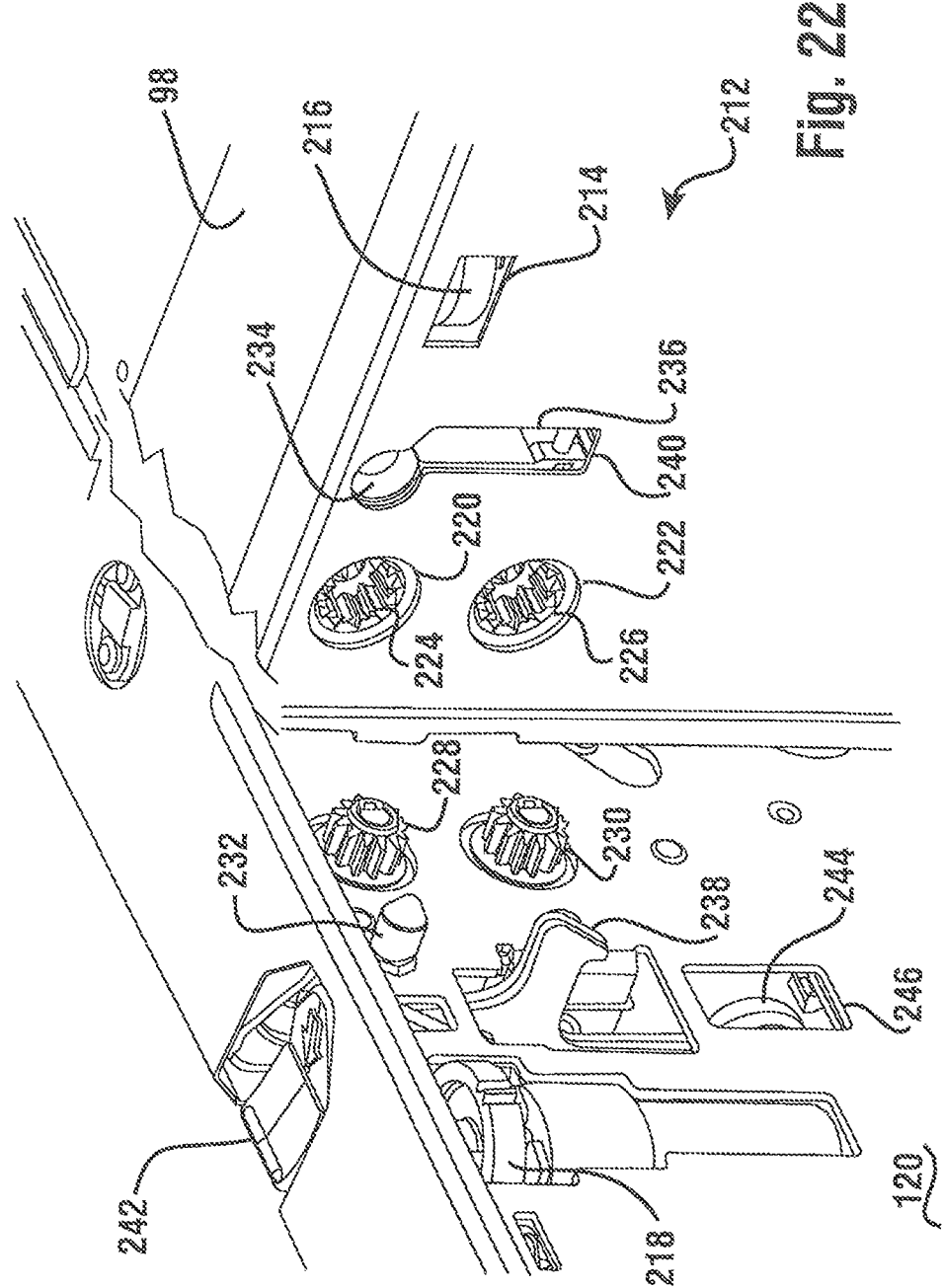
FIG. 22 is an isometric view showing the sheet holding container rotated 90 degrees from the operative position.

As shown in FIG. 22 the container 98 of the exemplary embodiment includes a rear wall 212. The rear wall includes an opening 214. Opening 214 provides access to a gear 216. Gear 216 is a part of the drive for moving the plate 188. Gear 218 in the exemplary embodiment is in operative connection with screw 198.

Opening 214 is aligned with a driving gear 218. Gear 218 extends outwardly from the back wall 120 of the tray 112. This can be appreciated from FIG. 22 in which container 98 is shown rotated 90 degrees relative to the back wall, and the sheet directing assembly is not shown for purposes of showing the mating engagement of components of the exemplary storage assembly. When the container 98 is in the operative position gear 218 engages gear 216 of the drive positioned within the cassette. The motor or other movement device which is operative to drive gear 218 can thereby relatively position plate 188 within the cassette.

Figure 19:
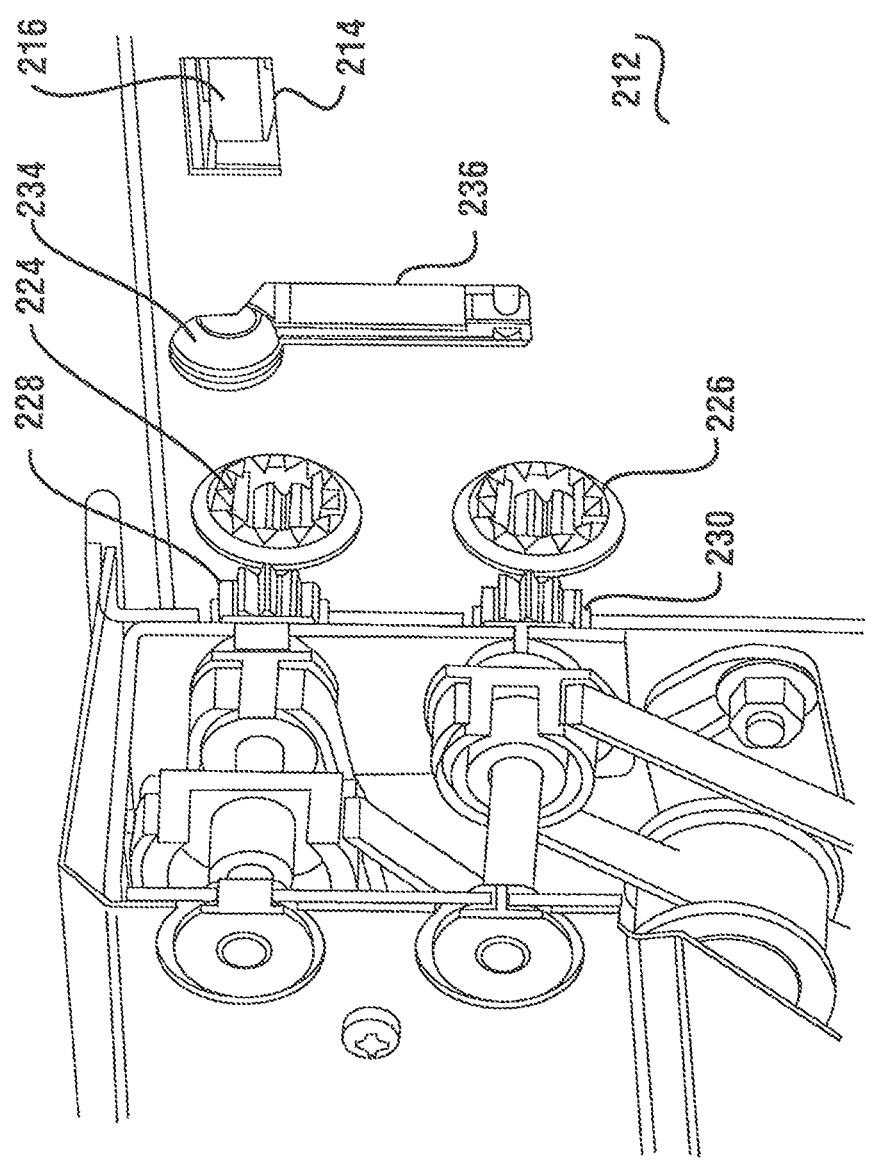
FIG. 19 is an isometric view of the drive gears of the machine and disengageable couplings of an exemplary storage container.

As is further shown in FIG. 22 rear wall 212 includes openings 220 and 222. Openings 220 and 222 each provide access to a disengageable shaft coupling 224 and 226 respectively. Shaft couplings 224 and 226 are toothed couplings which are each in respective connection with rotatable shafts that extend in the container for purposes which are later explained. In the operative position of the container 98, coupling 224 is operatively engaged with a rotatable drive gear 228 and coupling 226 is engaged with a drive gear 230. Drive gears 228 and 230 are selectively rotatable through operation of one or more drives such as motors that operate responsive to signals received from the terminal controller. The engagement of the drive gears and couplings is further represented in FIG. 19.

In the exemplary embodiment an aligning projection 232 extends outward from back wall 120. The aligning projection is configured to engage in mating relation an alignment recess 234 in the rear wall 212 of container 98. In the exemplary embodiment the aligning projection and recess engage prior to the gears and facilitate the mating engagement thereof as the rear wall of the container is brought into close proximity with the back wall 120 of the tray. Of course this approach is exemplary, and in other embodiments other approaches may be used.

The exemplary container 98 further includes a latching recess 236. The latching recess 236 is sized for engaging a latching finger 238. The latching finger 238 is biased to extend in a downward position and to positively engage and hold the container 98 in an operative position such that gears 218 and 216 are engaged and drive gears 228 and 230 are engaged with couplings 224 and 226. In the exemplary embodiment the latching finger 238 is operative to biasingly engage a latch member 240 which is accessible through the latching recess 236. In the exemplary embodiment once the latching finger 238 engages the latch member the container 98 is held in the operative position.

In the exemplary embodiment a manually engageable release lever 242 is in operative connection with the latching finger 238. Relative downward movement of the release lever 242 in the configuration shown is operative to cause the latching finger 238 to move upward so as to disengage from the latch member of the container. Further in the exemplary embodiment a leg portion 244 is also in operative connection with the release lever. Movement of the release lever to disengage the latch member is further operative to cause the leg portion to move outward through an opening 246 in the back wall 120. In the exemplary embodiment the leg portion 244 operates to push against rear wall 212 of the container. This along with the action of the leaf springs 122 on the tray is operative to cause the upper portion of the container to be moved away from the back wall 120. As a result the handle 184 can be readily lifted and the container moved upward to disengage from the tray.

Likewise when the container is to be engaged in position the container may be placed in supporting connection with the tray and the upper portion of the container moved toward the back wall 120 until the latching finger 238 engages the latch. Once the container has been moved to this position and the tray is moved inward into the operative position within the secure chest, the container is ready for operation. Of course as can be appreciated, in the exemplary embodiment the safe door of the chest must be opened by authorized personnel before the tray 112 can be extended therefrom so as to enable access to the containers 98 and 100 so that the containers may be removed or installed. Of course these approaches are exemplary, and in other embodiments other approaches may be used.

Figure 14:
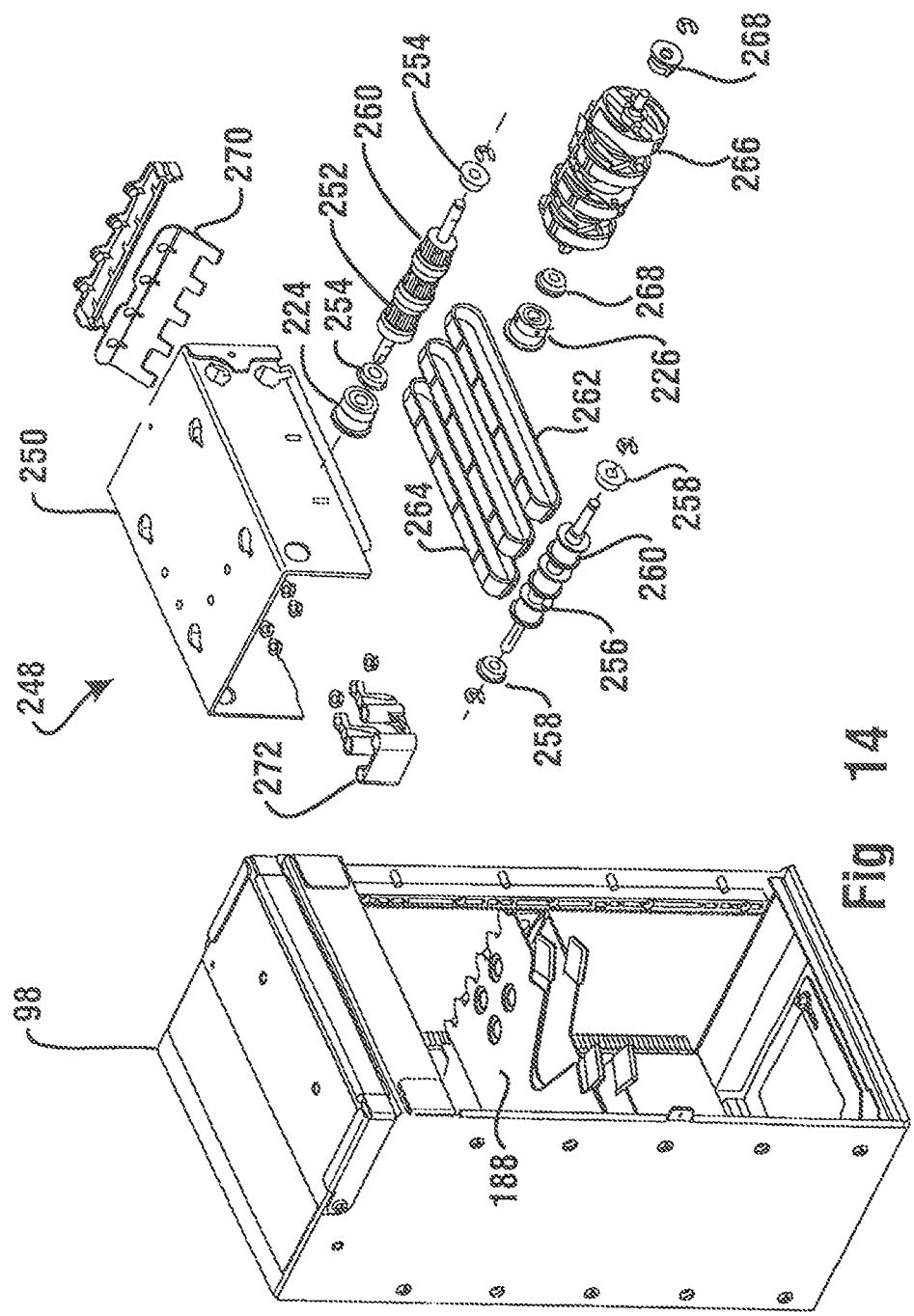
FIG. 14 is a further isometric view of the sheet holding container including an exploded view of the sheet stacking components.

As shown in FIG. 14 cassette 98 further includes a sheet stacking assembly generally indicated 248 in the interior thereof. In the exemplary embodiment the sheet stacking assembly 248 includes a support frame 250. Frame 250 is operative to support a flip shaft assembly 252 which is rotatable in bearings 254 which extend in openings from the frame. The releasable coupling 224 is in operative connection with the flip shaft assembly 252.

An idler shaft assembly 256 is supported on bearings 258 that extend in openings in frame 250. Each of the flip shaft assembly and idler shaft assembly include corresponding rollers 260. Each of rollers 260 support a corresponding continuous belt 262. Belts 262 in the exemplary embodiment include outward extending cleats 264 thereon. In the position shown a lower belt flight of each of belts 262 extend in facing relation with plate 188.

The exemplary sheet stacking assembly further includes a stacker wheel assembly 266. Stacker wheel assembly 266 is rotatable in bearings 268 which extend in corresponding openings in frame 250. The releasable coupling 226 is in operative connection with stacker wheel assembly 266 and is operative to cause rotation thereof.

The exemplary embodiment further includes within the container a guide 270. Guide 270 includes fingers that are operative to direct sheets which move into the opening 186 in the container for purposes that are later discussed. The interior of the container also includes a bracket 272 which is operative to hold the support rods 192 previously discussed. Of course it should be understood that these structures are exemplary and in other embodiments other structures and approaches may be used.

Figure 47:
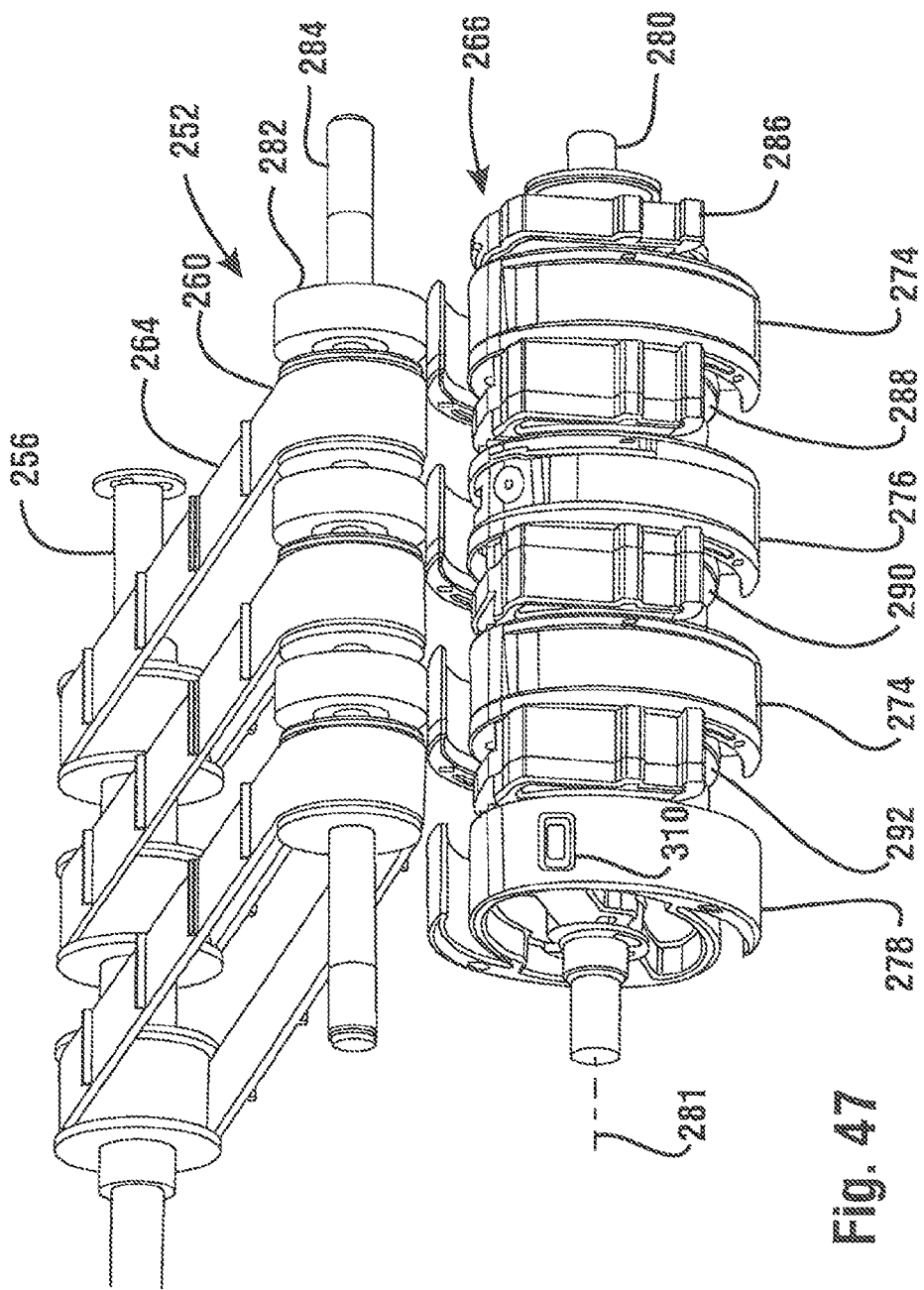
FIG. 47 is an isometric view of the stacker wheel assembly and belt and roller system for moving and stacking sheets in a sheet storage container.
Figure 48:
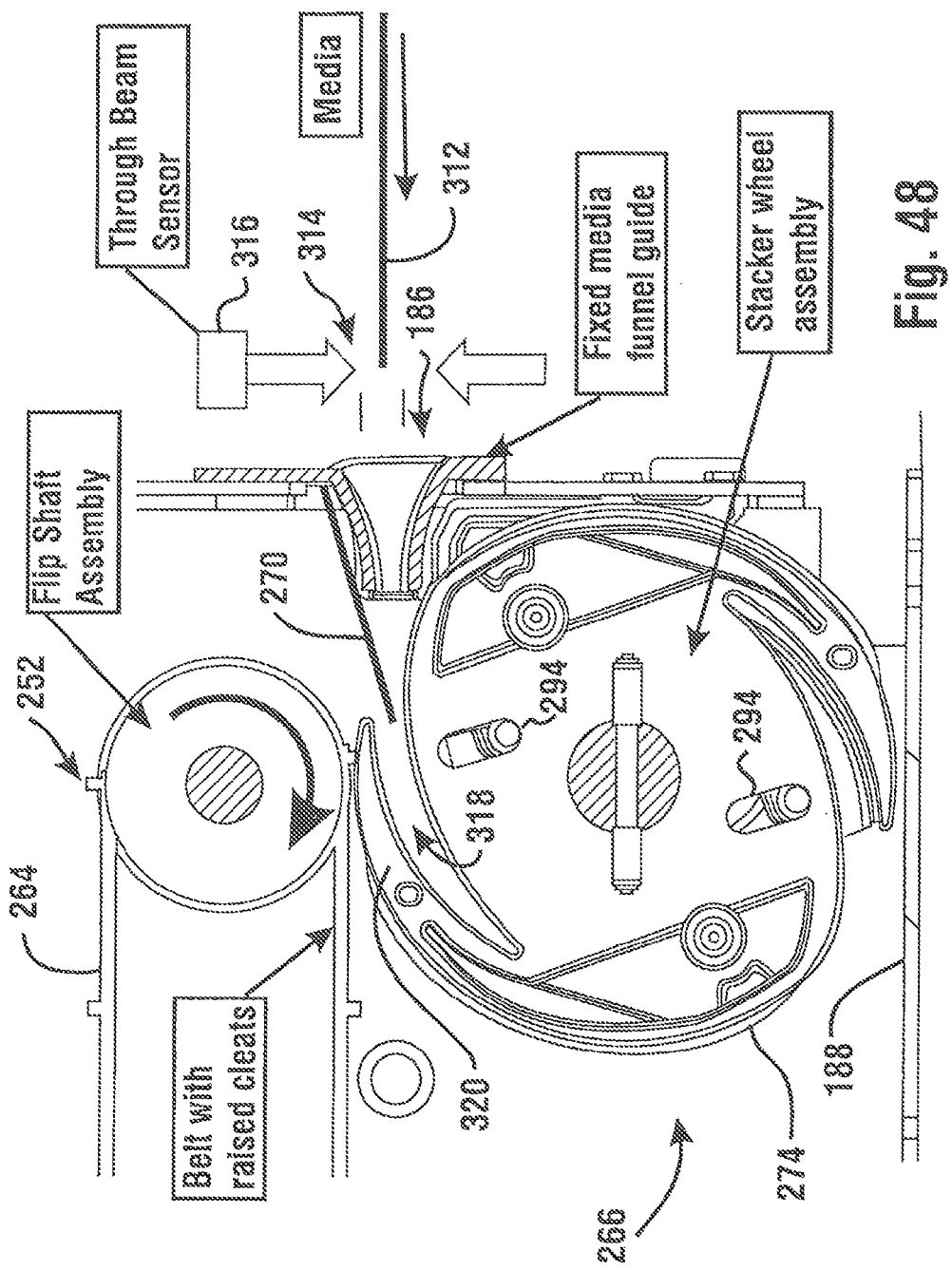
FIGS. 48 through 51 are side schematic views representative of the operation of a rotating gripping member operating to engage and release the sheet and place it in aligned relation with a stack within the sheet holding container.

FIG. 47 shows the exemplary embodiment of stacker wheel assembly 266, flip shaft assembly 252, idler shaft assembly 256 and belts 264. As can be seen the stacker wheel assembly 266 includes a plurality of rotating members. In the exemplary embodiment the rotating members include a pair of gripper members 274. The rotating members further include a sensing member 276. The stacker wheel assembly further includes an indicating member 278. Each of the rotating members 274, 276 and 278 are in operatively fixed connection with a common shaft 280 which extends along an axis 281 and is selectively rotatable through coupling 226.

The exemplary flip shaft assembly 252 includes the pulleys 260 which support belts 264 thereon. In addition in the exemplary embodiment the flip shaft assembly includes three deformable rollers 282. In the exemplary embodiment the deformable rollers are comprised of foam material. However, in other embodiments other materials as well as other relatively deformable structures may be used. The deformable rollers 282 and pulleys 260 are in operatively fixed connection with a common shaft 284 that is rotated through coupling 224. As can be seen, in the exemplary embodiment the belts 264 extend in intermediate relation between adjacent rotating members. The deformable rollers 282 are positioned so as to be aligned with rotating members and in some angular positions of the rotatable members are biased toward an engaged position with the adjacent rotatable members.

Figure 46:
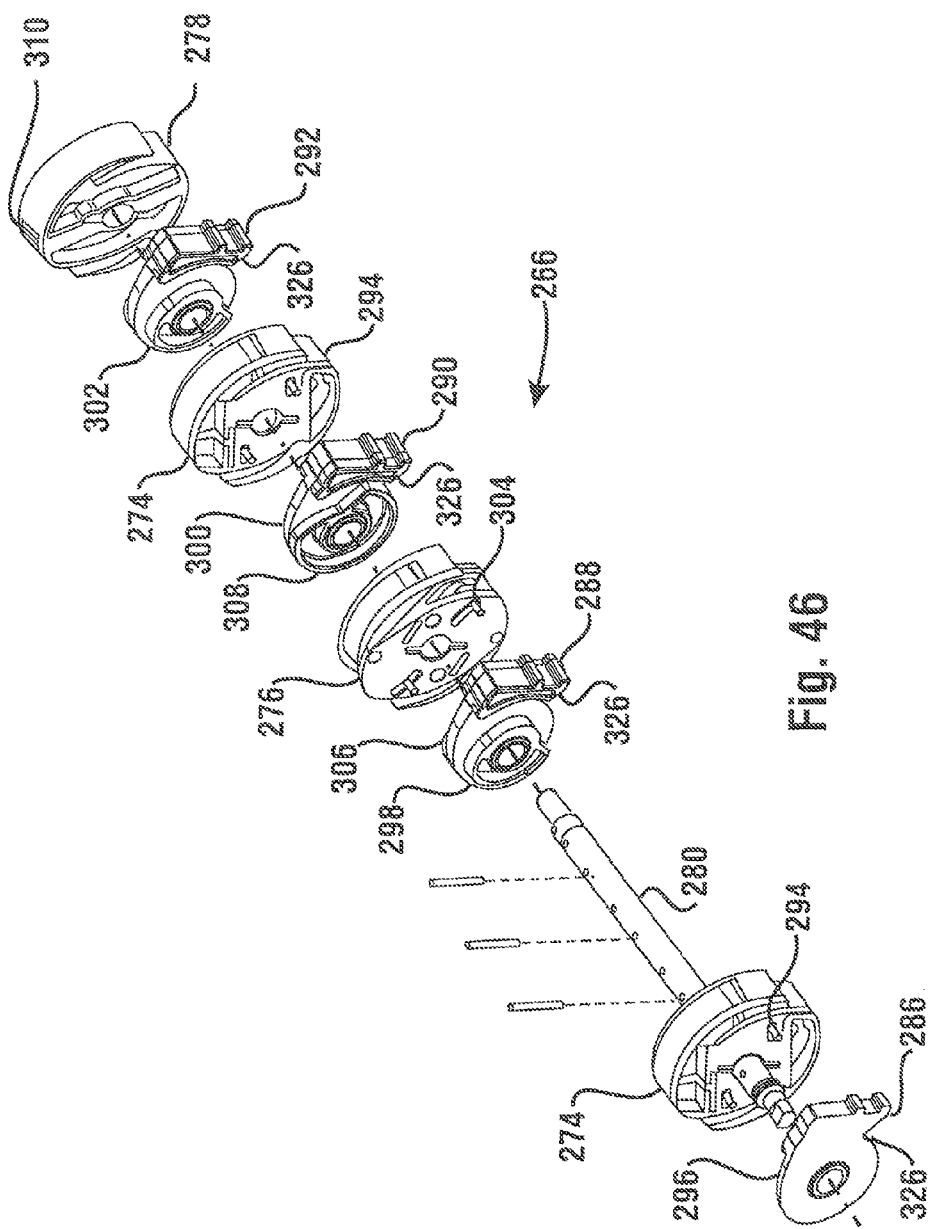
FIG. 46 is an isometric exploded view of the stacker wheel assembly shown in FIG. 45.

In the exemplary embodiment stationary members 286, 288, 290 and 292 extend between the rotating members. Each of the stationary members have cams supported thereon. The cams which comprise surfaces of the members operate to control movable components of the respective adjacent rotating members in a manner that is later discussed in detail. Further as shown in FIG. 46 gripper members 274 include cam followers 294 which extend laterally outward from each side thereof. The cam followers engage adjacent cams 296, 298 in the case of one gripper member 274, and cams 300 and 302 in the case of another gripper member. Likewise sensing member 276 includes cam followers 304 that extend generally axially outward therefrom and engage cams 306 and 308 that extend on opposed sides thereof. Of course it should be understood that these approaches are exemplary and in other embodiments other approaches may be used.

In the exemplary embodiment indicating member 278 includes a pair of indicating element portions 310. Indicating element portions in the exemplary embodiment comprise magnetic elements which are embedded in diametrically opposed positions on the periphery of the indicating member 278.

In the exemplary embodiment a contactless sensor such as a Hall effect sensor is positioned outside of the container on a face of the sheet directing assembly 96. In the operative position of the container the Hall effect sensor is operative to sense the varying magnetic field caused as the magnet passes in proximity to the Hall effect sensor. Further in the exemplary embodiment the poles of each magnetic element are at opposed positions tangentially to an outer circumferential surface of the indicating member. This facilitates sensing the movement of the magnetic element as it passes the adjacent sensor. Thus in the exemplary embodiment the external sensor is enabled to detect in an electrically contactless manner the stacker wheel assembly in two diametrically opposed rotational positions. This avoids the need for releasible electrical connections between the removable containers and the rest of the machine. Of course this approach for detecting the rotational position of the stacker wheel assembly is exemplary and in other embodiments other approaches may be used.

FIGS. 48 through 51 show the operation of the exemplary flip shaft assembly 252 and stacker wheel assembly 256 in moving and stacking sheets. In an exemplary operation a sheet such as a currency bill 312 is directed by the sheet directing assembly 96 toward the container 98. The sheet 312 passes through an opening generally indicated 314 in the sheet directing assembly. A sensor 316 operates to sense a leading edge of the sheet 312 passing through the opening 314. In the exemplary embodiment the sensor 316 is a through beam sensor such as a photosensor that is blocked upon a leading edge of the receipt passing between an emitter and a receiver of the sensor. Of course this approach is exemplary.

Figure 49:
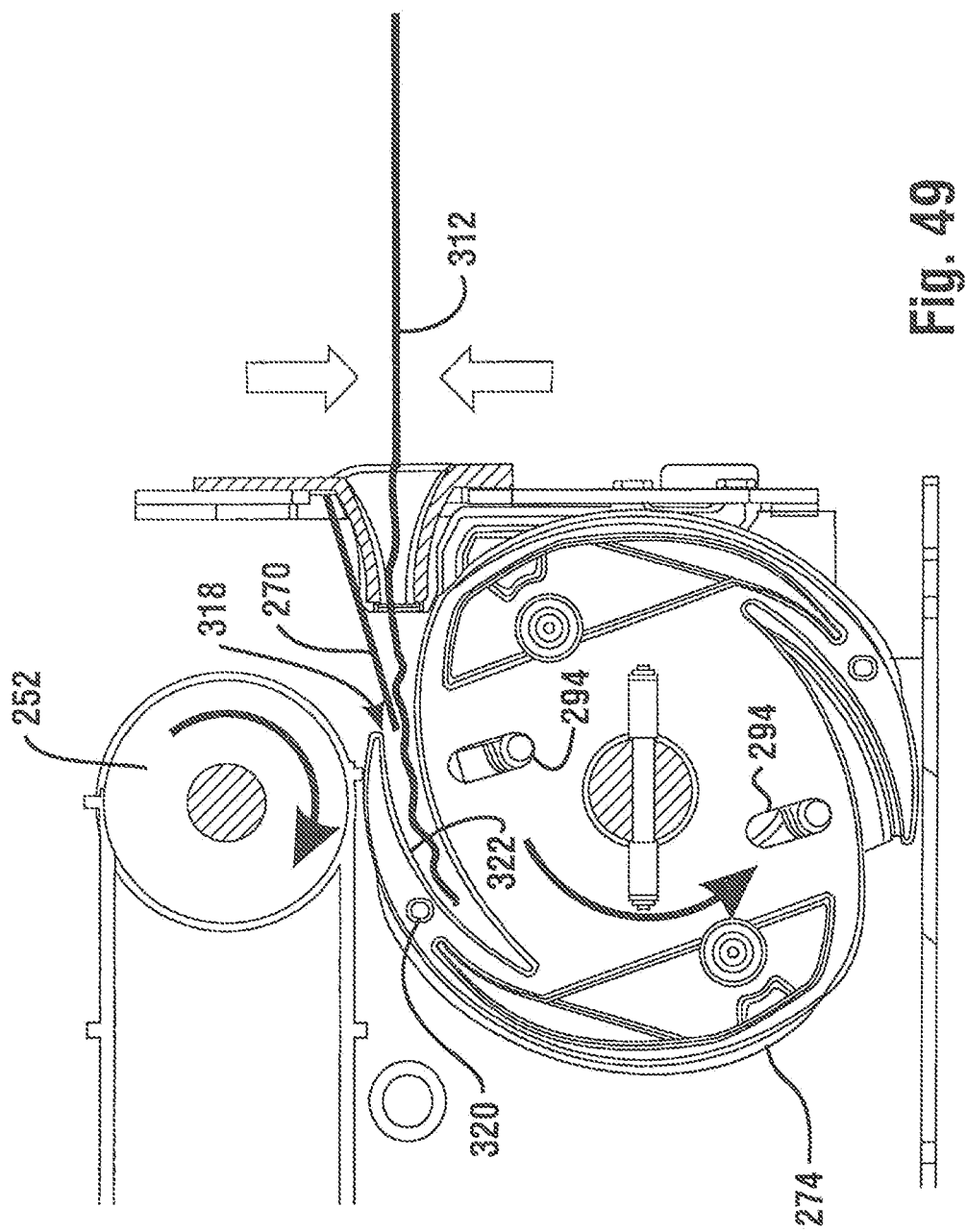

The leading edge of the sheet 312 that has been detected by the sensor 316 passes into the opening 186 of the container 98. As shown in FIG. 49 the leading edge of the sheet 312 engages the guide 270 and a portion of the sheet moves into a slot 318 which extends adjacent the periphery of gripper member 274. In the exemplary embodiment slot 318 is formed by a curved finger portion 320 which is bounded by a radially inward facing surface 322.

In the exemplary embodiment the at least one processor, based on at least one signal produced responsive to sensor 316, is operative to cause the stacker wheel assembly and gripper member 274 to begin rotating in a counterclockwise direction shown when the sheet 312 is engaged in the slot 318. The at least one processor is also operative to cause the flip shaft assembly 252 to rotate as the sheet enters the container and the flip shaft assembly continues rotating in a clockwise direction as shown as the gripper member rotates in a counterclockwise direction.

As later described in greater detail, rotation of the gripper member is operative to cause the cam followers 294 which extend on each side of the gripper member to be moved responsive to engagement of the adjacent cams. This causes a gripper portion 322 which is later described in detail to be moved radially outward and to engage the sheet 312 in the slot 318 in sandwiched relation between the radially inward extending surface 322 and the outer face of the gripper portion 322.

Figure 50:
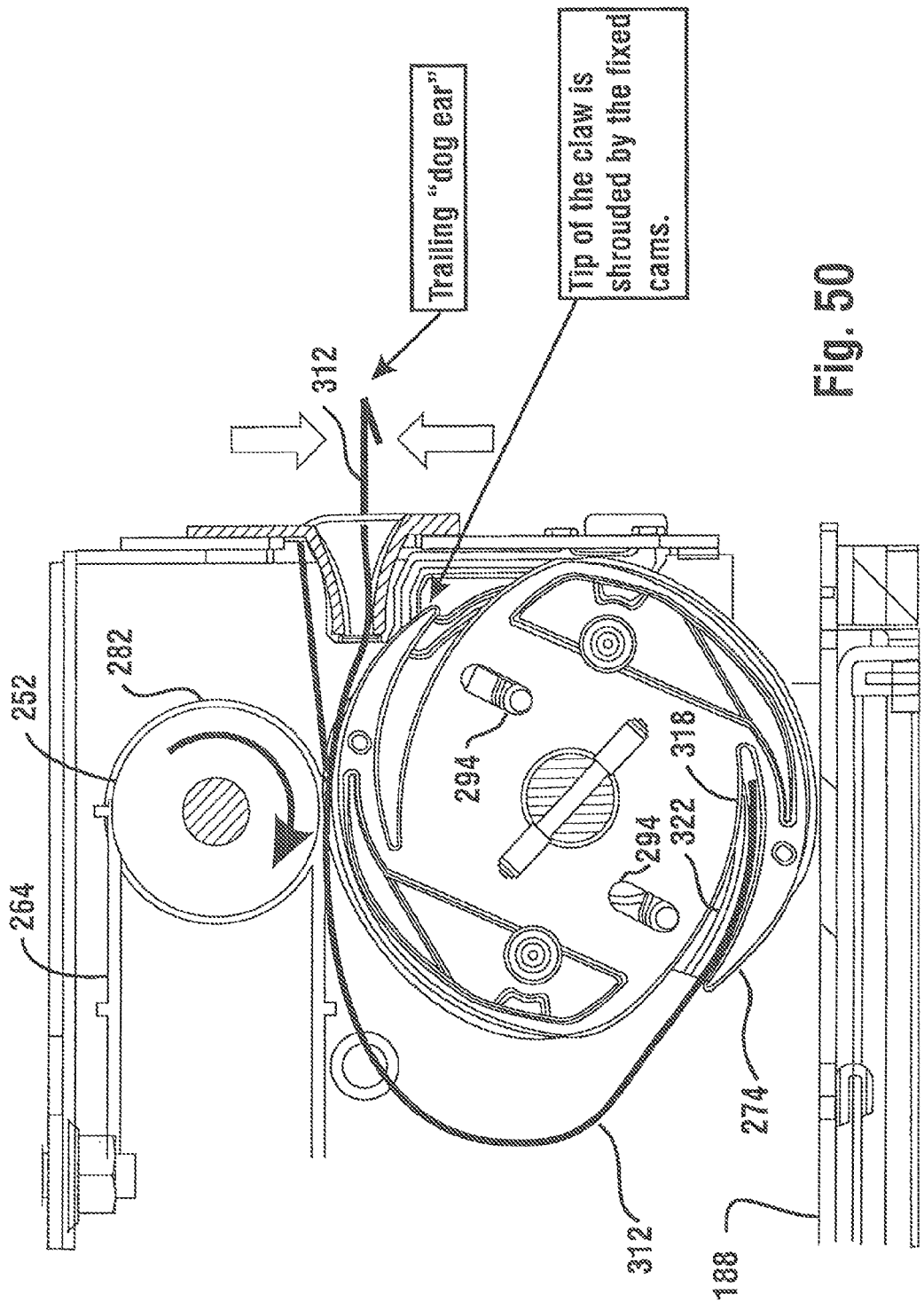

In the exemplary embodiment as the gripper member 274 rotates to the position shown in FIG. 50 the belts 264 and deformable rollers 282 engage the sheet 312 and pull it inward into the container. In the exemplary embodiment, the flip shaft assembly 252 continues rotating to move the sheet into the container, while the gripper member 274 stops rotating counterclockwise in the position shown in FIG. 50. This is done responsive to operation of the terminal controller. As can be appreciated the flip shaft assembly of the exemplary embodiment can operate to move a relatively long sheet a greater lineal distance than is caused by movement of the sheet by rotation in engagement with the gripper member. In the exemplary embodiment the terminal processor causes the flip shaft assembly to continue operating to urge the sheet to move into the container a programmed time after the trailing edge of the sheet clears the sensor. This assures that the sheet is moved entirely into the container and its trailing edge is urged by the belts to flip over into the stack. Of course this approach is exemplary.

Figure 51:
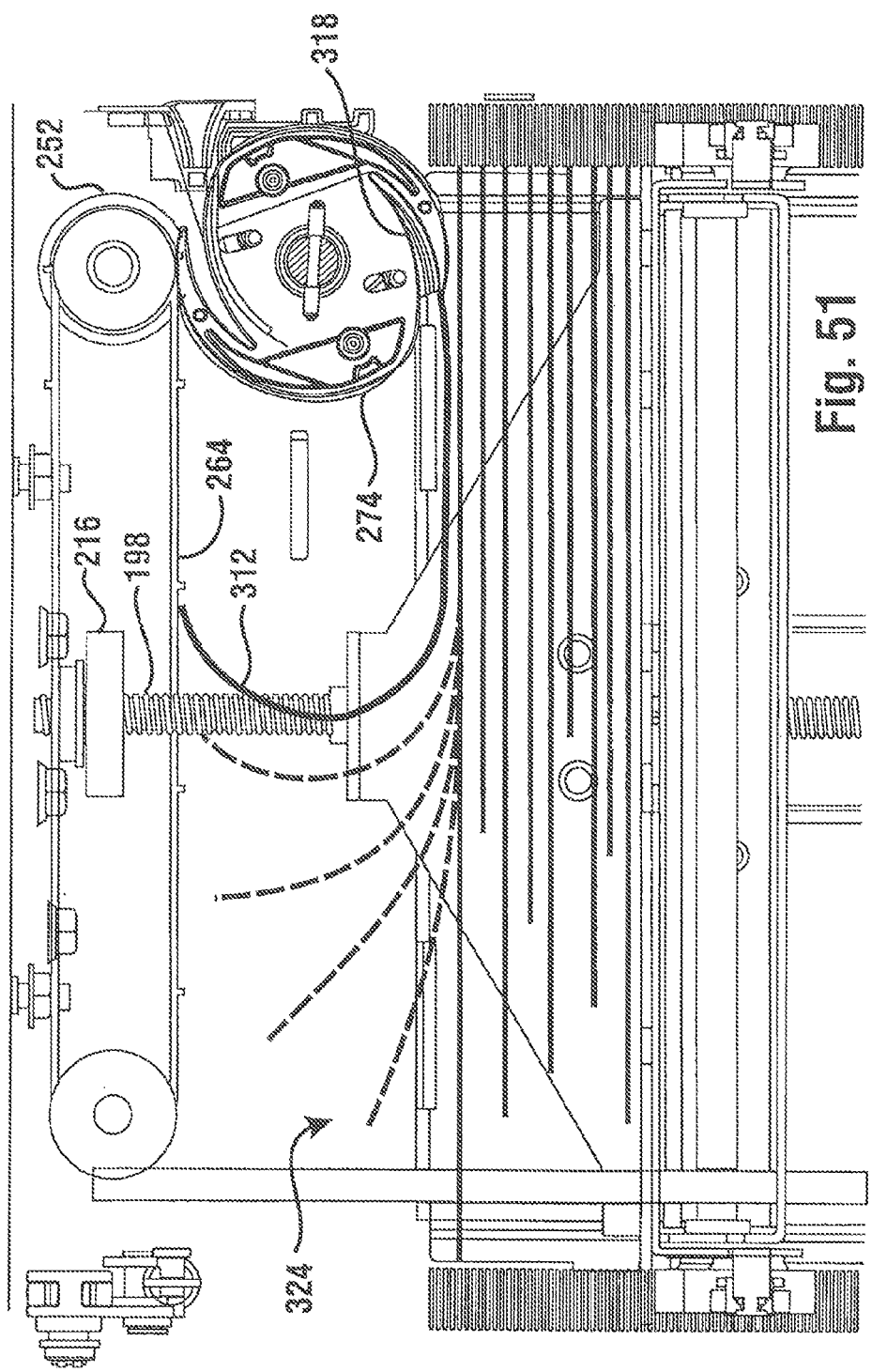

In the exemplary embodiment, the terminal controller operates to cause rotation of the gripper member to stop temporarily while a sheet 312 is sensed as still moving into the container. In this position the opposed finger portion that is not currently holding sheet 312 is disposed away from the trailing edge of the sheet as it enters the opening in the container. Further in the exemplary embodiment the finger is shrouded from engaging the trailing edge of the sheet by the adjacent members that include the cam surfaces. As a result if the trailing edge of the sheet has a "dog ear" portion as shown in FIG. 50, such portion will not get caught on the finger portion. This reduces the risk of jams. Once the trailing edge is sensed as having passed the sensor and subsequent sufficient movement of the flip shaft assembly has occurred to move the trailing edge inward beyond the finger portion, the terminal controller causes the stacker wheel assembly to rotate so that the finger portion and its associated slot is in position to engage the leading edge of the next incoming sheet. This further rotation further causes the gripper portion to release sheet 312. As shown in FIG. 51 the trailing edge of the sheet 312 can be engaged by the cleats on belts 264 and flipped as shown to be included in a sheet stack 324 within the container. Further the cam followers are moved by the corresponding cams so as to cause the leading edge of the sheet that has been engaged in slot 318 to be released by movement of the gripper portion as the gripping member 274 rotates to the position in which the slot on the member opposite to the slot 318 is positioned to engage another incoming sheet. As can be appreciated the sensing of magnetic elements 310 enables the terminal controller to rotate the stacker wheel assembly 266 in coordinated relation so as to engage, move and release a sheet into the stack upon each rotation.

Further in the exemplary embodiment as shown in FIG. 51 the gripper member 274 releases each sheet so that the leading edge thereof that entered the container is in generally aligned relation with the stack 274. As a result sheets of various lengths may be stacked within the container with their leading edges generally aligned.

Further in the exemplary embodiment each of the stationary members 292, 290, 288 and 286 include generally aligned sheet engaging surfaces 326 (see FIG. 46). These generally aligned sheet engaging surfaces 326 operate to engage the leading edge of the sheet and separate the sheet from the rotating members. This further helps to facilitate releasing the sheets in aligned relation with the stack. Of course this approach is exemplary and in other embodiments other approaches may be used.

It should also be pointed out that in the exemplary embodiment each of the sensing member and the indicating member also include peripheral slots that are generally aligned with the slots on the gripper members. As a result sheets that are engaged with the gripper members are moved while extending in the corresponding slots of the other rotating members. This further helps facilitate engaging, moving and releasing the sheets into the stack in coordinated relation.

Figure 52:
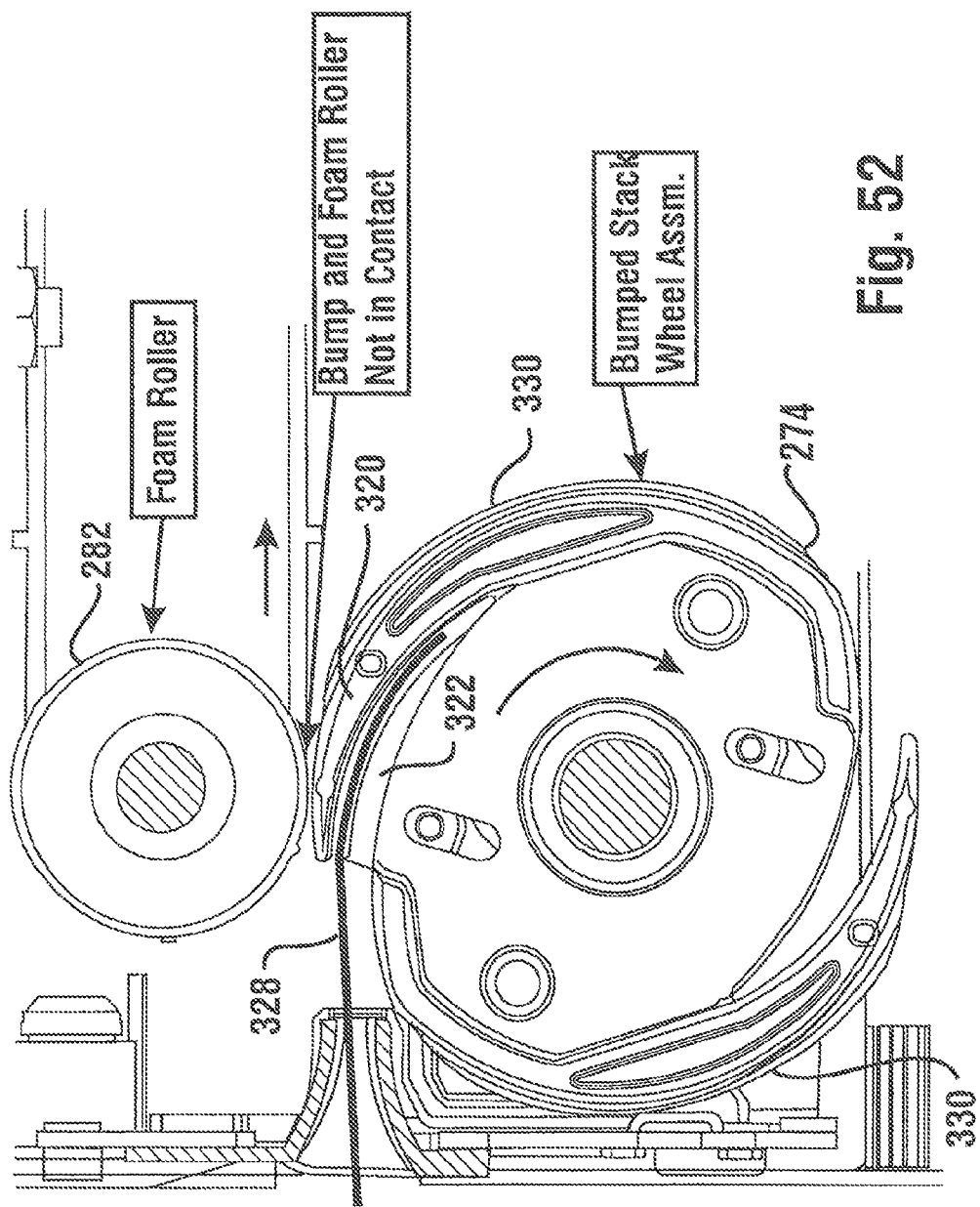
FIGS. 52 through 55 are plan views showing the configuration of the outer circumference of exemplary rotating members that facilitate sheet movement through engagement of raised circumferential portions with deformable rollers of the roller and belt assembly.
Figure 53:
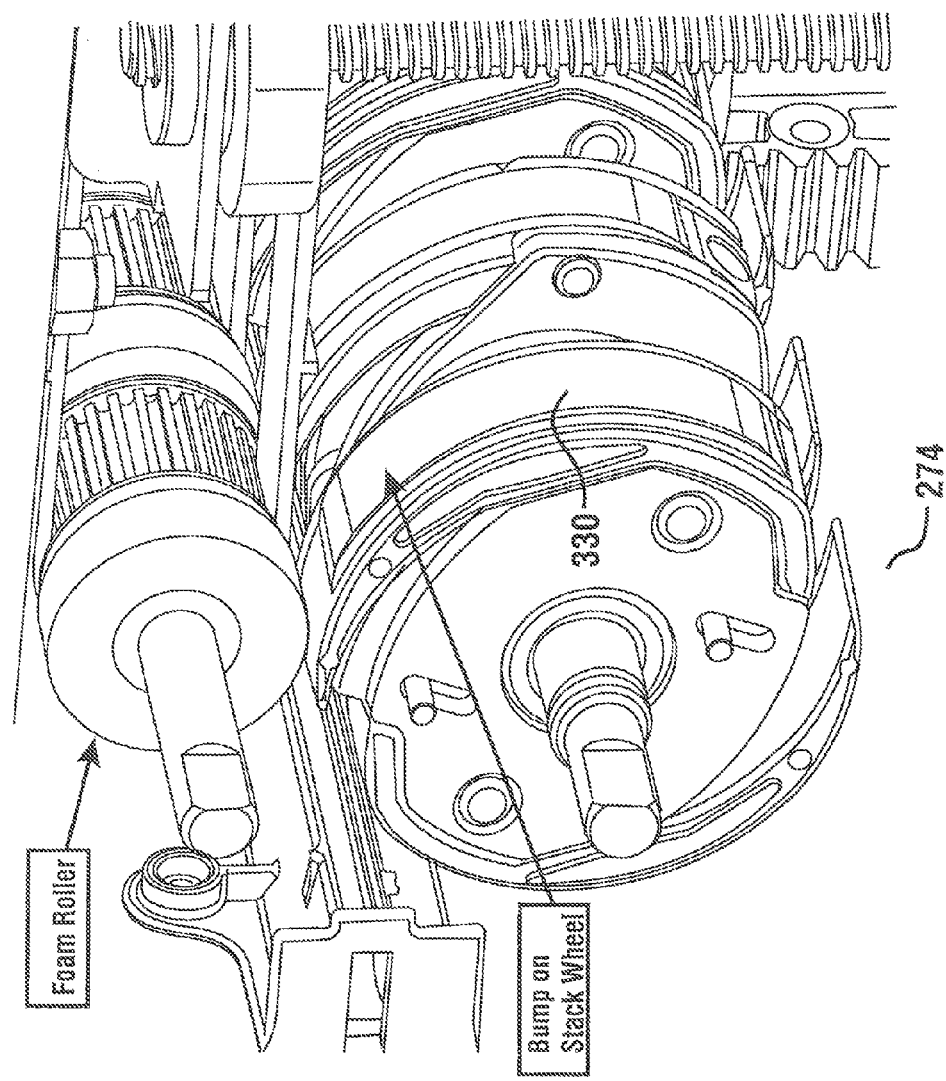

FIGS. 52 through 55 further show aspects of the exemplary embodiment which facilitates the movement of sheets into the container. FIG. 52 shows an opposite hand view of a gripper member 274 and a deformable roller 282. FIG. 52 shows the gripper member in the initial position in which the gripper member has received a sheet 328 in a slot thereof and the gripper portion 322 is moving responsive to rotation of the gripper member in engagement with the cams to engage the sheet. In this position the outer circumference of the finger portion is not engaged with the deformable roller 382. However, as can be seen, the outer circumference of the gripper member 274 includes radially outward extending circumferential bump portions 330 that extend further radially outward than other portions of the outer circumference of the gripper member 274. It should be noted that FIG. 53 shows gripper member 274 in a similar position to that shown in FIG. 52 but without sheet 328 therein so as to better show the exemplary configuration of the roller.

Figure 54:
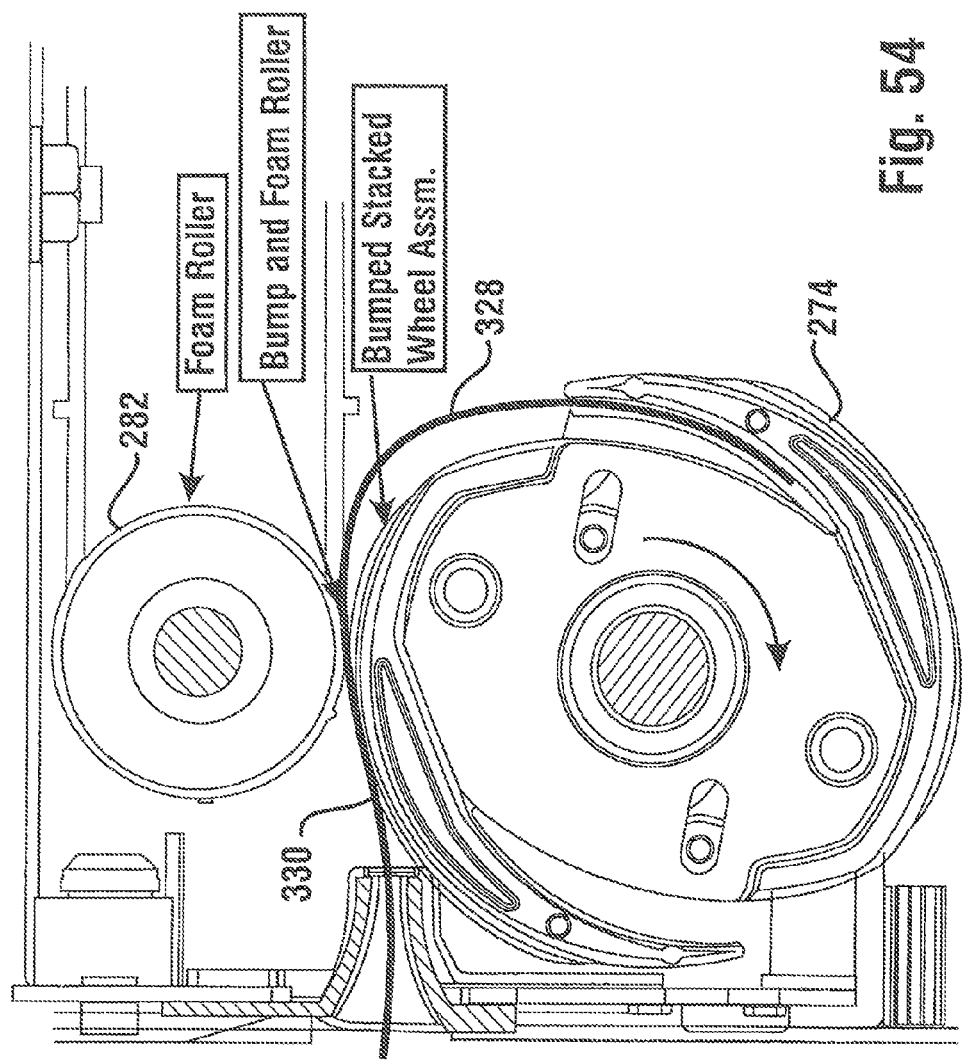
Figure 55:
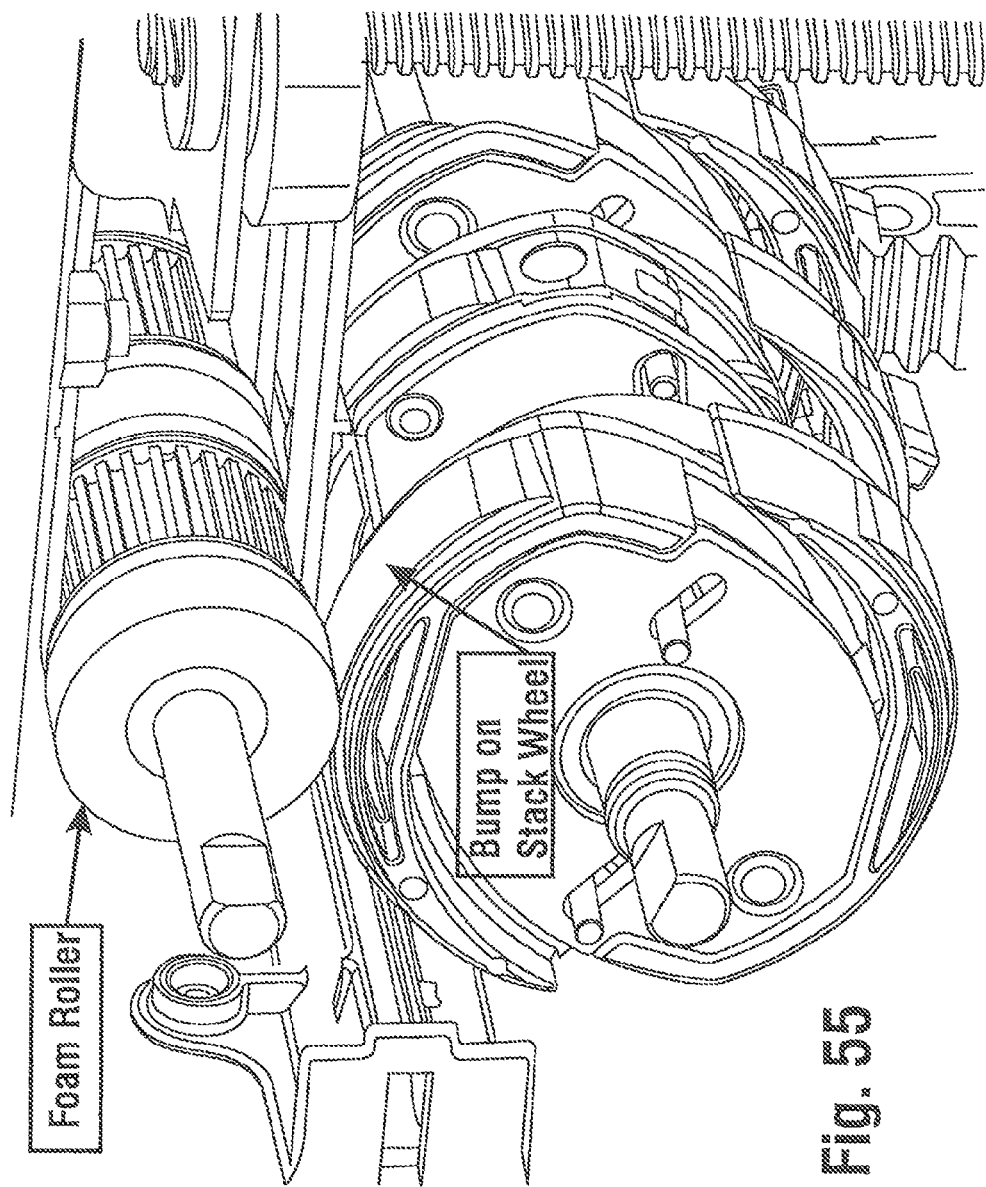

FIG. 54 shows the rotation of the gripper member further clockwise from that shown in FIG. 52. As can be seen, the front portion 330 is moved to adjacent the deformable roller 282. Because of the raised circumferential bump portion the foam roller is deformed and provides biasing engagement between the roller, the sheet and the gripper member. This engages the sheet 328 in sandwiched relation between the deformable roller and the gripper member and urges its movement of the sheet into the container. In the exemplary embodiment if the sheet were not present between the deformable roller and the gripper member, the deformable roller would be in engagement with a bump portion of the gripper member. This is further represented in FIG. 55 which like FIG. 53 does not include the sheet to facilitate understanding of the structures. Of course in the exemplary embodiment further rotation in a clockwise direction as shown causes the circumferentially extending bump portion to again rotate away from the deformable roller as the gripper member moves to a position in which another sheet may be accepted into a slot thereof. Of course it should be understood that these approaches are exemplary, and in other embodiments other approaches may be used.

Other exemplary embodiments may use mechanisms of other types to stack sheets in aligned relation. Further such other embodiments may operate to dispense sheets that have been previously stored. This may be done for example in the manner disclosed in U.S. Pat. Nos. 6,302,393 and/or 6,331, 000 the disclosures of each of which are incorporated herein by reference in their entirety. For example in some embodiments a single sheet handling apparatus may be operative to perform both the functions of receiving sheets from users as well as dispensing sheets. Further as previously discussed while some embodiments may operate to handle sheets such as currency bills, other embodiments may also operate to receive and/or dispense other financial instruments and/or sheets including for example checks, gaming materials, money orders, food stamps, gift cards, payment cards or other sheet items. Of course these approaches are exemplary and in other embodiments other approaches may be used.

In an exemplary embodiment the containers 98 and 100 are made so that the sheet stacking assembly as well as the position of the stack may be precisely controlled without the need for wired connections or electrical contacts between the removable containers and the remainder of the automated banking machine. This facilitates the installation and removal of the cassettes without the need for concern about breakage of electrical connectors or deterioration of electrical contacts. This is accomplished in the exemplary embodiment through the sensing of magnetic fields using sensors that are positioned adjacent to the container when the container is in an installed position. The container operates to vary the magnetic properties that can be sensed with varying conditions within the container so as to enable contactless sensing. This also enables the terminal controller of the automated banking machine to effectively control the components within the container so that sheets may be reliably received and stacked within the containers. Of course it should be understood that using magnetic principles is but one example of indicating and sensing approaches that may be used for such purposes.

Figure 28:
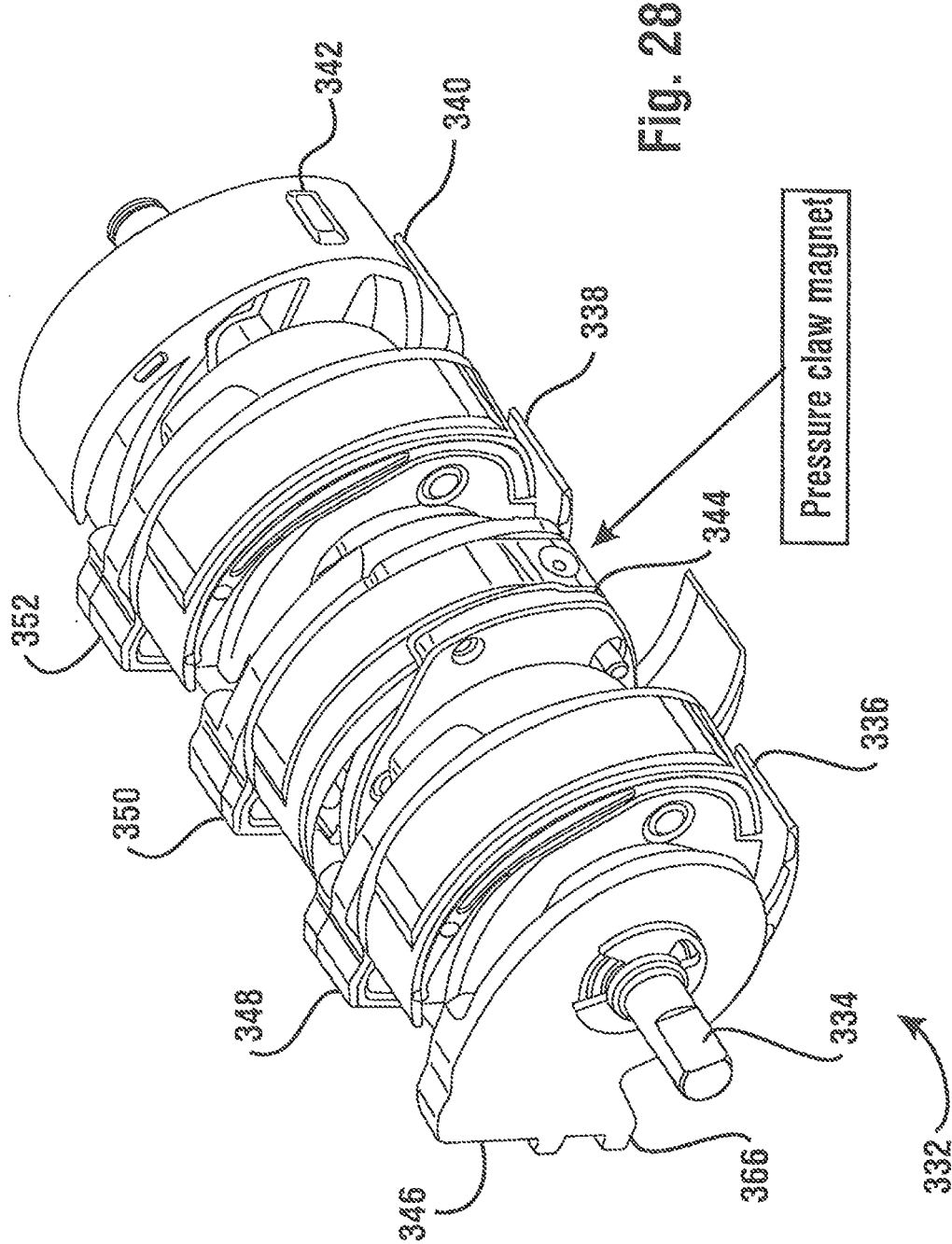
FIG. 28 is an isometric view of a right-hand bill stacking assembly included in an exemplary sheet storage container.
Figure 29:
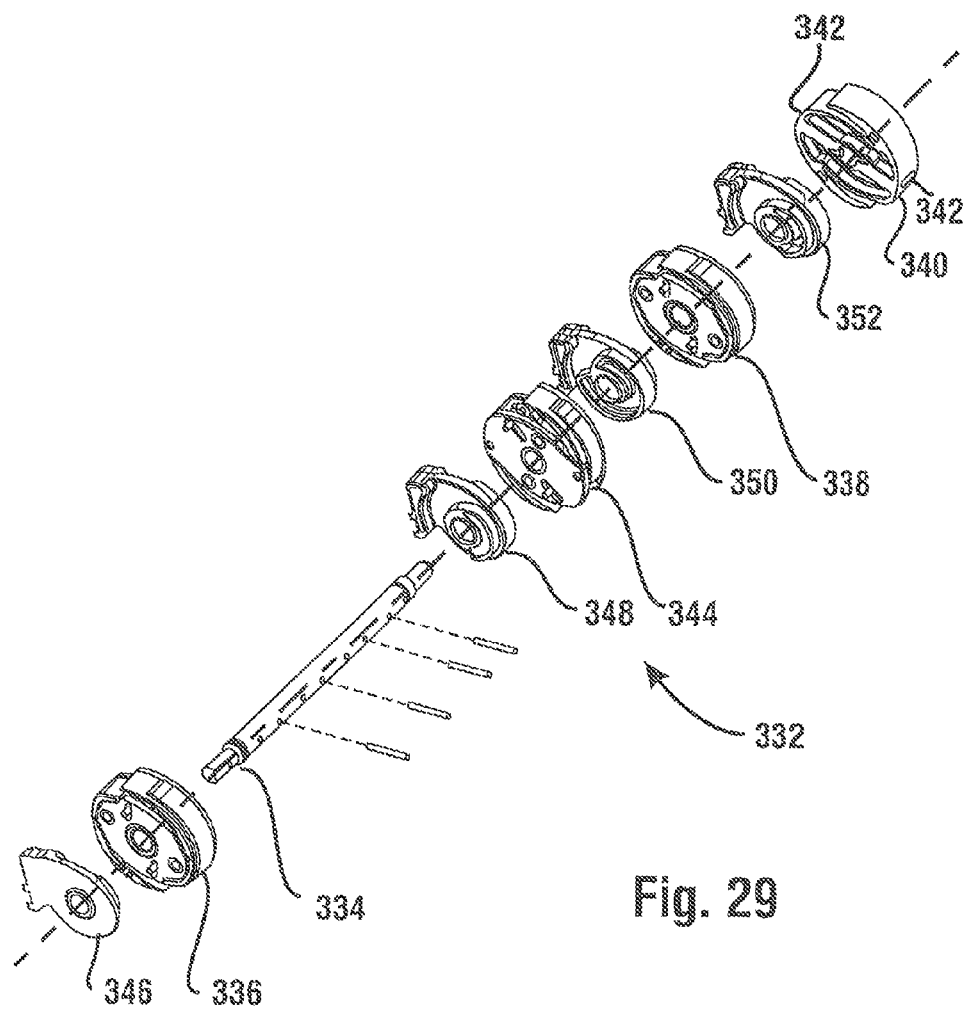
FIG. 29 is an exploded view of the sheet stacking assembly shown in FIG. 28.

FIGS. 28 and 29 show an alternative stacker wheel assembly 332. Stacker wheel assembly 332 is similar to stacker wheel assembly 266 except that it is configured for use in an opposite hand container from assembly 266. For example stacker wheel assembly 332 may be installed in container 100 for purposes of receiving and stacking sheets. Stacker wheel assembly 332 includes a shaft 334. The shaft 334 is assembled in operatively fixed connection with gripper members 336 and 338. Gripper members 336 and 338 are generally similar to gripper member 274.

Stacker wheel assembly 332 further includes an indicating member 340. Indicating member 340 is generally similar to indicating member 278. Indicating member 340 further includes indicating element portions 342 thereon which are sensed in the exemplary embodiment by a Hall effect sensor to detect rotational position of the assembly. As a result as previously described, this enables the stacker wheel assembly to be positioned responsive to operation of the terminal controller to receive a sheet and to move the sheet through operation of the stacker wheel assembly and flip shaft assembly to a position aligned in the stack.

Figure 38:
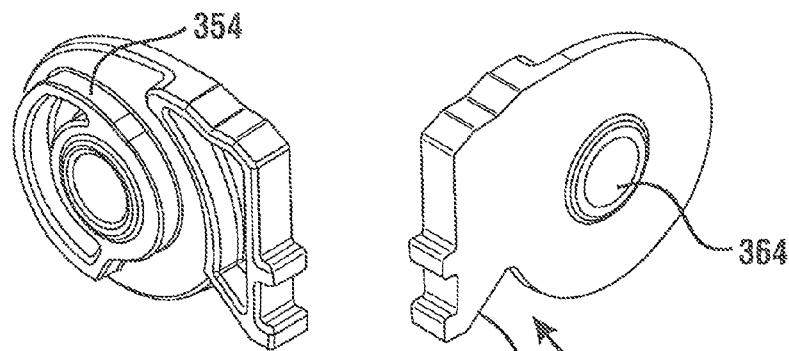
FIGS. 38, 39 and 40 are opposite hand views of different stationary cams used in connection with the assembly shown in FIG. 38.
Figure 39:
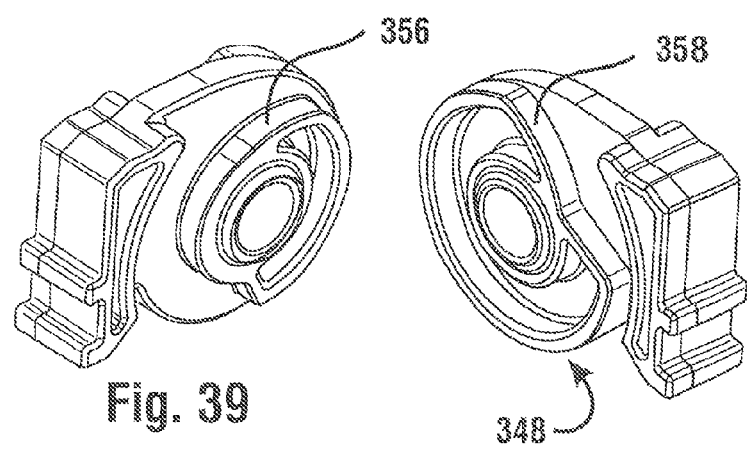
Figure 40:
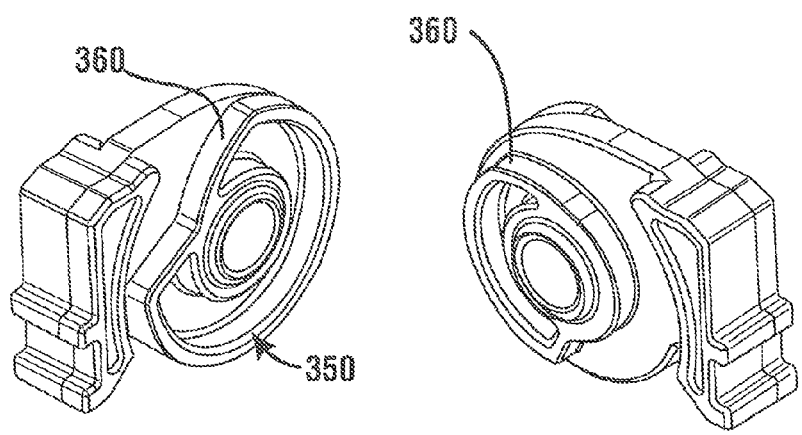
Figure 41:
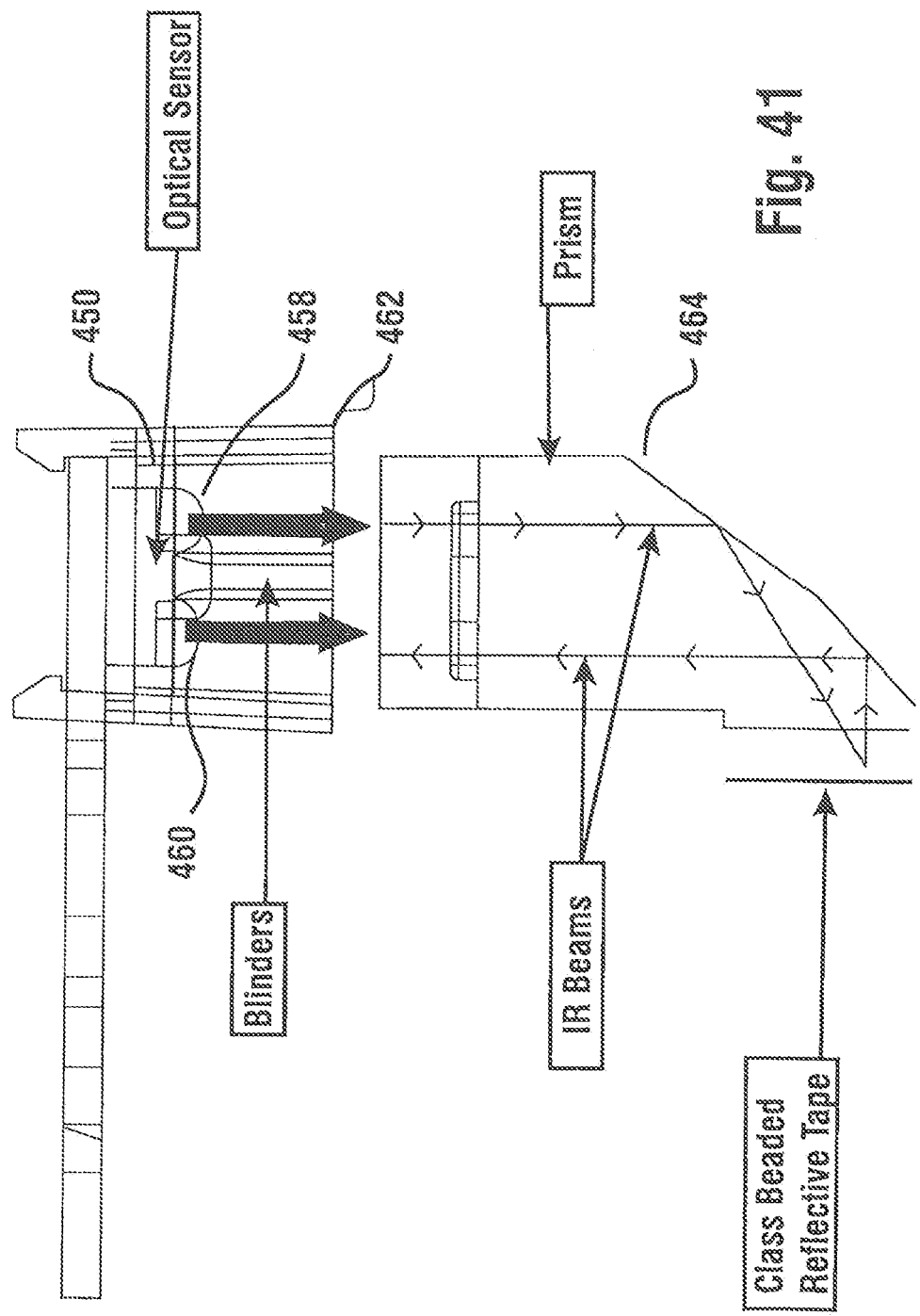
FIGS. 41 through 44 are schematic views of a sensing system for contactlessly sensing the rotational position of a rotating assembly within an exemplary sheet holding cassette.
Figure 42:
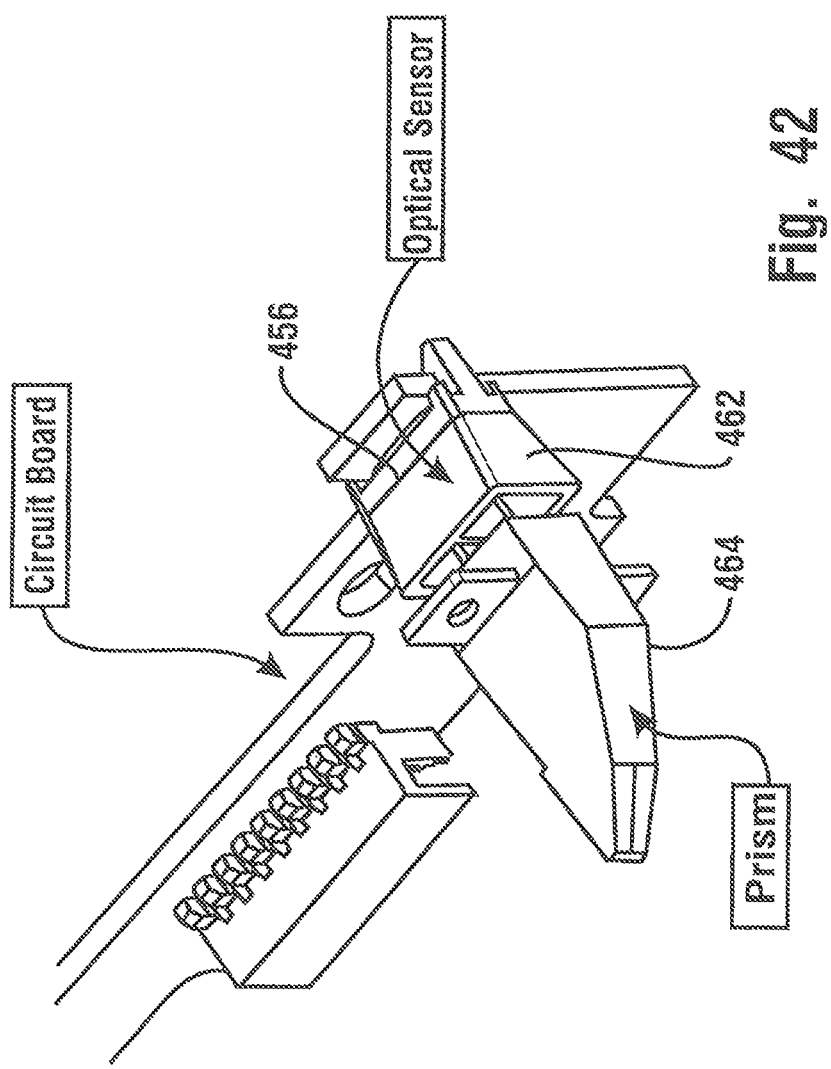
Figure 43:
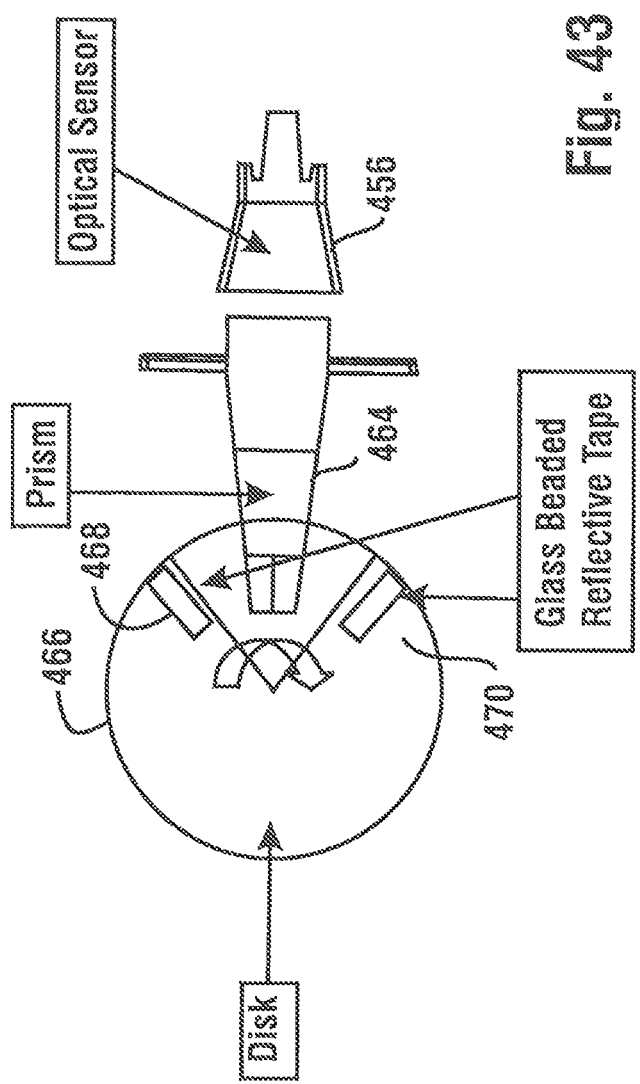
Figure 44:
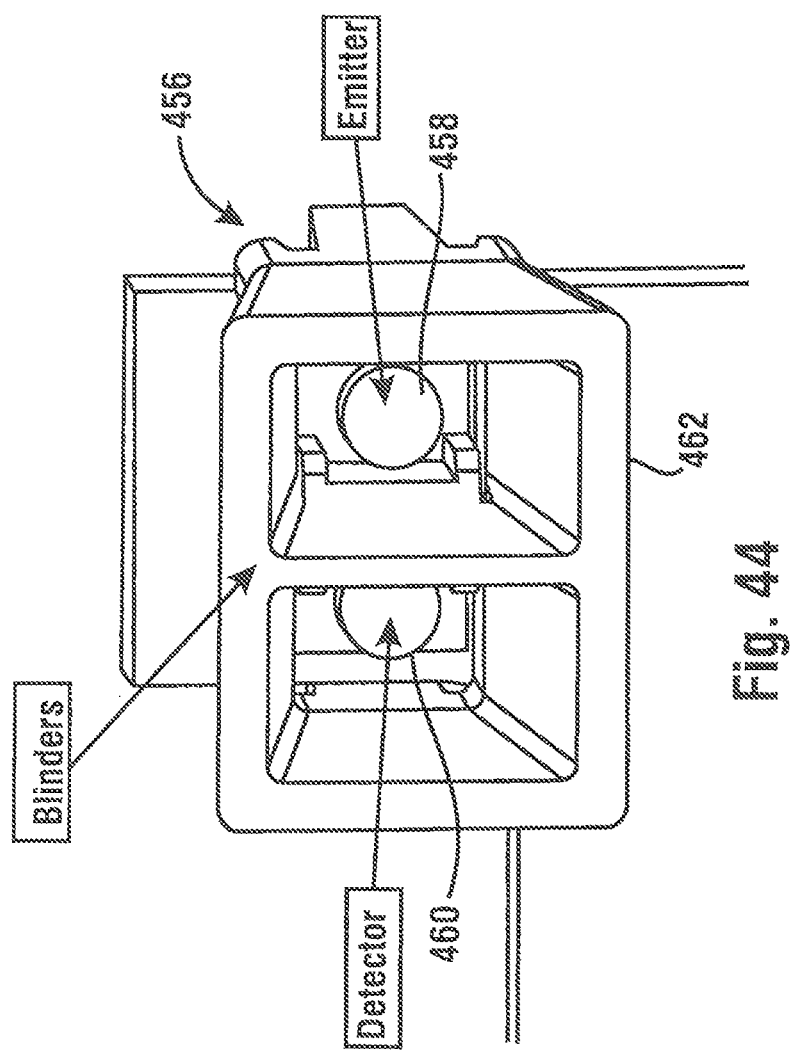
Figure 45:
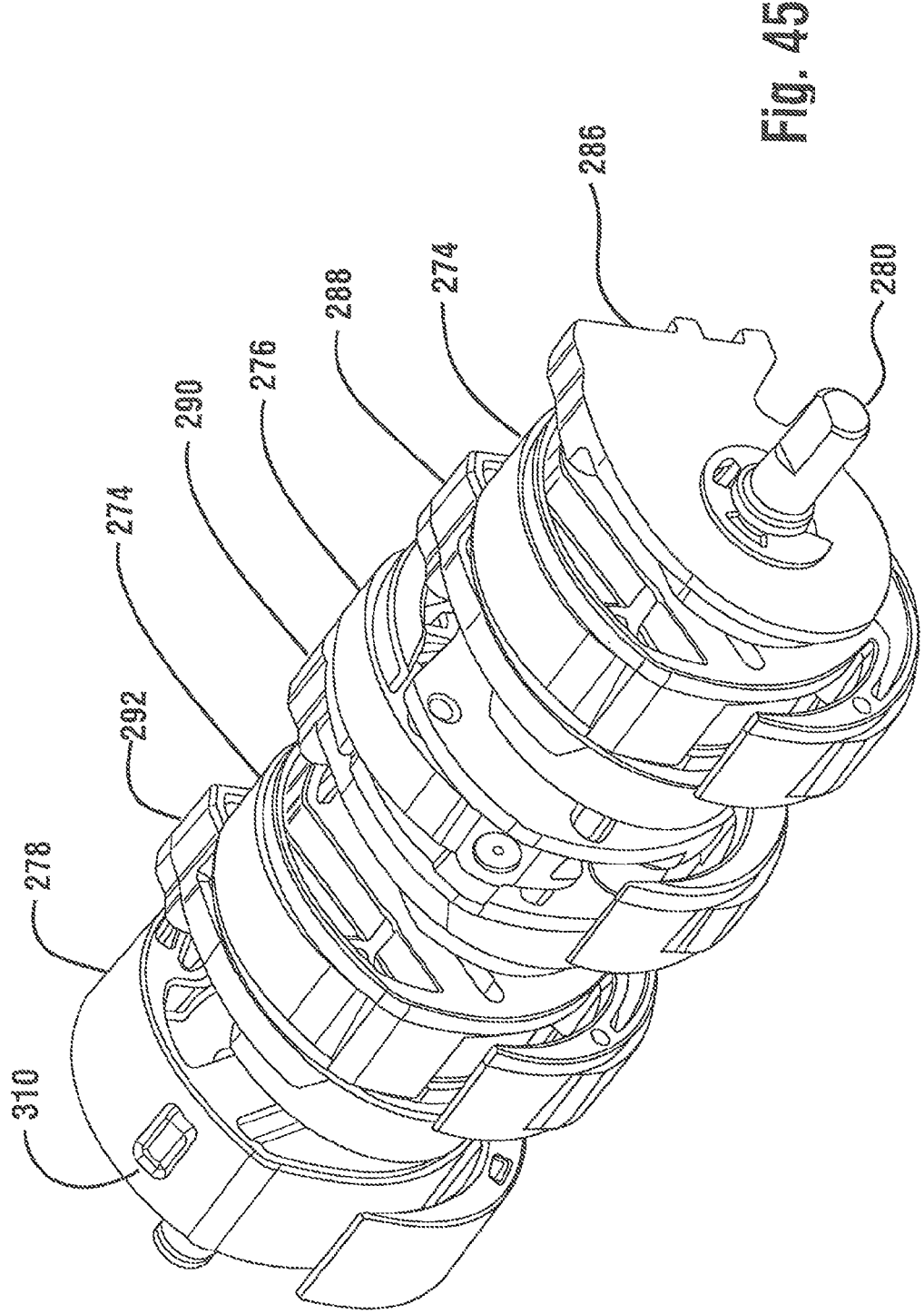
FIG. 45 is an isometric view of an opposite hand stacker wheel assembly from that shown in FIG. 28.

Stacker wheel assembly 332 further includes a sensing member 344. Sensing member 344 is generally similar to sensing member 276 previously discussed. Stacker wheel assembly 332 further includes stationary members 346, 348, 350 and 352. The exemplary stationary members which are shown in greater detail in FIGS. 38 through 40 each include cams thereon. This includes for example cam 354 on member 346, cams 356 and 358 on member 348, and cams 360 and 362 on member 350. Further as can be appreciate in the exemplary embodiment member 352 is configured as a mirror image of member 346. As with the stationary members previously described, each stationary member has a bore therethrough in which shaft 334 can freely rotate. This is represented for example by bore 364 and member 346. In addition each of the stationary members include aligned sheet stop surfaces which are operative to engage sheets in aligned relation with the stack. The sheet stop surfaces facilitate separation of sheets from the rotating members. The sheet stop surfaces are represented for example by surface 366 on member 346.

As previously discussed the gripper members and sensing member each have cam followers extending from opposed lateral axial sides thereof. The cam followers are operative to engage the adjacent cam surfaces and cause movement of components of the rotating members in coordinated relation with the rotation thereof. Of course this approach is exemplary, and in other embodiments other approaches may be used.

Figure 35:
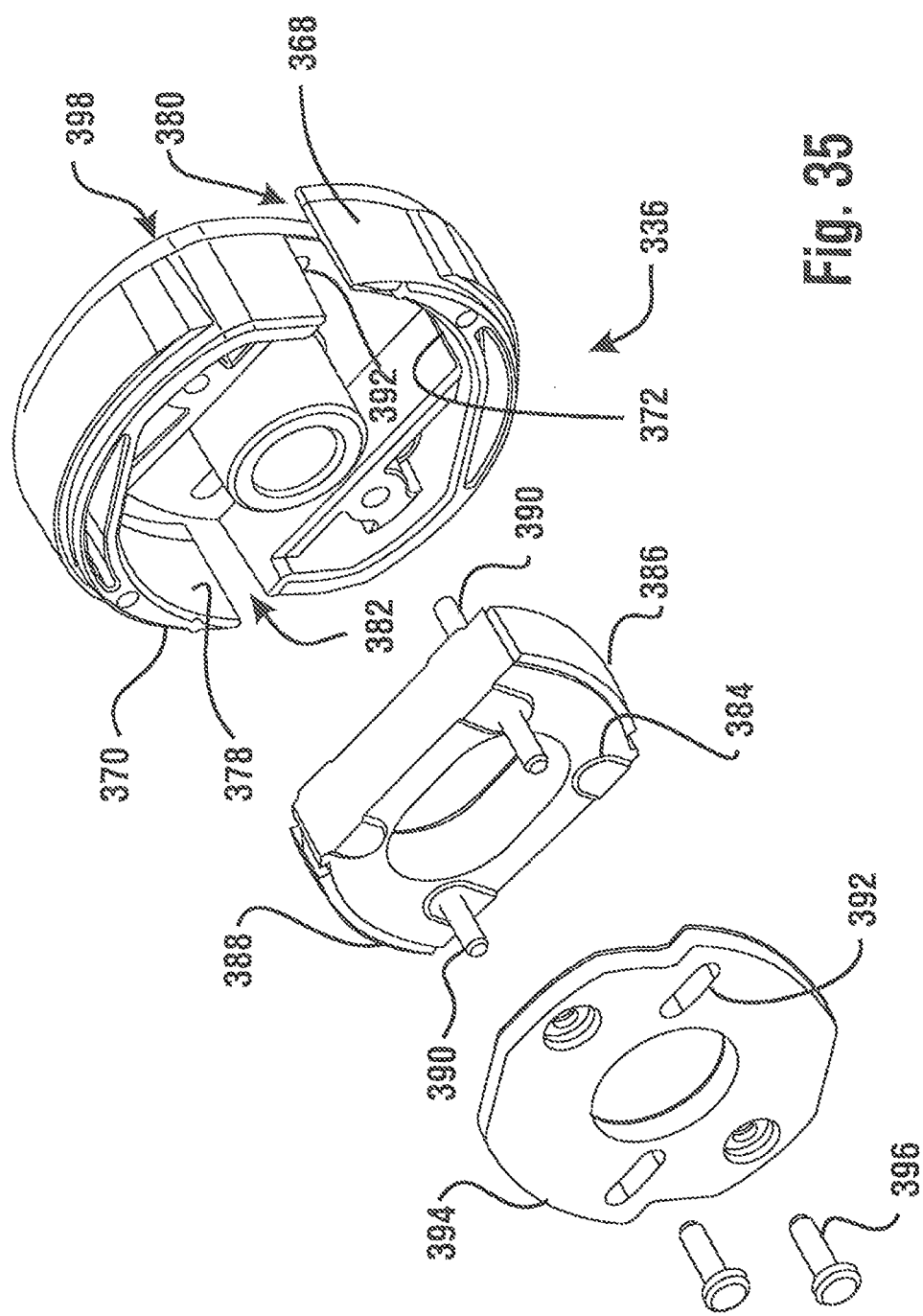
FIG. 35 is an isometric exploded view of components of a rotating member that is operative to selectively hold, move and release sheets in engagement therewith.

FIG. 35 shows an exploded view of the exemplary embodiment of gripper member 336. Similar to gripper member 274, gripper member 336 is a rotating member that rotates in operatively fixed connection with shaft 334 of its associated stacker wheel assembly. Gripper member 336 includes a pair of finger portions 368, 370. Each of finger portions 368 and 370 each have respective radially inward facing surfaces 372 and 378 that each define slots 380 and 382.

A gripper portion 384 is movably mounted on gripper member 336. Gripper portion 384 includes sheet engaging portions 386 and 388 at opposed ends thereof. In exemplary embodiments the sheet engaging portions may include a deformable material such as an elastomer portion for purposes of engaging sheets in sandwiched relation between the sheet engaging portion and the adjacent radially inward opposing surface. Of course this approach is exemplary, and in other embodiments other approaches may be used.

Gripper portion 384 includes cam followers 390 which in the exemplary embodiment extend laterally axially from both sides thereof. Cam followers 390 extend in and are constrained to move in elongated slots 392. Elongated slots extend in a cover 394 which is releasibly attached to the gripper member 336 through fasteners 396. The elongated slots also extend in a wall 398 of the gripper member that is opposite of the cover 394.

As can be appreciated in the exemplary embodiment engagement of the cam followers 390 with the adjacent cams on each side of the gripper member cause the gripper portion 384 to move so as to engage and release sheets in the slots in the desired rotational positions. This is done in the manner previously discussed in connection with gripper member 274. Further in exemplary embodiments if the gripper portion should become worn or saturated with dirt or other contaminants, it may be removed and the interior area of the gripper member cleaned. Likewise the gripper portion 384 may be cleaned or replaced. This is done by removing the fasteners holding the cover 394 and removing the gripper portion from engagement with the gripper member and then reassembling the gripper portion cover. Of course these approaches are exemplary and in other embodiments other approaches may be used.

Figure 37:
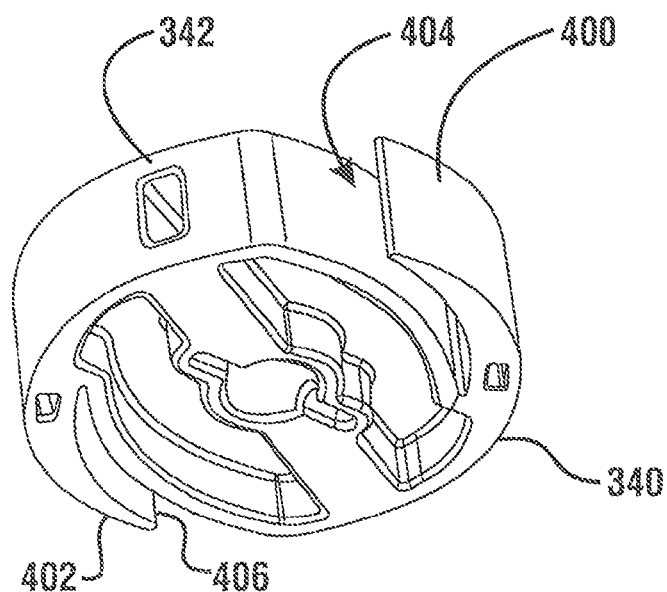
FIG. 37 is an isometric view of the rotating member shown in FIG. 36.
Figure 36:
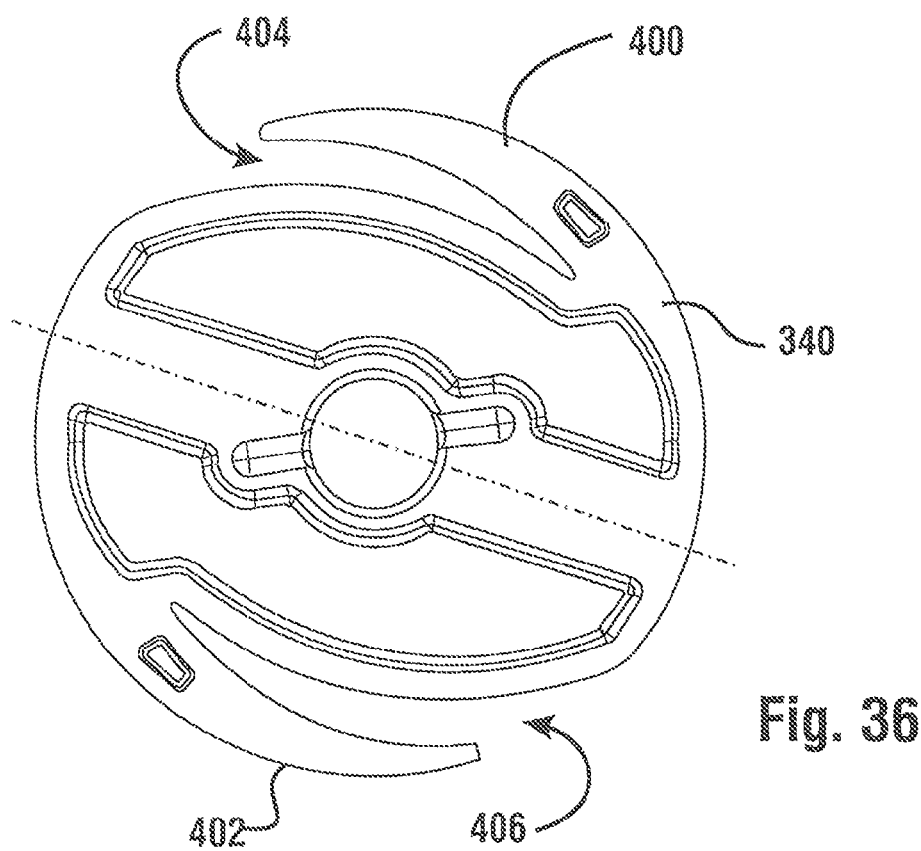
FIG. 36 is a plan view of an exemplary indicating member operative to indicate the rotational position of the rotating members of the assembly shown in FIG. 28.

The exemplary indicating member 340 is similar to indicating member 378. As shown in FIGS. 36 and 37 the indicating member 340 is a rotating member that rotates in operatively fixed engagement with the shaft 324. The indicating member includes a pair of finger portions 400 and 402. The finger portions bound slots 404 and 406 which are configured for accepting sheets therein. As can be appreciated slots 404 and 406 are arranged such that they are angularly aligned with the slots formed on the gripper members 336 and 338 as well as slots on the sensing member 344 so as to facilitate sheets extending therein as they are held, moved and released into the stack. Of course it should be understood that these configurations are exemplary.

FIGS. 30 through 34 show features of the exemplary embodiment of the sensing member 334. It should be understood that sensing member 334 is similar to sensing member 276 that operates in an opposite hand manner.

Figure 30:
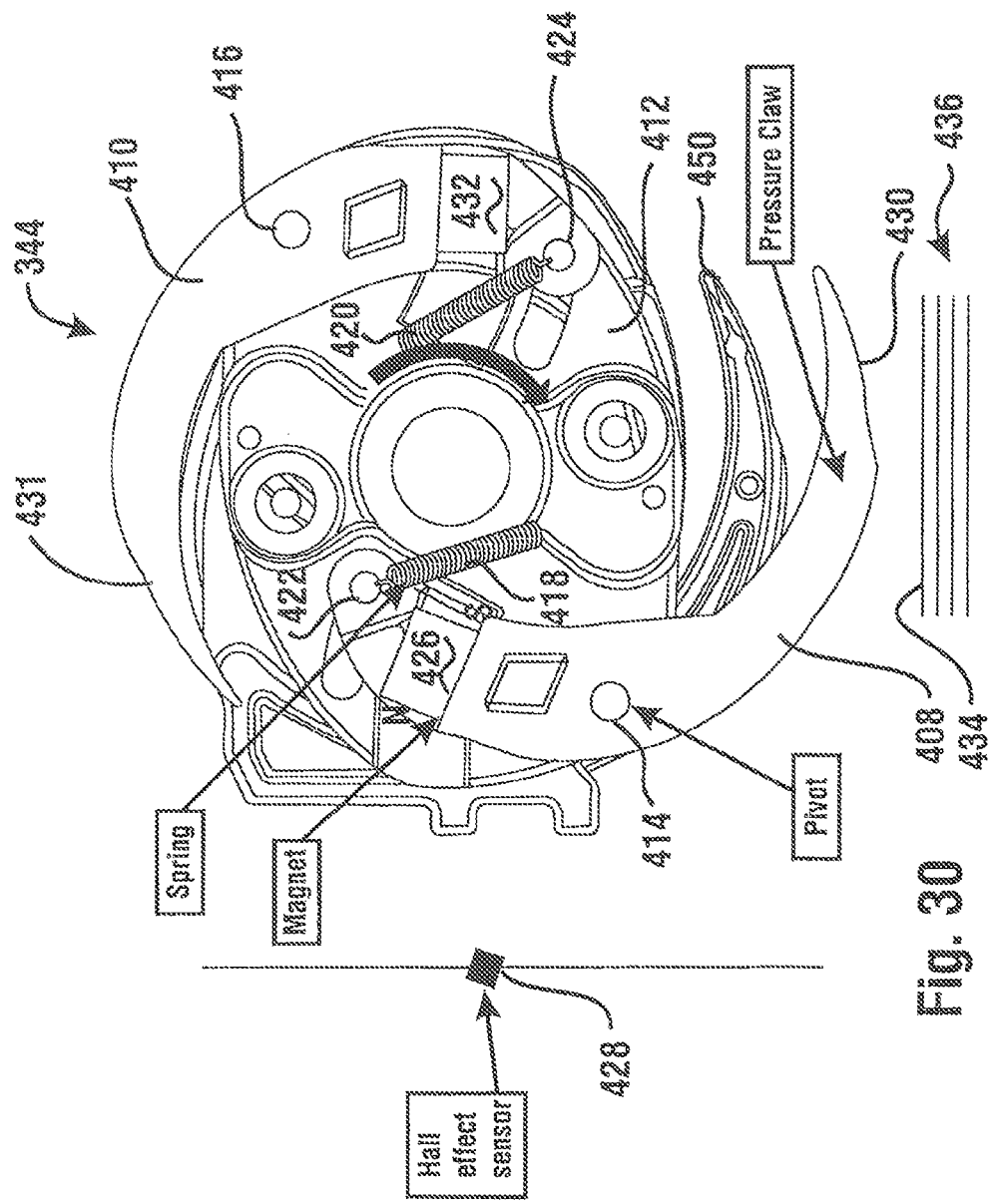
FIG. 30 is a side view of an exemplary rotating member that is operative to sense stack position and facilitate stacking sheets within the sheet holding container.
Figure 31:
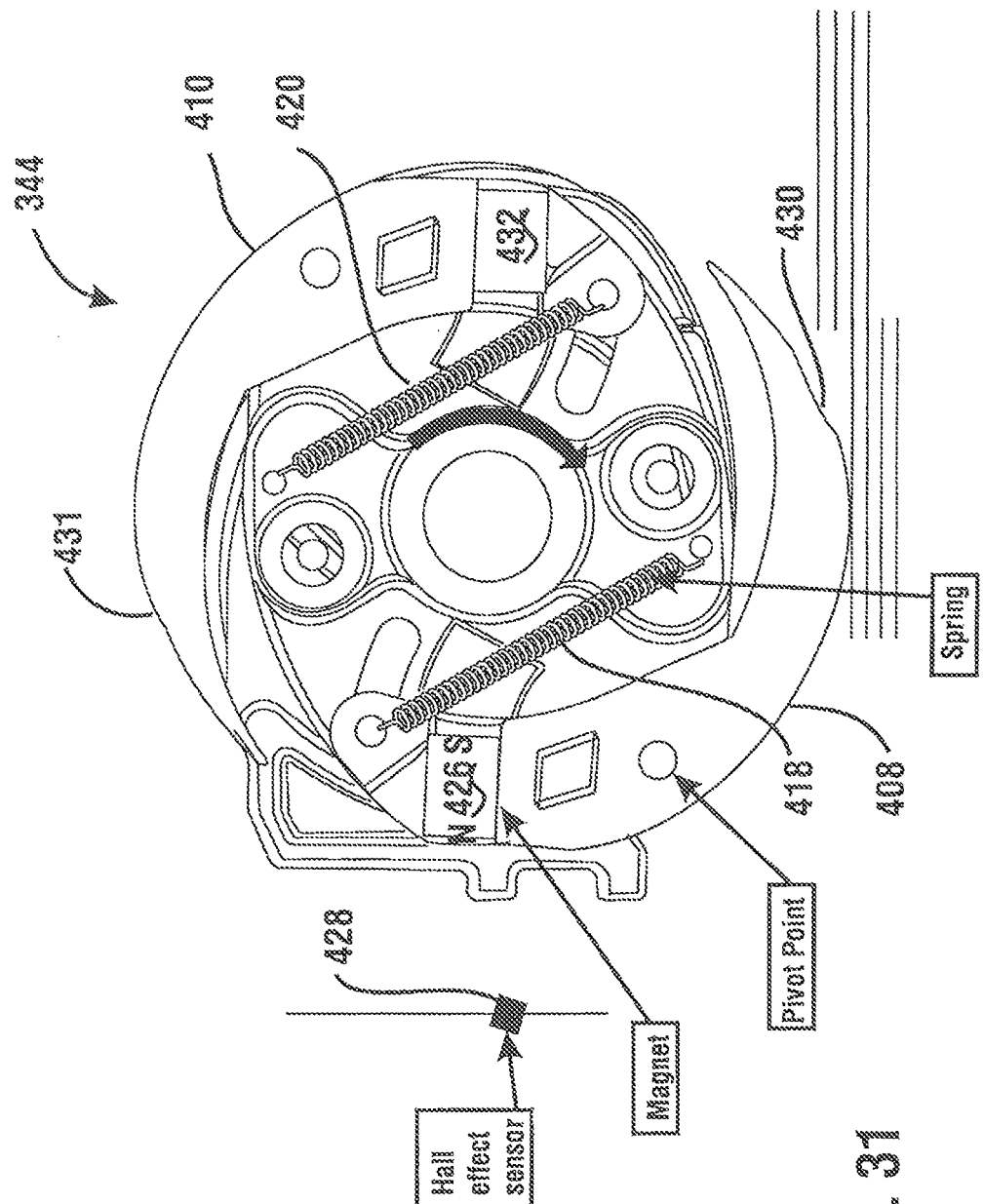
FIG. 31 is a view similar to FIG. 30 but showing the projecting portion of the rotating member moved to a position for properly applying pressure to a stack.

As shown in FIG. 30 sensing member 334 is a rotating member that rotates in operatively fixed engagement with shaft 334. As shown the sensing member rotates in a clockwise direction with the shaft. Sensing member 334 includes a first curved finger portion 408 and a second curved finger portion 410. Finger portion 408 is rotatably mounted to a body member 412 (see FIG. 34) about a pivot 414. Finger portion 410 is mounted to the body portion and rotates about a pivot 416. Finger portion 408 is biased by a spring 418. Spring 418 biases finger portion 408 about the pivot 414 such that the finger portion is biased toward the radially outward position. Similarly finger portion 410 is biased by a spring 420 toward the radially outward position.

Finger portion 408 is in operative connection with a cam follower 422. Cam follower 422 is operative to engage adjacent cams in the stacker wheel assembly 332. Finger portion 410 is also in operative connection with a similar cam follower 424.

Finger portion 408 includes a magnet 426 mounted in supporting connection therewith. Magnet 426 has its poles oriented as shown. Magnet 426 comprises a first target element portion which can be sensed through operation of a Hall effect sensor schematically indicated 428. In the exemplary embodiment the Hall effect sensor is mounted outside of the container 100 and enables sensing the magnetic properties of the magnet in a contactless manner. As can be appreciated from FIGS. 30 and 31 the magnet is movably positioned responsive to radially inward displacement of an outward projecting portion 430 of the finger portion 408. Finger portion 410 includes a projecting portion 431 and a magnet 432. Magnet 432 is similar to magnet 426 and is movable with finger portion 410.

As represented in FIG. 30 the outer projecting portion 430 of finger portion 408 engages the upper sheet 434 in a stack 436 of sheets that are accumulated in container 100. Engagement of the first sheet and the engaging portion is operative to move and position magnet 426. Thus in the exemplary embodiment the position of the first sheet in the stack is detectable through sensing of the magnetic field that can be sensed responsive to the position of the magnet on each finger portion using the Hall effect sensor.

As best seen in FIGS. 33 and 34 the finger portions 408 and 410 each define slots 438, 440. Slots 438 and 440 are configured to be angularly aligned with the slots and the other rotating members in the stacking assembly 332. Further the cam followers 424 and 422 are constrained to move in slots 442. Slots 442 extend in body 412 as well as in a cover 446 that is releasibly attachable through fasteners 448.

In operation of the exemplary sensing member 344 the member rotates clockwise as shown. As the projecting portions 430, 431 rotate into engagement with the top sheet bounding the stack, the magnets 426, 432 are positioned so as to enable the Hall effect sensor to sense the position of the magnet and thus the associated projecting portion. Further the action of the springs in the exemplary embodiment biasing the finger members outward, generally maintain a desired pressure on the top of the stack so as to facilitate holding the sheets in the stack. In the exemplary embodiment the projecting portion generally applies approximately one quarter to one half pound of force to the top sheet in the stack for this purpose. Of course this approach is exemplary, and in other embodiments other approaches may be used.

During operation of the sensing member engagement of the cam followers with the adjacent cams enable the projecting portion adjacent to the stack to extend the full outward extent of its radial travel as necessary for purposes of moving to engage the top sheet in the stack. This is represented in FIG. 30 in which a finger portion 450 of an adjacent gripper member is also shown for purposes of demonstrating the extent of travel of the finger portions of the sensing member. However, engagement of the cams operate to limit the outward travel of the finger portions when they are angularly disposed away from the stack. This is represented by the position of finger portion 410 in FIGS. 30 and 31. Holding the finger portion that is rotated away from the stack radially inwardly through engagement with the cams facilitates engagement with the sheets and avoids problems that might occur with potentially catching outwardly extending finger portions on the associated flip shaft assembly. Of course this approach is exemplary, and in other embodiments other approaches may be used.

FIG. 32 shows an exemplary graph of signals that are generated through an adjacent Hall effect sensor through the positioning of the magnets on the movable finger portions of the exemplary sensor member. In FIG. 32 line A corresponds to the signal that is received from the Hall effect sensor when the magnet 426 is positioned as shown in FIG. 30. Line B represents signals that correspond to the position of the magnets in the position shown in FIG. 31 which corresponds to the generally desirable position of the engaging portion relative to the stack.

In operation of one exemplary embodiment the Hall effect sensor 428 is in operative communication through appropriate interfaces with the at least one terminal controller of the automated banking machine. The terminal controller is operative as control circuitry to cause movement of the drive within the associated container so as to position the plate 188 previously described, so as to maintain the projecting portions of the sensing member in the desired position. This is accomplished in the exemplary embodiment by the automated banking machine imparting rotational movement through a gear 218 on the machine to gear 216 which is part of the drive within the container. Rotation of gear 216 is operative to rotate screw 198 of the drive so as to position plate 188 within the container.

In one exemplary embodiment as sheets are added to the stack within the container the Hall effect sensor 428 is operative to sense the magnetic signals generated responsive to the position of the target element portion which includes the magnets 426 and 432. The at least one processor is operative to cause the plate supporting the stack to be moved so as to maintain the desired Hall effect signal which is indicative of the projecting portion on the sensing member being in the desired position upon each rotation. Thus in the exemplary embodiment the appropriate position and pressure is maintained for the stack by the sensing member as sheets are added to the stack. Further as can be appreciated when the container is first installed in an empty condition in the machine, the at least one processor may operate to cause the plate to move so that the plate is positioned and engages the passing projecting portions so that the plate is ready to support incoming sheets.

In some other alternative embodiments at least one processor in the automated banking machine may be operative to selectively control the movement of the plate 188 based on the characteristics of those sheets that are being received into the stack. In an exemplary embodiment at least one data store in operative connection with at least one processor may have stored therein at least one value. This at least one value is used by the processor as sheets are being added to the stack to move the support plate a corresponding distance. Thus for example in some embodiments the addition of each sheet being engaged with the stacker wheel assembly and added to the stack, causes the support plate to be moved away from the stacker wheel assembly a distance that corresponds to the stored value. In such embodiments the at least one stored value corresponds to a thickness of each added sheet. Thus in such embodiments the movement of the support plate is designed to move the stack so that as sheets are being added, the desired amount of compressive force is maintained between the movable projecting portions of the sensing member and the top of the stack. This can help to assure that the integrity of the stack is maintained by avoiding force outside of a desired range which can result in loss of stack integrity. In exemplary embodiments it is desired to maintain approximately one quarter to one half pound of force between the top sheet applied by the rotating assembly that comprises the stacker wheel assembly. This force is applied by the movable projecting portion of the sensing member engaging the top sheet of the stack. Of course this approach is exemplary and in other embodiments other approaches may be used. Further it should be understood that while in this exemplary embodiment the support plate is moved in response to the stored value to accommodate the thickness of each sheet as it is being added to the stack, in other embodiments movement of the support plate may be made only after multiple sheets have been added to the stack.

In operation of the automated banking machine various types of sheets may be accepted within the stack. The sheets being added may vary in their properties. Sheets may include for example new paper or plastic sheets which are relatively rigid and incompressible. Other sheets may include worn sheets which have been crinkled and/or which are relatively more compressible. In some embodiments the stack may be receiving different types of sheets which have different properties in terms of compressibility, which compressibility may be alternatively thought of as sheet fluffiness.

In some exemplary embodiments it is desirable to operate the processor to change the at least one stored value which causes movement of the support plate away from the rotating assembly, based on the degree of compressibility of the sheets that are being sensed as added to the stack in the environment in which the device is operated. This is accomplished in some embodiments by utilizing the existing stored value to move the support plate downward with each sheet that is added to the stack. Then after the current activity or a given transaction in which sheets have been added to the stack, the at least one processor is operative in accordance with its programming to cause the drive to move the plate downward. The plate is moved downward until the projecting portion which serves as a movable sensing member has moved radially outward in engagement with the top sheet of the stack to an extent that a level of movement of the projecting portion is sensed by the sensor that detects the magnetic element in connection with the movable projecting portion.

After the at least one processor has sensed that the movable projecting portion is disposed radially outward to a reference level, the at least one processor is then operative to cause the drive to move the plate toward the stacker wheel assembly. The processor operates to cause the drive to move the plate toward the stacker wheel assembly until the projecting portion in engagement with the top sheet is moved radially inward to an extent in which the magnetic target element portion indicates that the compressive force applied between the projecting portion and the top sheet is at a desired level. This is sensed in the exemplary embodiment by the sensor sensing the position of the magnetic element. In response to sensing the projecting portion having moved to a position in which a desired compressive force is acting between the sensing member of the stacker wheel assembly and the stack, the processor is operative to cause the drive to stop moving the plate toward the rotating assembly.

In the exemplary operation the at least one processor operates to calculate data corresponding to the distances that the plate moves downward to cause the reference displacement of the projecting portion on the sensing member and then the data associated with moving the plate toward the stacker wheel assembly. As a function of the data corresponding to the distances the plate moves away and then toward the stacker wheel assembly to achieve the desired force, the at least one processor operates to calculate data corresponding to a determination of how closely the current at least one stored value is causing the plate to move the appropriate amount with each sheet to maintain the desired compressive force on the top of the stack. The at least one processor then operates in the exemplary embodiment to change the at least one stored value responsive to the determination to correspond to the data associated with moving the support plate.

For example in some exemplary embodiments if the distance that the plate moves downward is greater than the distance that the support plate then moves upward, this may be an indication that the plate is not currently moving downward far enough with each sheet that is being added. This will cause the processor to operate in accordance with its programming to change the at least one stored value stored in the data store so as to cause the support plate to move away from the rotating assembly somewhat more as each sheet is sensed as being added to the stack.

Likewise in an exemplary embodiment if the distance that the plate is moved downward is less than the amount the support plate is moved upward so as to achieve the desired compressive force, this may be an indication that the support plate is moving too far downward with each added sheet. The at least one processor may operate in accordance with its programming to adjust the at least one stored value so that the support plate moves downward somewhat less with each sheet being added to the stack.

Thus in this exemplary mode of operation the at least one processor is operative to change the at least one stored value to more closely correspond to the thickness and properties of sheets that are currently being received in the machine. In other embodiments the at least one processor may move the stack in only one direction and may base the change in stored value on only the one distance. This might be done in circumstances where the plate moves to a location which corresponds to a reference position. Of course these approaches are exemplary and in other embodiments other approaches may be used.

Further it should be understood that in some modes of operation sheets of various sizes may be received in the stack. This may be for example situations where currency bills of various sizes are used within a given country or territory. In situations where smaller bills have been stacked on top of larger bills (or vice versa) it is possible that the stacked sheets may fall over. This may periodically occur due to the unstable nature of a single stack which includes areas with smaller and larger sheets.

In some exemplary embodiments when this occurs the at least one processor may operate responsive to the at least one sensor no longer sensing that the projecting portions on the sensing member on the rotating assembly are engaged with the stack. In such circumstances the at least one processor may operate in accordance with its programming to cause the drive to move the plate toward the stacker wheel assembly until contact of a suitable nature is again established with sheets included within the container. In an exemplary embodiment the at least one processor will then operate to cause another stack of sheets to be built within the container. The further stack will generally begin to build on at least a portion of the earlier stack which is not transversely disposed in the container due to having fallen over. The at least one processor may then operate in the manner described to continue to build the sheet stack within the container. Further in some exemplary embodiments the at least one processor may operate in accordance with its programming to determine a situation where the plate has been required to operate to move toward the sheet stacker assembly a much greater distance than would be appropriate in situations where the integrity of the sheet stack had been maintained. The at least one processor may operate in accordance with its programming to cause certain steps to be taken in such circumstances. These steps may include for example, operating the machine to cause a notification to be given to a remote entity to indicate that stack integrity within a particular container is no longer being maintained. As a result a servicer may be notified to travel to the machine and replace the container. This might be done in circumstances where further processing of sheets is facilitated if stack integrity is maintained. Alternatively if it is desirable to include as many sheets as possible within a given sheet holding container before it is changed, the at least one processor may operate in accordance with its programming to store data which indicates that additional sheets may be stored in the cassette because of the particular circumstances and to continue to operate to add sheets to a container beyond a number that might otherwise be considered a maximum for the container. In still other embodiments the automated banking machine may include mechanisms or members which operate to move or vibrate the containers so that additional sheets may be stored therein. Of course these approaches are exemplary and in other embodiments other approaches may be used.

Figure 20:
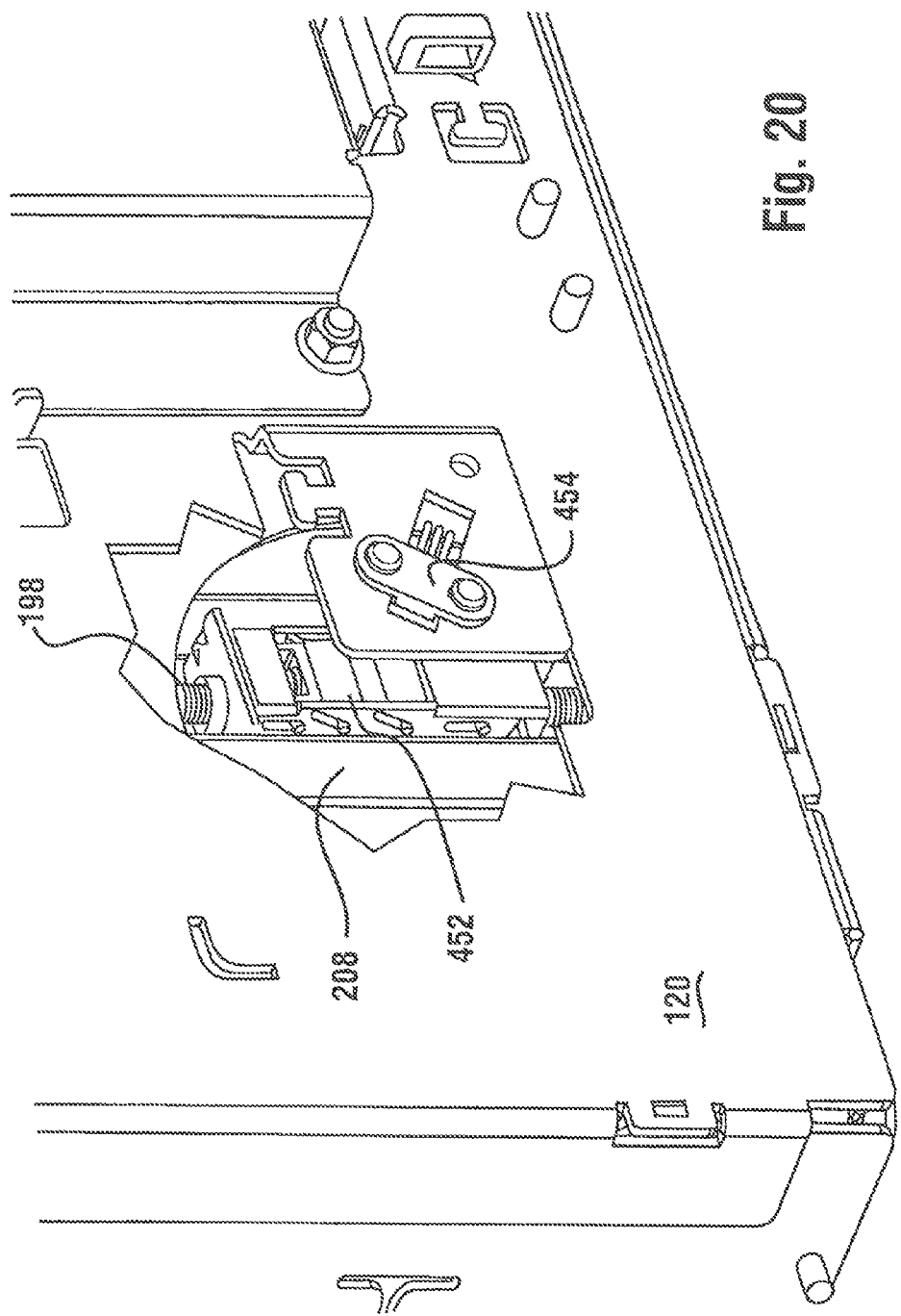
FIG. 20 is a cutaway view of an exemplary sensor for contactlessly sensing the position of the stack plate.
Figure 21:
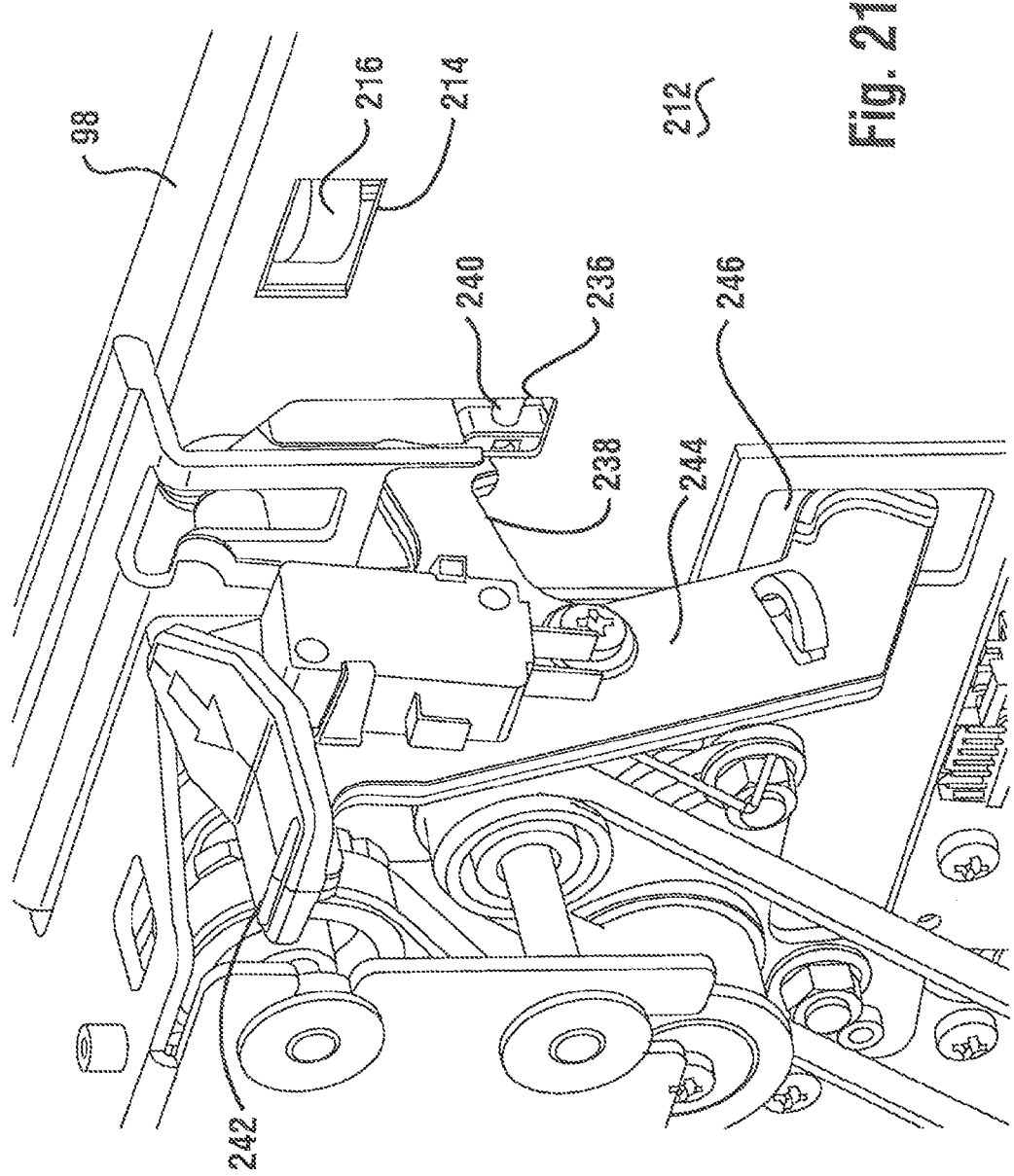
FIG. 21 is an isometric view of an exemplary latch for holding a sheet holding container in an operative position.

In addition in the exemplary embodiment the bracket 208 which is in operative connection with the plate 188 includes a location indicating element 452 thereon. This is represented in FIG. 20. The location indicating element in the exemplary embodiment comprises a magnet which is detectable through a Hall effect sensor 454. The exemplary Hall effect sensor is in operative supported connection with the back wall 120 of the tray 112.

In the exemplary embodiment the Hall effect sensor 454 is positioned so as to indicate that the stack size has grown to the point where it is approaching a maximum number of sheets the container will hold. This is indicative that the container will soon no longer be able to accept additional sheets therein. The terminal controller of the exemplary embodiment is operative to take actions in accordance with its programmed instructions responsive to sensing this condition. This may include for example operating in a manner described in the incorporated disclosures to give notice to an appropriate entity of the need to replace or empty the sheet holding containers within the machine. Further in other embodiments additional sensing devices may be positioned so that the position of the plate 188 may be detected at numerous locations within the container. This enables an exemplary terminal controller to detect the numbers of sheets in each of the containers and use this information to calculate time periods at which replacement of the containers would be required or other actions that need to be taken. Of course this approach is exemplary, and in other embodiments other approaches may be used.

Although the previously described exemplary embodiment uses magnetic sensing principles to contactlessly sense properties and positions of components within the removable containers, other embodiments may use other principles. These include other principles for sensing such components and conditions in a contactless manner. An alternative exemplary embodiment to accomplish such sensing is shown schematically in FIGS. 40 through 44. In this exemplary embodiment radiation sensing principles may be utilized for purposes of sensing such components and conditions. These may include for example sensing of the rotational position of a stacker wheel assembly. It may also include for example sensing positions of a support plate. Such principles may also be applied to sensing the finger portions on a sensing member so as to maintain a proper stack conditions.

In an exemplary embodiment a radiation sensor 456 may be utilized. Such a sensor includes a radiation emitter 458 and a receiver 460 (see FIG. 44). The exemplary sensor uses infrared radiation but in other embodiments other approaches may be used. In exemplary embodiments a radiation blinder structure or similar structure for preventing leakage of radiation directly from the emitter to the receiver may be used. The exemplary blinder structure 462 is shown in detail in FIG. 44. Of course it should be understood that this blinder structure is exemplary and in other embodiments other approaches may be used.

The exemplary embodiment includes a radiation conducting element 464. The radiation conducting element 464 includes a prism which is operative to direct radiation from the emitter and the receiver in the direction of the arrows as shown. In an exemplary embodiment a movable member schematically indicated 466 within the container may have one or more target element portions 468 and 470. The target element portions in an exemplary embodiment may comprise a reflective material which has reflective elements therein that are uniformly aligned so as to provide reflection therefrom. In the exemplary embodiment the target element portions are comprised of glass bead material which includes reflective elements that are operative to reflect incident radiation at an angle of reflection which differs from the angle of incidence. In this way the target element portions may provide reflective properties that are more readily detectable through a radiation sensor. In some exemplary embodiments the target element portions may comprise a reflective tape of the type used in connection with the apparatus described in U.S. patent application Ser. No. 11/983,410 the disclosure of which is incorporated herein by reference in its entirety. Of course this approach is exemplary, and in other embodiments other approaches may be used.

In an exemplary method of operation target element portions may be positioned on the periphery of one or more rotating members in a stacking element assembly. Using the exemplary optical sensor and radiation conducting element, the sensor 456 is operative to sense each time a target element portion passes in proximity to the end of the radiation conducting element. In this manner the sensor which is in operative connection with the terminal controller enables the terminal controller to operate to control rotation of the stacker wheel assembly.

Alternatively or in addition radiation target element portions may be included in operative connection with a bracket or other member that is in operative connection with a support plate similar to support plate 188. Thus for example sensors and radiation conducting elements may be used to sense the position of the support plate such that the terminal controller may determine when a container has reached a particular degree of fullness (or emptiness). This may be done for purposes of determining that a cassette that is receiving the sheets does not become filled and/or a cassette for dispensing sheets therefrom does not become empty. Of course this approach is exemplary.

In other exemplary embodiments radiation reflective members may be used for purposes of determining and controlling stack position within a container. For example movable finger portions like those previously described may include thereon or in operative connection therewith radiation reflective portions rather than magnetic elements of the type described in the previous embodiment. Such radiation reflective portions may be moved responsive to engagement of the finger portions with the stack. Such movement can be used to provide radiation signals which are sensed through operation of the sensor and which can be used by the terminal processor to maintain the top sheet in the stack and the stacker assembly in the desired relative positions.

Of course it should be understood that the use of magnetic and radiation sensing elements of these described embodiments is exemplary of approaches that may be used for purposes of sensing and controlling items within a container. While in the exemplary embodiment contactless approaches have been described, in other embodiments other approaches including approaches which use electrical and/or physical contact between the container and the remainder of the automated banking machine may be used. It should be understood that these approaches are merely exemplary of applications of the various principles described.

In operation of an exemplary embodiment of the automated banking machine, the machine may operate as an automated teller machine (ATM). In the exemplary embodiment a user operating the machine inputs a data bearing record such as a card to the slot that is operatively connected with card reader 22 of the machine. The card reader operates to read data from the data bearing record that corresponds to a user and/or the user's financial account. In the exemplary embodiment the user also inputs a personal identification number (PIN) through the keypad 24. In the exemplary embodiment the terminal controller operates to provide outputs through the display 28 and/or through the speakers 32 or headphone jack 34 so as to prompt the user to provide these inputs. Of course it should be understood that in other embodiments users may be prompted to input other types of data bearing records or user identifying inputs for purposes of identifying the user or their account.

After receiving the inputs from the user the at least one terminal controller operates the automated banking machine in accordance with its programming to determine if the data read from the data bearing record and/or other inputs correspond to an authorized user and/or a financial account which is authorized to conduct transactions through operation of the machine. This is accomplished in exemplary embodiments by the terminal controller causing communication between the automated banking machine and one or more remote computers to determine that the input data corresponds to data for an individual who is authorized to conduct a transaction.

In the exemplary embodiment the user may also provide inputs through one or more input devices indicating that they wish to withdraw cash from the machine. In such circumstances the terminal controller operates in accordance with its associated programmed instructions to cause the machine to communicate with at least one remote computer to determine if the user is authorized to conduct the requested transaction. In response to receiving an indication that the data input by the user corresponds to an individual authorized to conduct such a cash withdrawal transaction, the exemplary terminal controller operates to cause the cash dispenser 38 to dispense the requested cash to the user. The terminal controller operates to cause communications between the automated banking machine and one or more remote computers so as to assess the value associated with the dispensed cash to an account of a user. This may include for example causing a debit to be assessed to an account of the user or by a bank or other financial institution.

Likewise in some exemplary embodiments if the user wishes to deposit cash in the machine the terminal controller causes operation of the currency accepting device 42. The currency accepting device operates to open a gate to provide access through the fascia opening 46 so that the user can insert a stack comprising one or more currency bills. The terminal controller then operates the stack handling mechanism 78 and the picker mechanism 80 so as to unstack the bills one by one and deliver them into the document alignment mechanism 82. Each document is aligned in a desired orientation by engagement with the document alignment mechanism and then moved through the sensing module 84. The sensing module 84 operates to sense various characteristics of each bill, which sensed characteristics are usable to determine properties of the bill such as denomination as well as the genuineness thereof.

In the exemplary embodiment the bills that have been evaluated by the sensing module 84 are directed for storage onto the storage device 88. The terminal controller then operates to advise the user through outputs through the display or other output devices, concerning the machine's determination concerning the number and type of bills that the user has input. In exemplary embodiments the user may be given the option to cause the bills to be deposited for storage in the machine or to have one or more (or all) of the bills returned to the user. Alternatively in some embodiments the machine may operate to advise the user that certain bills are suspect and may be confiscated from the user. Alternatively or in addition other embodiments may operate in accordance with their programming to advise the user that certain sheets do not correspond to bills. Of course these approaches are exemplary and depend on the programming of the particular automated banking machine.

In the exemplary embodiment if the user indicates that they wish to have the bills they have input deposited, the bills are delivered one at a time from the storage device and directed by the gates 86 through the intermodule transport 94 into the sheet directing assembly 96. The terminal controller then causes the sheet directing assembly to operate based on the characteristics of each respective sheet as determined by the sensing module 84. For example the terminal controller may cause sheets having particular denominations or characteristics to be stored in container 98, while sheets having other characteristics are stored in storage location 102, and still other types of sheets are stored in container 100. For example in some embodiments the bills may be sorted by denomination. In still other embodiments the bills may be sorted by the country of origin of the bills, or other properties. Of course this is merely exemplary.

In the exemplary embodiment sheets that are not identifiable as currency bills may be selectively routed to the stack handling mechanism 78 while other bills are directed to the intermodule transport. Further in exemplary embodiments if bills are determined to be counterfeit or of suspected counterfeit they may be directed for storage into the document segregation compartment 92. Of course it should be understood that these approaches are exemplary, and in other embodiments other approaches may be used.

In such a deposit transaction the terminal controller may operate to cause the banking machine to communicate with one or more remote computers so as to cause the machine user and/or their financial account to be credited for a value associated with the valid bills deposited. The terminal controller may operate in some embodiments to indicate the denomination and types of bills that have been deposited. Further in some embodiments the terminal controller may operate to communicate information about the suspect or counterfeit nature of bills to remote computers so that authorities can be notified. Of course other steps may also be taken in accordance with the programming of the particular terminal controller and associated remote computers.

In operation of an exemplary transaction in which a user is to be credited for the value of bills deposited, the terminal controller operates in accordance with its programming to cause the receipt printer 36 of the automated banking machine to provide the user with a receipt. The receipt may include various information about the bills deposited by the user as well as the location, time and date of the transaction. This may be done to provide the user with a record of the transaction that has been conducted. Alternatively or in addition the terminal controller of the exemplary embodiment may cause communication of the machine with other computers so as to provide the user with receipt information via an e-mail message to an e-mail account and/or through a text message to a cell phone or other computer. Of course this approach is exemplary, and in other embodiments other approaches may be used.

In operation of the exemplary automated banking machine sheets are accumulated in stacks in the containers 98 and 100. Sheets may also be accumulated in the middle storage compartment 102. After a plurality of transactions have been conducted one or more of the containers may be sensed as approaching the maximum level of sheets that can be held therein. This may be done through a contactless sensor sensing the position of the stack support plate in the manner previously described, or in another suitable manner. In response to sensing a container reaching a near full condition, the terminal controller may operate in accordance with its programming to notify an appropriate entity of a need to change or remove bills from the container or containers. This may be done in the manner of the incorporated disclosures.

The servicer who is responsible for changing the cassettes or removing bills therefrom may do so by accessing the secure chest of the automated banking machine by opening the safe lock 52 and moving the safe door 50 to an open position. In this position the tray 112 which supports the containers may be moved outward in supporting connection with the slides. Each container may be removed by actuating the respective release lever 242 so as to disengage the latch member from the respective container. The servicer is then enabled to move the top of each container outward from the back wall of the tray and lift the container upward so as to disengage the tray.

With the container 100 disengaged from the tray the door 116 to the middle compartment may be unlatched and opened so as to remove bills which have been accumulated therein. In some exemplary embodiments the middle compartment may be used only under limited circumstances. This may be for example for storing bills when one of the containers has reached the filled condition and can no longer accept bills. Alternatively special types of bills that meet certain criteria or other parameters may be stored in the middle storage area. Notes stored in the middle storage area may be removed by the servicer, and thereafter the door 116 placed in a closed and latched position.

Generally persons responsible for removing containers which have notes stored therein will replace the removed containers with empty containers. The empty containers may be installed in engagement with the tray and have the upper portions thereof moved inward so as to be engaged in positive relation with the respective latching member. Once the containers have been replaced the tray 112 may be retracted to within the safe. The safe door may then be closed and secured and the machine returned to service.

The exemplary removed containers may be transported to a remote location in a locked condition. This may be done for purposes of moving the containers securely to a place where the containers are opened and currency bills therein may be removed and counted. Alternatively field personnel may be provided with keys or other items or data that can be used for unlocking the containers so as to access the bills therein.

In the exemplary embodiment authorized persons open the doors 178 on the containers by opening the associated locks 180. This provides access to the sheet holding compartment within the container. Removal of the sheets therefrom is preferably accomplished by engaging the tab 202 so as to move the lever which releases the plate 188 from operative engagement with the drive. This enables the plate to be moved in the cassette so that the stack of sheets can be more readily manually grasped. The bills are then removed and counted or otherwise processed for purposes of validating the transactions conducted through the machine.

In the exemplary embodiment once the bills have been removed from the container, the container door may be closed and locked and the containers routed for replacement in an automated banking machine. In the exemplary embodiment it is not required to position the plate 188 adjacent to the stacker wheel assembly after the sheets have been removed. This is because the terminal controller in the machine operates in accordance with its programming to automatically position the plate for purposes of receiving sheets once the container has been installed in the machine. Of course these approaches are exemplary, and in other embodiments other approaches may be used.

Thus the exemplary embodiments achieve at least some of the above stated objectives, eliminate difficulties encountered in the use of prior devices, systems and methods, solve problems and attain the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art as being capable of performing the recited function, and shall not be deemed limited to the structures shown in the foregoing description or mere equivalents thereof. The provision of an abstract herewith likewise shall not be construed as limiting the claims to the features or functions described in the abstract.

Having described the features, discoveries and principles of the invention, the manner in which it is constructed and operated, and the advantages and useful results attained; the new and useful structures, devices, elements, arrangements, parts, combinations, systems, equipment, operations, methods, processes and relationships are set forth in the appended claims.

What is claimed is:

1. An apparatus, comprising:
   a sheet stacking device that is operative to produce a stack of sheets,
   wherein the sheet stacking device includes:
      a rotating assembly including,
         rotating members; and
         stationary members extending between the rotating members, where each of the stationary members have cams thereon for engagement with cams on a portion of the rotating members;
      wherein the rotating assembly is operative to engage a sheet being moved toward the stack, move the sheet in engagement therewith, and release the engaged sheet in the stack;
      a support plate that is movably mounted and operative to support the stack,
      wherein the stack of sheets includes a top sheet adjacent to and in operatively engaged relation with the rotating assembly;
      a drive that is in operative connection with the support plate;
      a sensor that is operative to sense a compressive force acting between the top sheet of the stack and the rotating assembly;
      a processor that is in operative connection with the drive and the sensor;
      wherein the processor is operative to cause operation of the drive responsive to the sensor; and
      wherein the processor is operative to cause the drive to move the support plate responsive to compressive force sensed by the sensor acting between the rotating assembly and the top sheet.

2. The apparatus according to claim 1, wherein the rotating assembly includes:
   a projecting portion that is movably mounted; and
   a spring that is operative to bias the projecting portion toward engagement with the top sheet;
   wherein a condition sensed by the sensor corresponds to a position of the projecting portion.

3. The apparatus according to claim 2, further comprising:
   a target element portion in operative connection with the projecting portion;

wherein the sensor is operative to sense a position of the target element portion.

4. The apparatus according to claim 3, wherein the target element portion comprises a magnet.

5. The apparatus according to claim 3, further comprising a second sensor that is operative to sense an added sheet that is added to the stack;
wherein the second sensor is in operative connection with the processor;
a data store that is in operative connection with the processor that includes a stored value;
wherein the processor is operative to cause the drive to move the support plate away from the rotating assembly responsive to a sheet added to the stack sensed by the second sensor and the stored value.

6. The apparatus according to claim 5, wherein the processor is operative to change the stored value responsive to the at second sensor sensing the sheet added to the stack.

7. The apparatus according to claim 1, wherein the stack of sheets include checks.

8. The apparatus according to claim 1, wherein the stack of sheets include currency bills.

9. The apparatus according to claim 1, further comprising:
a data store that is in operative connection with the processor;
wherein the data store includes a stored value;
wherein the processor is operative to cause the drive to move the support plate away from the rotating assembly as sheets are added to the stack responsive to the stored value.

10. The apparatus according to claim 9, wherein the processor is operative responsive to the sensor to change the at least one stored value.

11. The apparatus according to claim 10, wherein the processor is operative to cause the support plate to move away from the rotating assembly; and
the processor is further operative to cause the support plate to stop movement away from the rotating assembly;
wherein the at least one processor is operative to cause the support plate to stop movement away from the rotating assembly responsive to the sensor.

12. The apparatus according to claim 11, wherein the processor, after the support plate has stopped movement away from the rotating assembly, is operative to cause the support plate to move toward the rotating assembly, and
wherein the processor is operative to cause the support plate to stop movement toward the rotating assembly responsive to the sensor.

13. The apparatus according to claim 12, wherein the processor is operative to change the stored value responsive to movement of the support plate.

14. The apparatus according to claim 13, wherein the processor is operative to change the stored value responsive to one of a group consisting of a first distance the support plate is moved away from the rotating assembly before stopping, and a second distance the support plate is moved toward the rotating assembly before stopping.

15. A non-transitory, tangible computer readable medium of instructions with instructions encoded thereon for execution by a processor and when executed operable to:

obtain data representative of a compressive force acting between a top sheet of a stack and a rotating assembly of a sheet stacking device from a sensor;
the rotating assembly including:
rotating members; and
stationary members extending between the rotating members, where each of the stationary members have cams thereon for engagement with cams on a portion of the rotating members;
wherein the sheet stacking device is operative to produce a stack including a plurality of sheets,
wherein the rotating assembly is operative to engage a sheet being moved toward the stack, move the sheet in engagement therewith, release the engaged sheet to the stack, and be adjacent to and in operatively engaged relation with the top sheet,
wherein the sheet stacking device includes a support plate, wherein the support plate is movably mounted and configured to support the stack,
wherein the sheet stacking device includes a drive coupled with the support plate;
cause the drive to move the support plate responsive to the compressive force acting between the rotating assembly and the top sheet.

16. The computer readable medium of claim 15, wherein the rotating assembly includes: a projecting portion that is movably mounted, and a spring that is operative to bias the projecting portion toward engagement with the top sheet, wherein a condition sensed by the sensor corresponds to a position of the projecting portion.

17. The computer readable medium of claim 15, wherein the sheet stacking device includes a further sensor that is operative to sense an added sheet that is added to the stack, and a data store that includes a stored value, the instructions are further operable to:
cause the drive to move the support plate away from the rotating assembly responsive at least in part to a sheet added to the stack; and
change the stored value responsive at least in part to the further sensor.

18. The computer readable medium of claim 17, the instructions are further operable to change the stored value, responsive at least in part to at least one of a group consisting of a first distance the support plate is moved away from the rotating assembly before stopping, and a second distance the support plate is moved toward the rotating assembly before stopping.

19. The computer readable medium of claim 15, the instructions are further operable to cause the support plate to move away from the rotating assembly; and
responsive at least in part to the sensor, cause the support plate to stop moving away from the rotating assembly.

20. The computer readable medium of claim 15, the instructions are further operable to:
cause the support plate to move toward the rotating assembly, and
responsive at least in part to the sensor,
cause the support plate to stop moving toward the rotating assembly.

* * * * *